(12) United States Patent
Peters et al.

(10) Patent No.: US 6,714,914 B1
(45) Date of Patent: Mar. 30, 2004

(54) INTEGRATED SYSTEM FOR THE ADMINISTRATION OF AN INSURANCE COMPANY

(75) Inventors: Gerald Peters, Grayslake, IL (US); Jon Sykes, Glenview, IL (US); Arthur Pennington, Buffalo Grove, IL (US)

(73) Assignee: PeopleSoft, Inc., Pleasanton, CA (US)

( * ) Notice: Subject to any disclaimer, the term of this patent is extended or adjusted under 35 U.S.C. 154(b) by 0 days.

(21) Appl. No.: 08/673,647

(22) Filed: Jun. 25, 1996

Related U.S. Application Data

(63) Continuation of application No. 08/285,501, filed on Aug. 3, 1994, now abandoned, which is a continuation-in-part of application No. 07/813,151, filed on Dec. 23, 1991, now abandoned.

(51) Int. Cl.[7] .............................................. G06F 17/60
(52) U.S. Cl. ............................ 705/4; 395/672; 705/26
(58) Field of Search ........................... 705/4, 8, 26, 27; 395/670, 672, 674

(56) References Cited

U.S. PATENT DOCUMENTS

| | | | |
|---|---|---|---|
| 4,359,631 A | * 11/1982 | Lockwood et al. | 235/381 |
| 4,491,725 A | * 1/1985 | Pritchard | 235/375 |
| 4,553,206 A | * 11/1985 | Smutek et al. | 395/275 |
| 4,648,037 A | * 3/1987 | Valentino | 364/408 |
| 4,775,935 A | * 10/1988 | Yourick | 364/401 |
| 4,827,404 A | * 5/1989 | Barstow et al. | 395/500 |
| 4,831,526 A | * 5/1989 | Luchs et al. | 364/401 |
| 4,833,312 A | * 5/1989 | Mine Matsu et al. | 235/379 |
| 4,837,693 A | * 6/1989 | Schotz | 364/408 |
| 4,878,175 A | * 10/1989 | Norden-Paul et al. | 364/413.01 |
| 4,899,292 A | * 2/1990 | Montagna et al. | 395/147 |
| 4,916,611 A | * 4/1990 | Doyle, Jr. et al. | 364/401 |
| 4,974,160 A | * 11/1990 | Bone et al. | 395/161 |
| 4,992,940 A | * 2/1991 | Dworkin | 364/401 |
| 5,006,983 A | * 4/1991 | Wayne et al. | 364/401 |
| 5,070,452 A | * 12/1991 | Doyle, Jr. et al. | 364/401 |
| 5,117,354 A | * 5/1992 | Long et al. | 364/401 |
| 5,136,502 A | * 8/1992 | Van Remortel et al. | 364/413.01 |
| 5,191,522 A | * 3/1993 | Bosco et al. | 364/401 |
| 5,212,634 A | * 5/1993 | Washizaki et al. | 364/400 |
| 5,241,464 A | * 8/1993 | Greulich et al. | 364/401 |

OTHER PUBLICATIONS

Datapro Research Group—"Insurance & Real Estate" McGraw–Hill, Inc., 1991; pp. D45–150 to D45–900–001.*
Datasources Software—"Insurance,—Applications Software" 1st Edition, 1990; pp. J–391 to J–404.*

* cited by examiner

Primary Examiner—Stephen R. Tkacs
(74) Attorney, Agent, or Firm—Carr & Ferrell LLP

(57) ABSTRACT

An integrated system for the administration of insurance companies is disclosed which includes a personal computer, a network and one or more file servers. The system further includes software for performing a plurality of functions which are interconnected and automatic. Manually entered data is verified, integrated into the database and the appropriate functions performed. A built-in audit system allows all transactions to be retrieved and all communications to be documented. The system further includes an automatic system for profiling the program to the needs of an individual insurance company so that all transactions correspond to the desired features and parameters selected by the user.

16 Claims, 70 Drawing Sheets

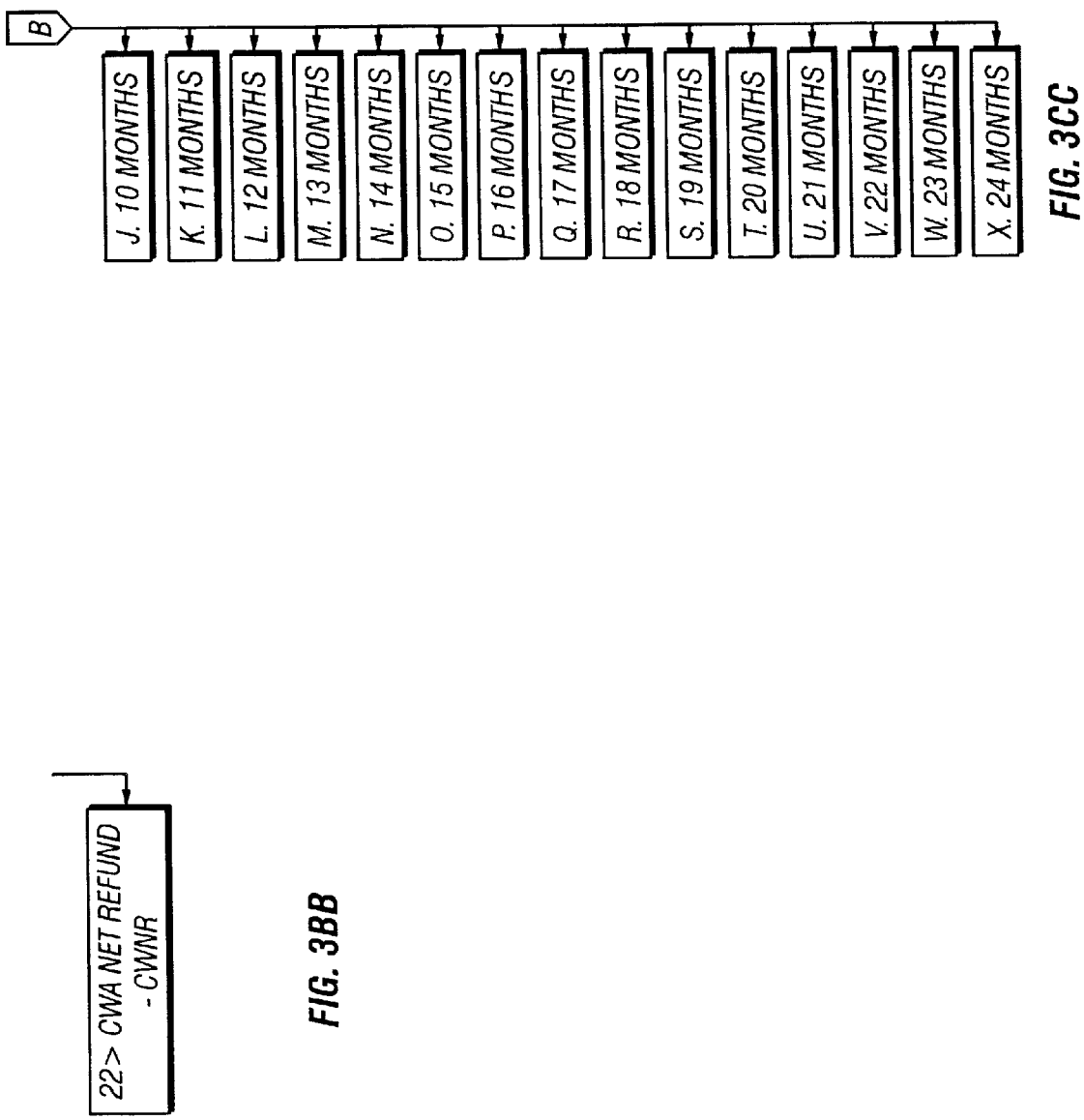

INTEGRATED SYSTEM FOR THE ADMINISTRATION OF AN INSURANCE COMPANY

CROSS REFERENCE TO RELATED APPLICATION

This is a continuation of U.S. patent application Ser. No. 08/285,501, filed Aug. 3, 1994 now abandoned. Which is a continuation-in-part of U.S. patent application Ser. No. 07/813,151, filed Dec. 23, 1991, now abandoned.

BACKGROUND OF THE INVENTION

The present invention is generally in the field of computer software, and in particular, concerns a personal computer-based system for life insurance companies.

Several large mainframe software systems for the life insurance industry have been developed over the last twenty years. The foundation for most of these systems is IBM's original 1962 CFO product. The first generation of products was written in AUTOCODER and was designed for a computer with 16k of memory. The second generation of products was a CFO replacement system again directly descended from the original CFO product but written mostly in ASSEMBLER language. The third generation of life insurance software was mainframe database systems. These systems were all large mainframe databases, some of which were relational, written primarily in COBOL, with most components being taken from earlier systems. The fourth generation systems are mini and PC based mainframe replacement systems. Again these systems are written in COBOL, still using the single centralized processor concept. Some are transportable between PC's, mini-computers and mainframes.

The first through fourth generation software systems for life insurance companies still use technology with disjointed data files, outdated mainframe architecture, restrictive data formats and difficult programming languages. The deficiencies are particularly onerous in view of increased competition in the insurance industry. Competitive shifts and opportunities in the marketplace are characterized by a need for rapid, competent adjustments in product support services, compensation systems and customized administrative support. In addition, increasing government regulation and reporting have been relentless in recent years and require sophisticated computer system enhancements. Another problem is a shortage of qualified computer programers. Of even greater importance, the shorter product lead times and life cycles in the insurance industry now require products to be implemented more quickly.

In addition to these problems, the data processing departments of insurance companies are being asked to provide wider and easier access to the corporate database, in order to provide the users with the necessary data to administer products and provide prompt customer service. At the same time cost must be kept within acceptable levels.

Accordingly, it is an object of the present invention to provide an integrated system for the administration of an insurance company at a reasonable cost. This integrated system must reduce total data processing costs, reduce product implementation time frames, be easy to use and provide greater flexibility in product design and commission payment frequency and format.

SUMMARY OF THE INVENTION

The present invention is an integrated system for the administration of insurance companies. The system includes a plurality of personal computers, a network and one or more file servers. The system further includes software for performing a plurality of functions, the functions including new business processing, policy administration, correspondence, cashiering and disbursement processing, accounting, billing and payment processing, requirement processing, marketing and sales information and maintenance of all subsidiary files. Data files are provided for storing current information characterizing each of these functions. The system is written in a fifth generation language which takes advantage of PC/network distributed environments, utilizing a true relational database design. Manual entry devices such as keyboards allow entry of data relative to these functions. The program receives data and verifies its accuracy. The program then takes the entered and received data, performs the functions enumerated above and updates the data files. The system further includes various devices such as a printer, built-in fax and modems for communicating the updated information to other computers or to external printers, fax machines or other computers outside the network.

The system also provides off-site database support. This support allows a company to process data in one or more locations while maintaining a single consolidated database. This support is well suited for remote, regional processing by separate marketing organizations, or regional processing offices of the company. This support can take one of three forms: (1) selected data files are maintained in their entirety at the remote site, thus allowing both the Home Office and the remote site to view and update any records in these files; (2) a subset of selected data files are maintained at a remote site such that only the subset can be maintained by the remote site but all data including the subset can be maintained by the Home Office; or (3) a subset of selected data files at the Home Office is made available to the remote site for inquiry purposes only. Updating of the multiple data files can be done through a dedicated phone line, or on a periodic batch basis if appropriate.

An additional feature of the invention is the system for installing the program in individual insurance companies. The system comprises an interface which poses a series of questions to the user upon installation. The questions generally are of the yes or no or multiple choice variety. Based on the answers to the questions, the system is globally modified to conform to these answers. The parameters of the system are thereby modified independently or collectively as required. In a preferred embodiment the system is subdivided into four levels. The database level basically includes all information stored in the computer. The company level divides the database into information concerning a particular company or group of companies. The product line level concerns groups, such as factor based products like traditional life insurance, formula based products such as universal life and fixed annuities and equity-based products such as variable life and variable annuities. The product level is only concerned with specific products, such as a specific type of whole life insurance. By entering the required data the user can profile the parameters of the database, the number and type of companies, the relevant product lines and the specific products of the user.

The invention provides various advantages, including, but not limited to, the following:

a) Various different insurance products are supported, and can be accessed by various different insurance agents or insurance agencies.

b) A PC local area network is employed, providing distributed processing for faster speed, yet providing distributed access to a database on a file server.

c) Reverse processing is accommodated, whereby any transaction can be reversed, including reducing an agent's commission when a transaction is reversed. A previous incorrect transaction can be reached and corrected.
d) Policy records are placed in and stay on the system from before application is submitted through while benefits are being paid.
e) Applications for insurance are submitted on line with screens that vary depending upon the insurance product. There is no need to mail an application. Paperwork is reduced, and a more environment friendly system is provided.
f) An agent hierarchy is established for each client company. The system keeps an electronic record of who an agent reports to and who reports to the agent, which hierarchy can change for different products.
g) The system can calculate commissions depending on level of the agent in the hierarchy. The frequency of making commission payments is variable. It is possible to cause a commission to be paid prior to the scheduled payment date, and the system can be instructed to advance commissions when applications are submitted.
h) The system calculates tax information, and prints a form 1099 for each agent or agency that received commission payments.
i) Information for each agent stored, and information relating to an agent can be retrieved by performing a phonetic search of the agent's name.
j) The system provides the capability of generating a form of instructions regarding what labwork is required, and of storing lab results on-line for an underwriter to view. There is no need to mail medical results.
k) The system can be used to determine the maximum amount that can be borrowed from a policy, and to generate a loan check and letter to a policy owner who wishes to borrow against a policy.
   1) A request can be made to the system to pay systematic withdrawals to a policy owner, and the system will do so. Federal and state taxes are withheld, and letter is generated by the system to accompany a check.
m) The system calculates a minimum distribution amount for tax purposes for owners of IRA's, Terminal Funded or TSA policies, who are at least 70½ years old.
n) The system generates form letters, such as a letter to a policy owner prior to maturity of the policy.
o) The system generates transaction files for transmittal to automated clearing house for premium payments.
p) The system provides mail tracking. Letters are scanned in and maintained in the system for later review on-line.

BRIEF DESCRIPTION OF THE DRAWINGS

FIGS. 4a–h of the drawings is a singular flow chart illustrating Functional Profile screen options;

DETAILED DESCRIPTION OF THE PREFERRED EMBODIMENT

Figure 1:
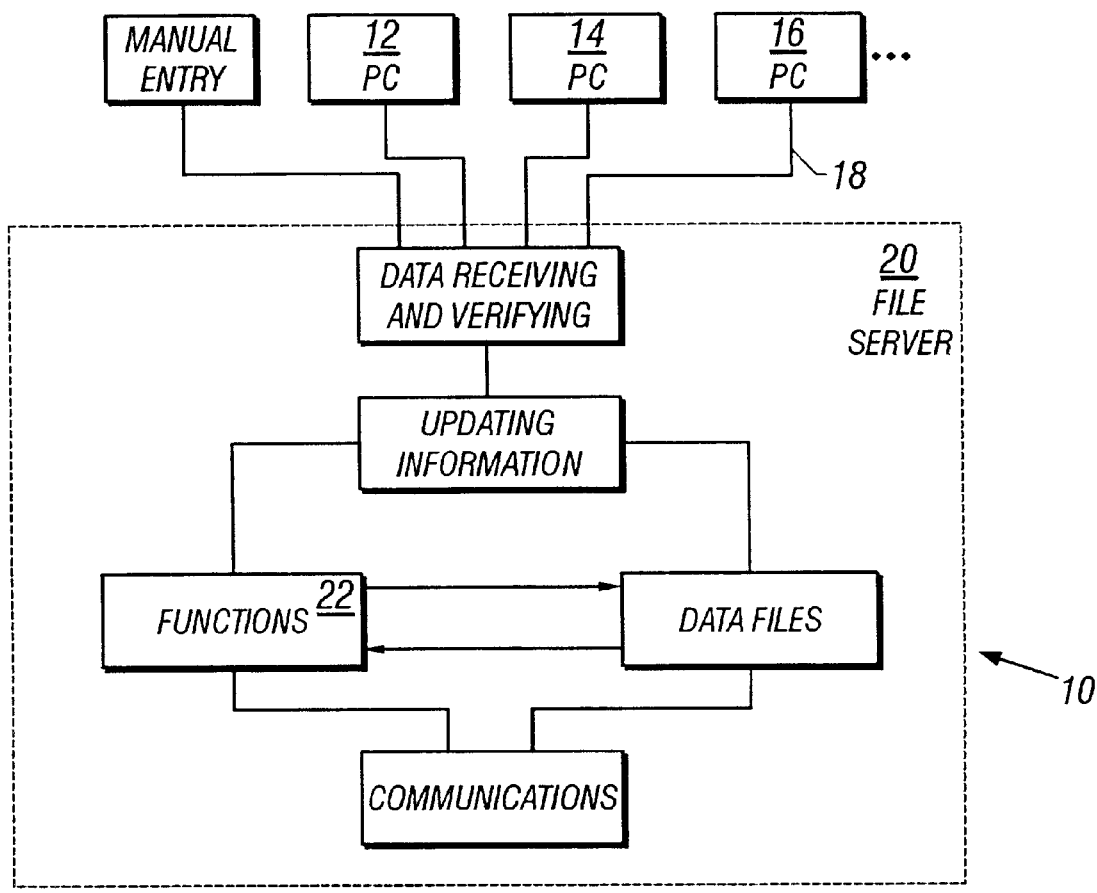
FIG. 1 of the drawings is a flow chart generally illustrating the operation of the system.

While the invention is susceptible of embodiment in many different forms, there is shown in the drawings and will herein be described in detail several specific embodiments with the understanding that the invention is not limited thereto except insofar as those who have the disclosure before them are able to make modifications and variations therein without departing from the scope of the invention.

As illustrated in FIG. 1 of the drawings, an integrated system 10 for the administration of insurance companies is disclosed. The system 10 includes a plurality of personal computers 12, 14 and 16, a network 18, and one or more file servers 20. The system 10 further includes a mechanism 22 for performing a plurality of functions in a distributed processing environment. These functions include Mail Tracking, Cashiering, Disbursement Clearing, Requirements Processing, Document Processing, Script Processing, Field Underwriting, Billing, Executive Information, Marketing and Sales Information, Tax Reporting, Vendor Interfacing, Database Management, and Agent Processing. These functions are profiled (defined below) in a functional profile which is described below.

A feature of the invention is that the system includes a user interface which, in the illustrated interface includes one of the personal computers 12, 14 and 16, and which is for setting up the system when it is first installed at an individual insurance company, and when it is desired to modify the system (profiling). In profiling, the user interface generates and displays a series of questions to the user and receives answers from the user, and automatically modifies the system based on the series of question and answers. These questions usually take the form of yes and no or multiple choice questions which are answered by making a selection from a menu. By answering these questions through a manual entry mechanism such as a keyboard, the system is globally modified to conform to these answers. (For example, when the interface asks the name of the company, and the company name is entered, all correspondence, communications and data entered will be entitled with this company name. If additional companies are specified, then the system will be globally modified to ask to which company the answers being entered refer. When information is sought on a specific company, inquiries will be directed to the specific company requested.) Profiles of insurance companies are set up using selections shown in FIGS. 2a and 2b. Profiling is also used, for example, to define a new insurance product.

This profiling is performed through menu selections which are illustrated in FIGS. 2a–c, 3a–cc, 4a–h, 5a–f, 6a–h, 7a–c, 8a–c, 9a–c, and 10a–h. Each horizontal row in FIG. 2 represents a menu "level". Any particular block, or menu selection, illustrated in FIG. 2 can be reached by making an appropriate selection from a connected block at a higher level or horizontal row.

Each menu involves one or more parameters which may be selectively modified by the user. The user interface is constructed and arranged to modify these parameters at the command of the user and thereby independently or collectively change that parameter for as many levels as required.

The system is divided into four general profiles: a functional profile (see FIGS. 4a–h), a product profile (see FIGS. 3a–cc), a company profile (see FIGS. 2a–c), and a product line profile.

Figures 2, 2A:
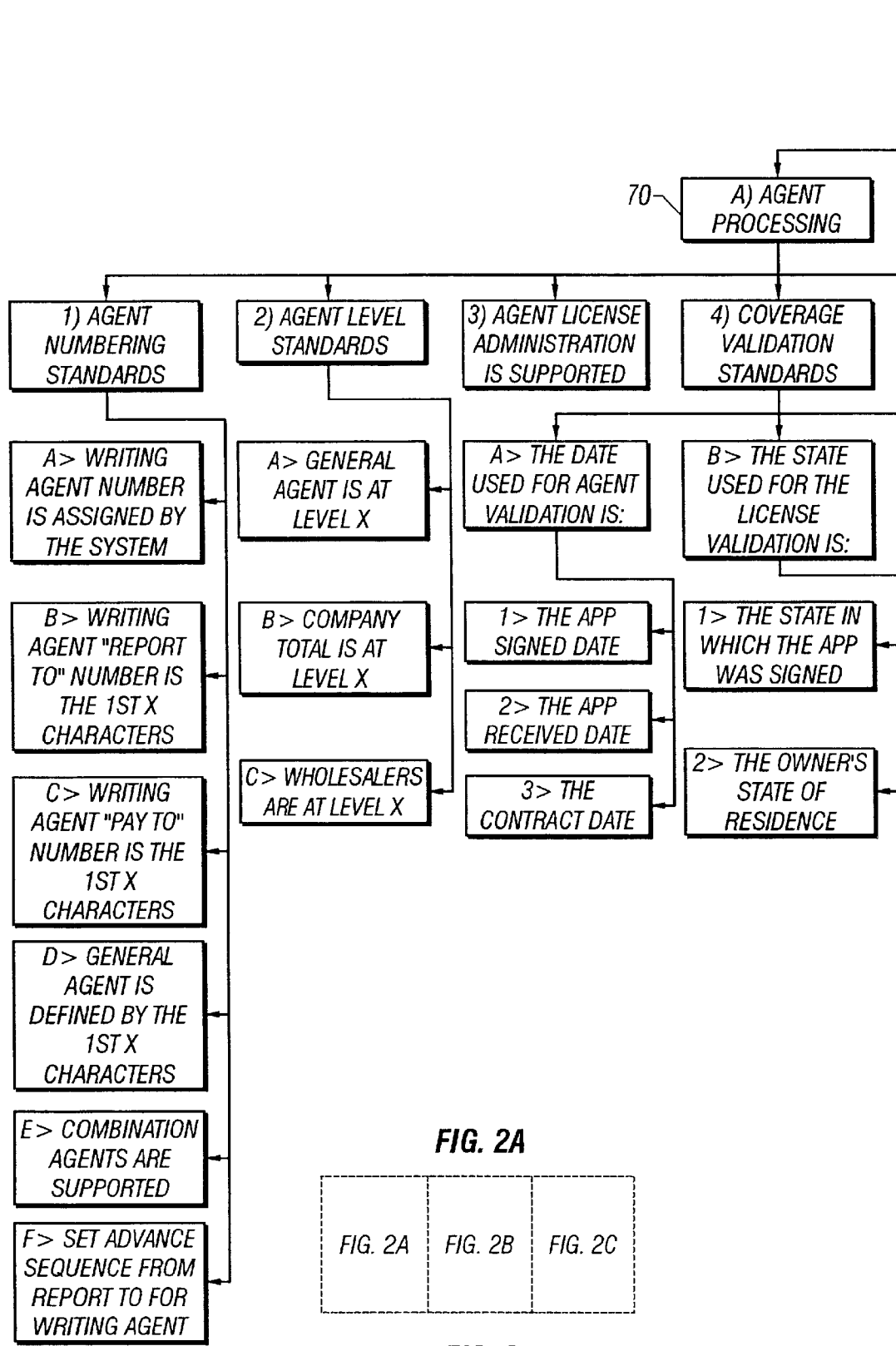
FIGS. 2a–c of the drawings is a singular flow chart illustrating Company Profile screen options.
Figure 2B:
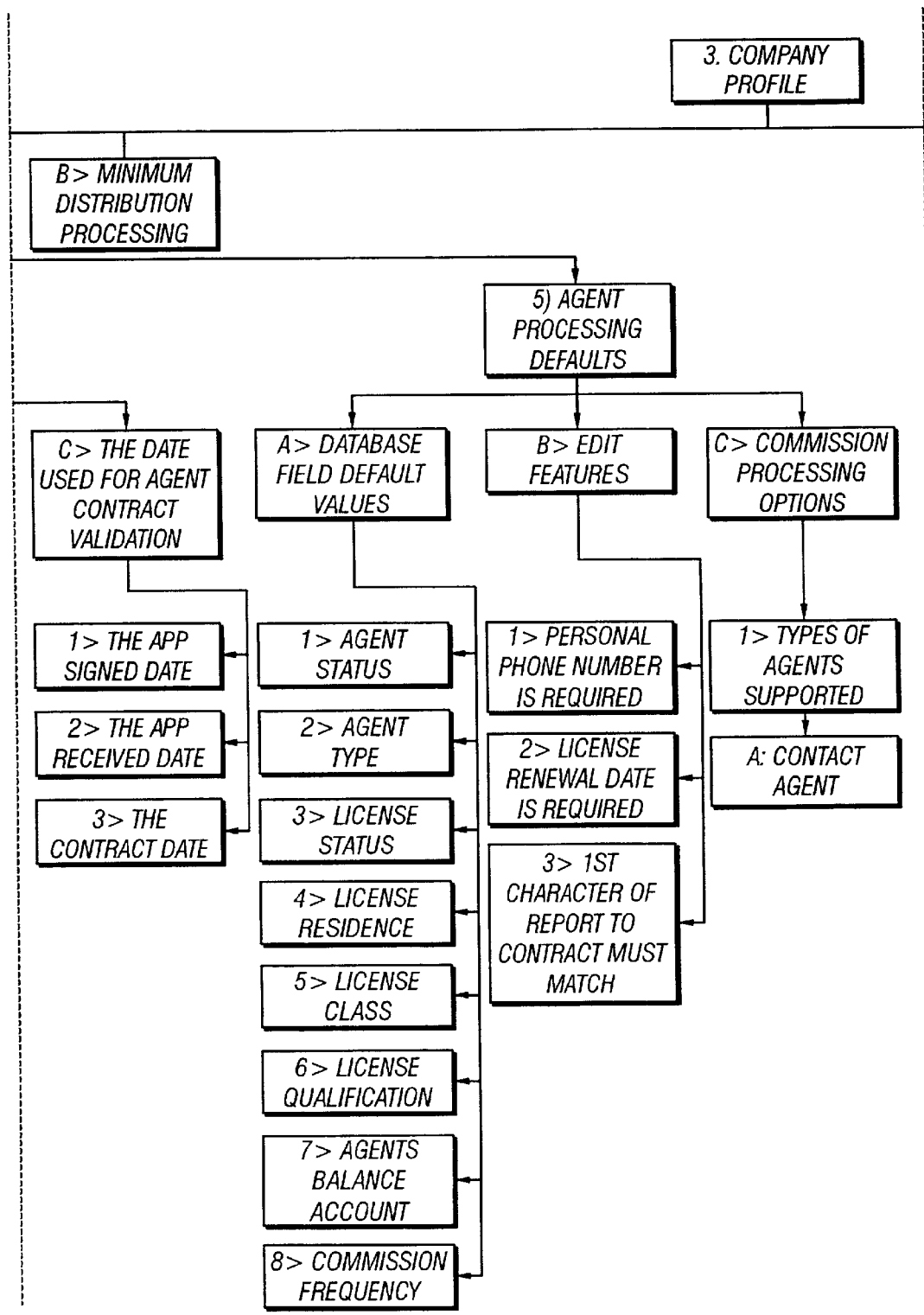
Figure 2C:
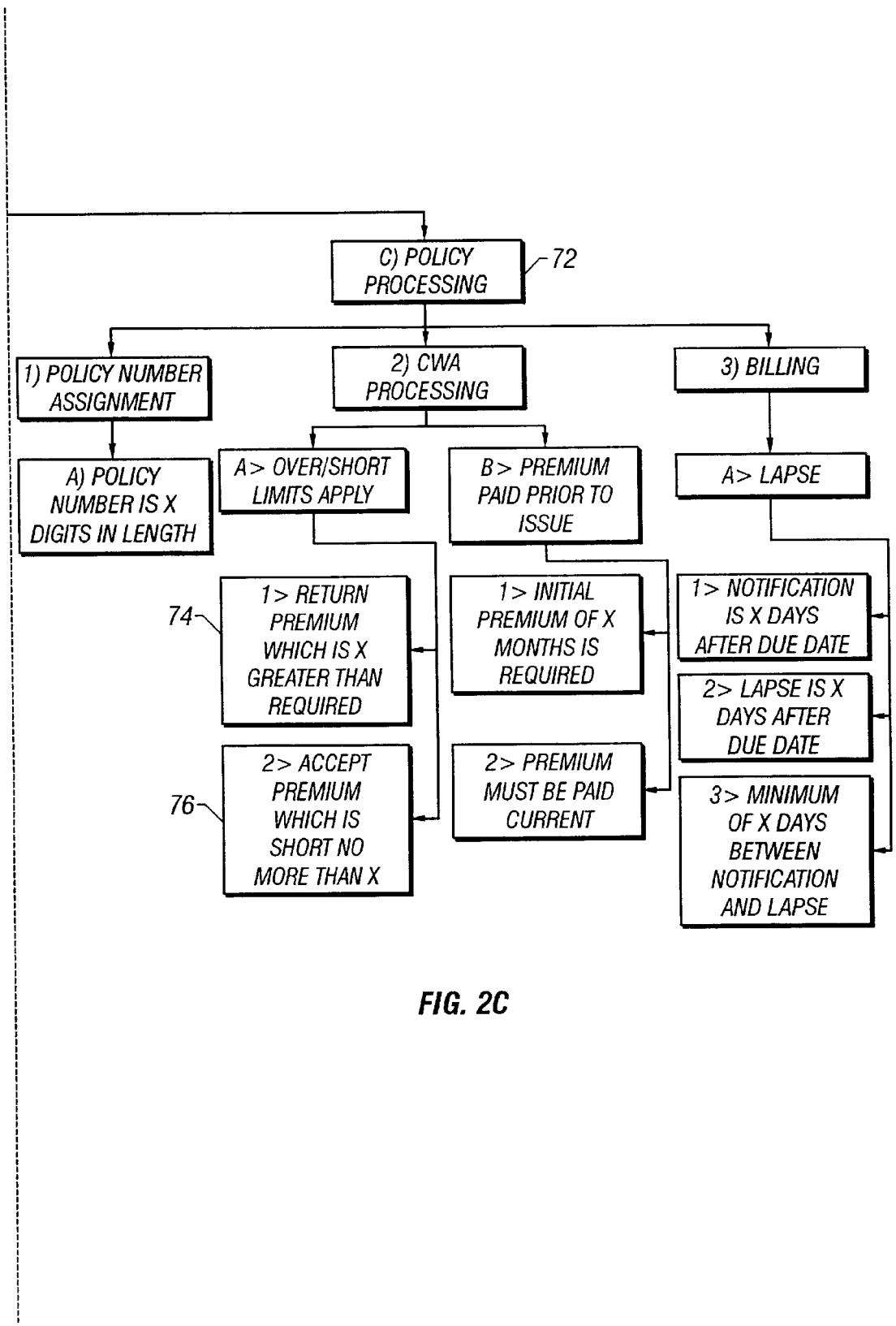
Figure 3A:
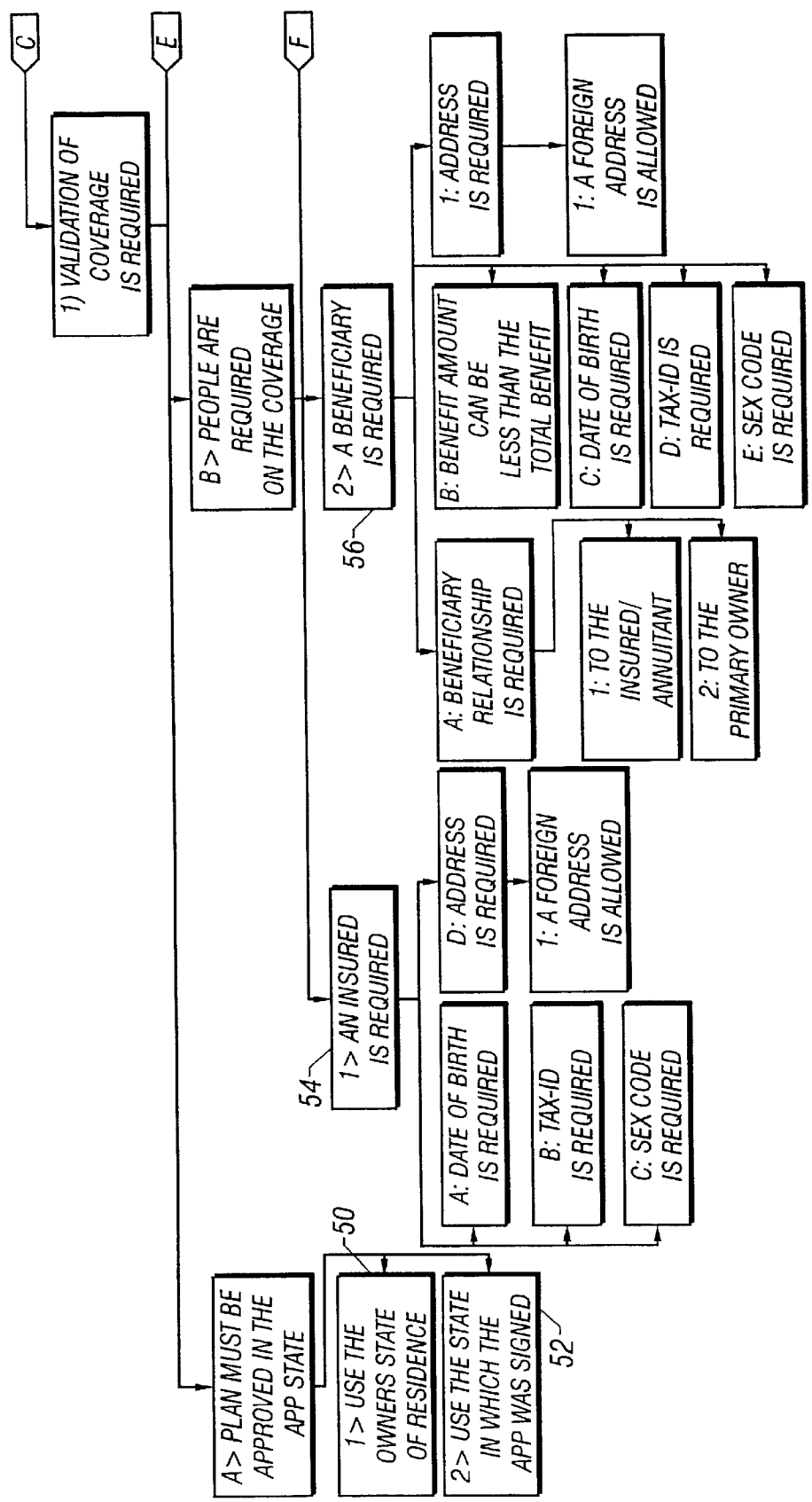
FIGS. 3a–cc of the drawings is a singular flow chart illustrating Product Profile screen options.
Figure 3B:
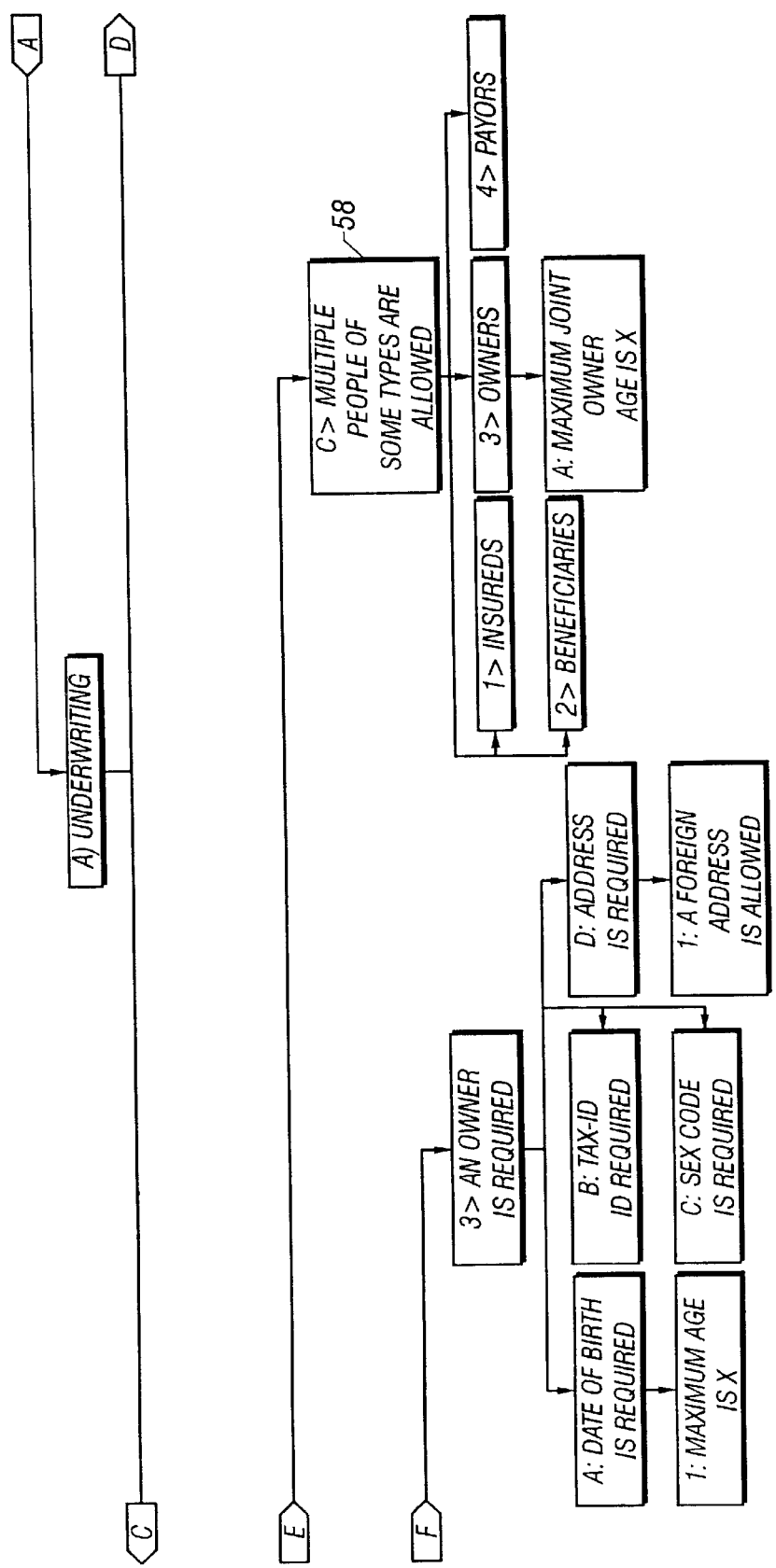
Figure 3C:
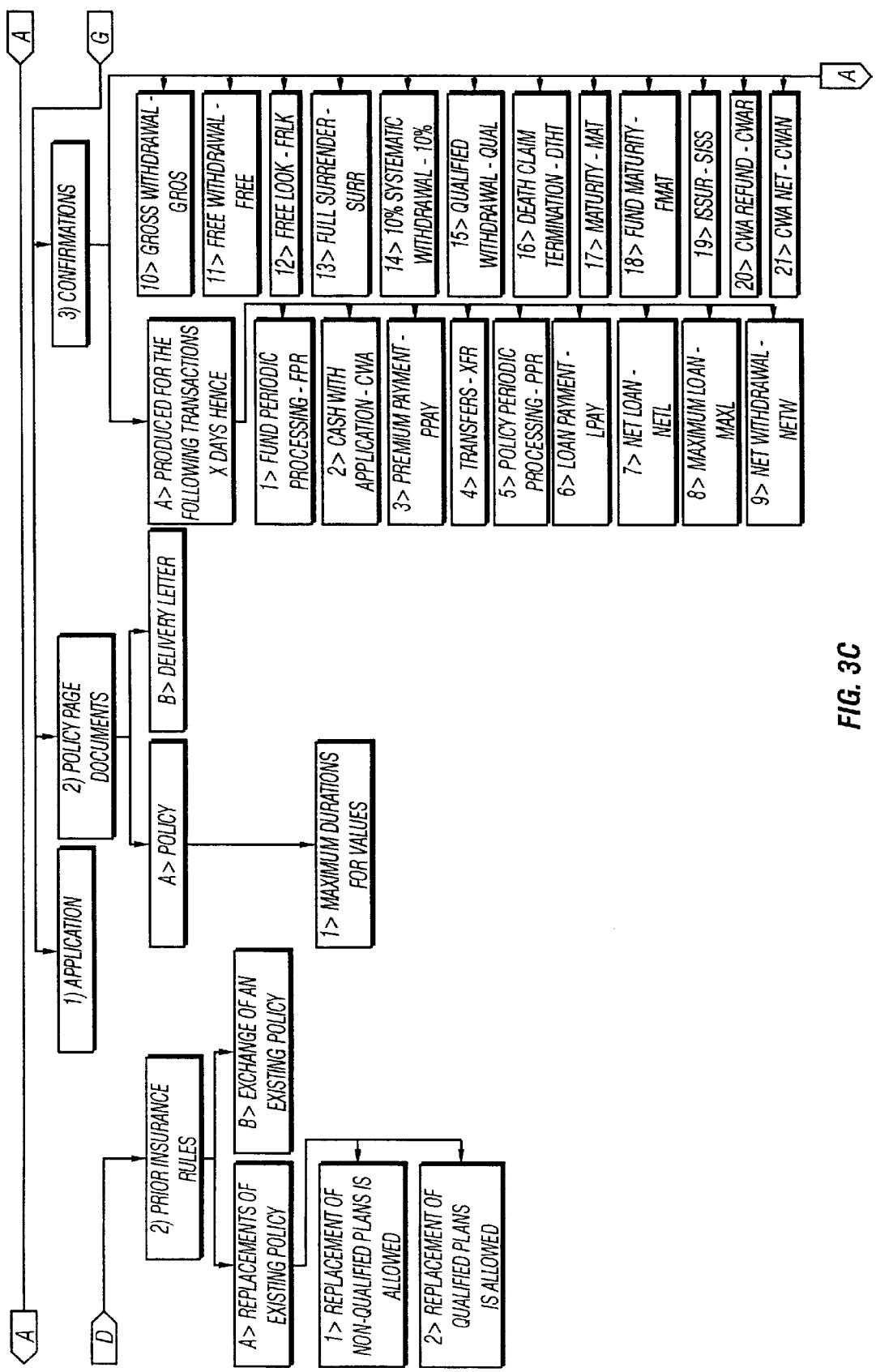
Figure 3D:
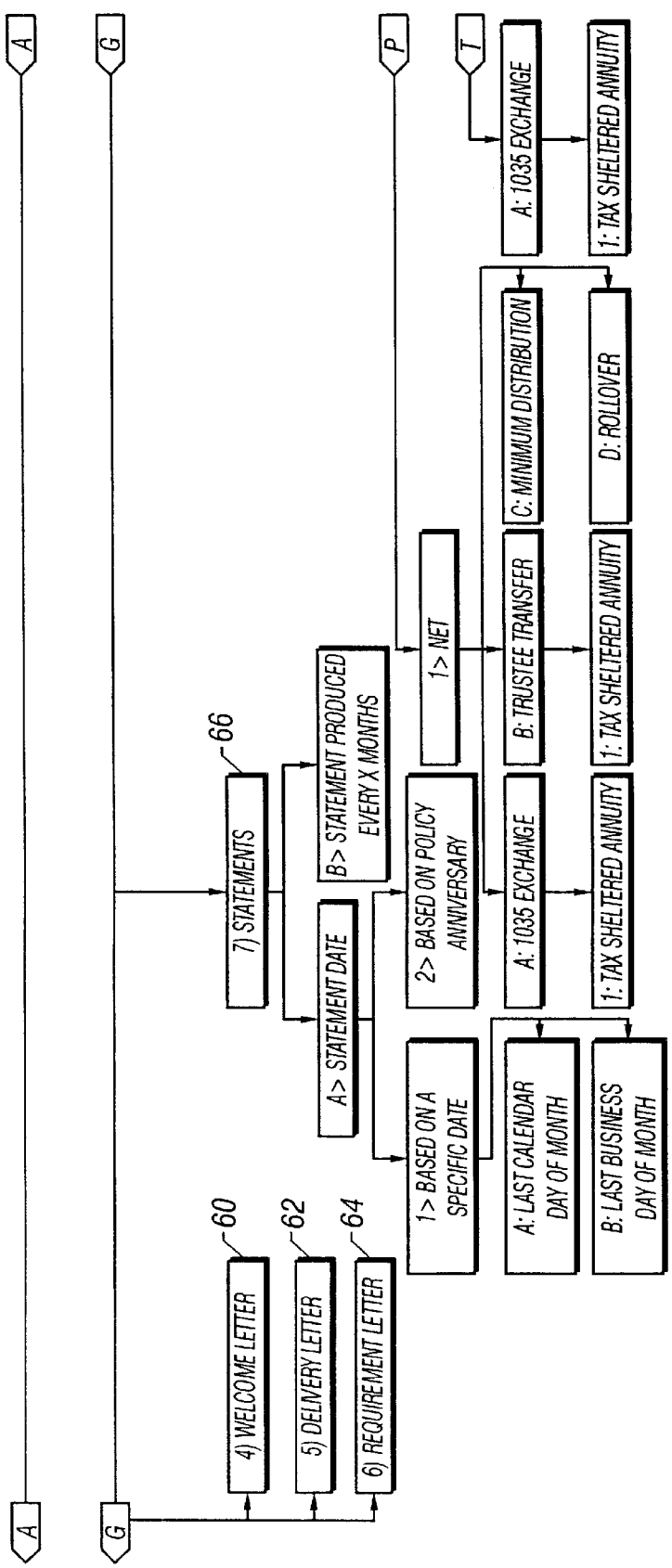
Figure 3E:
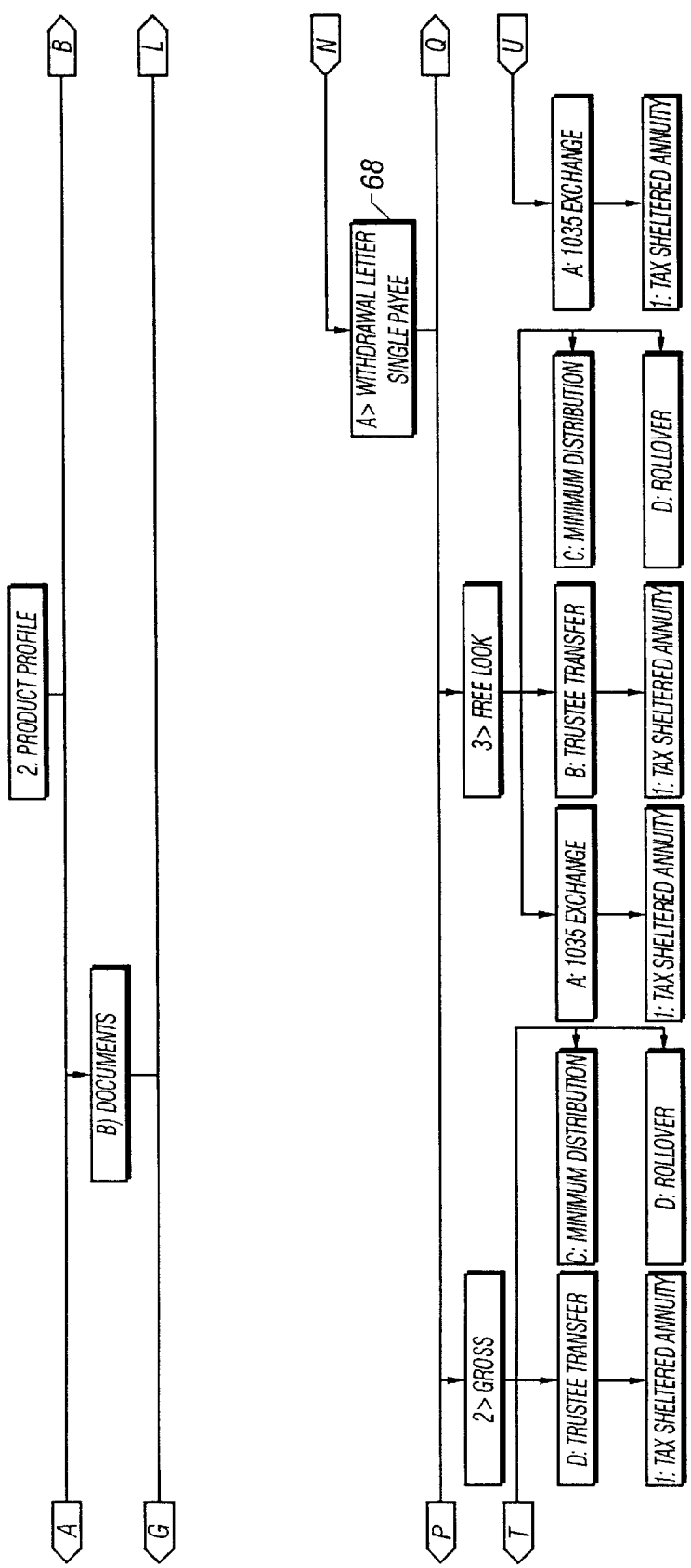
Figure 3F:
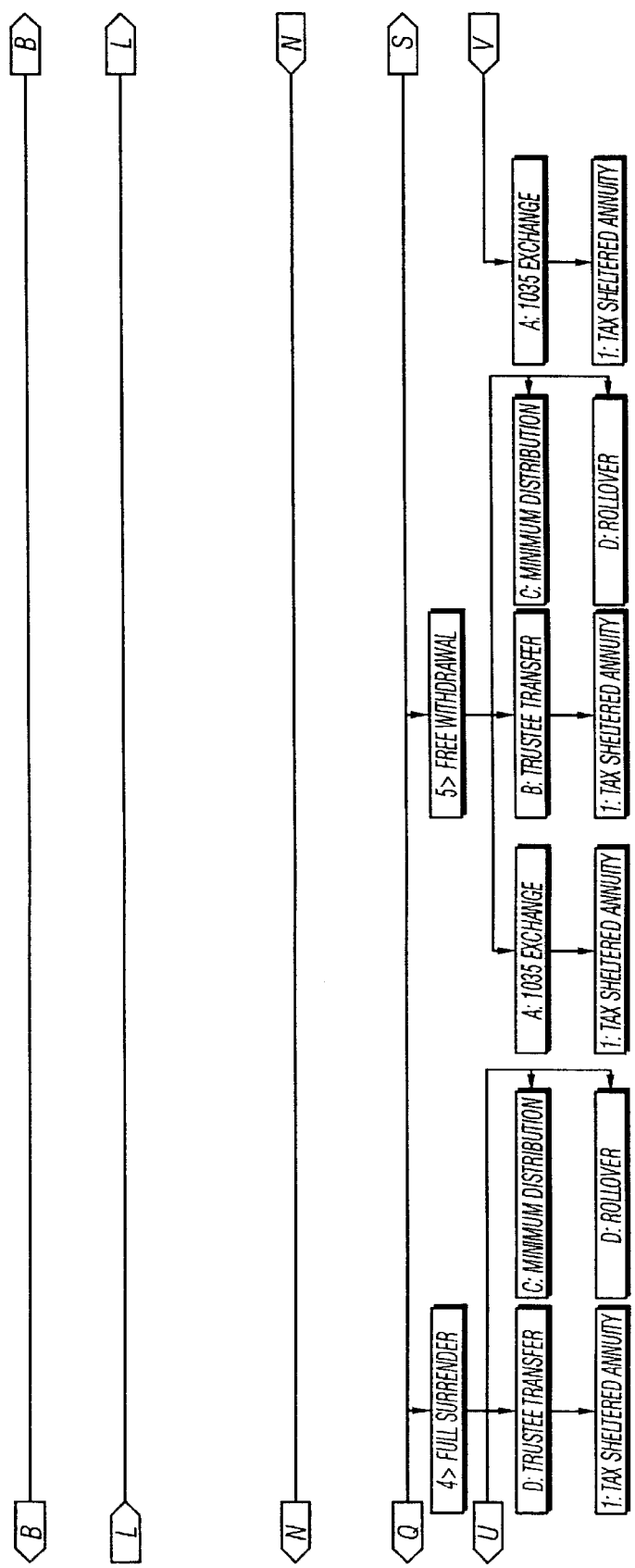
Figure 3G:
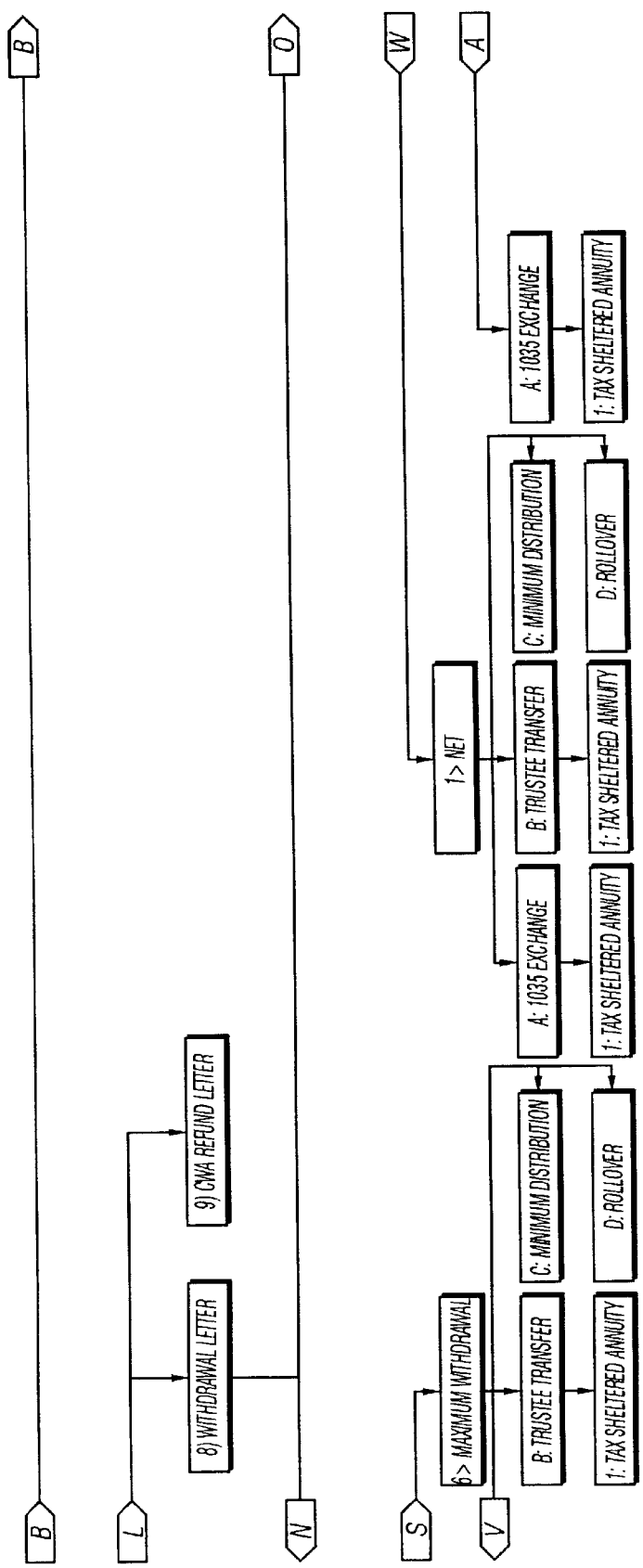
Figure 3H:
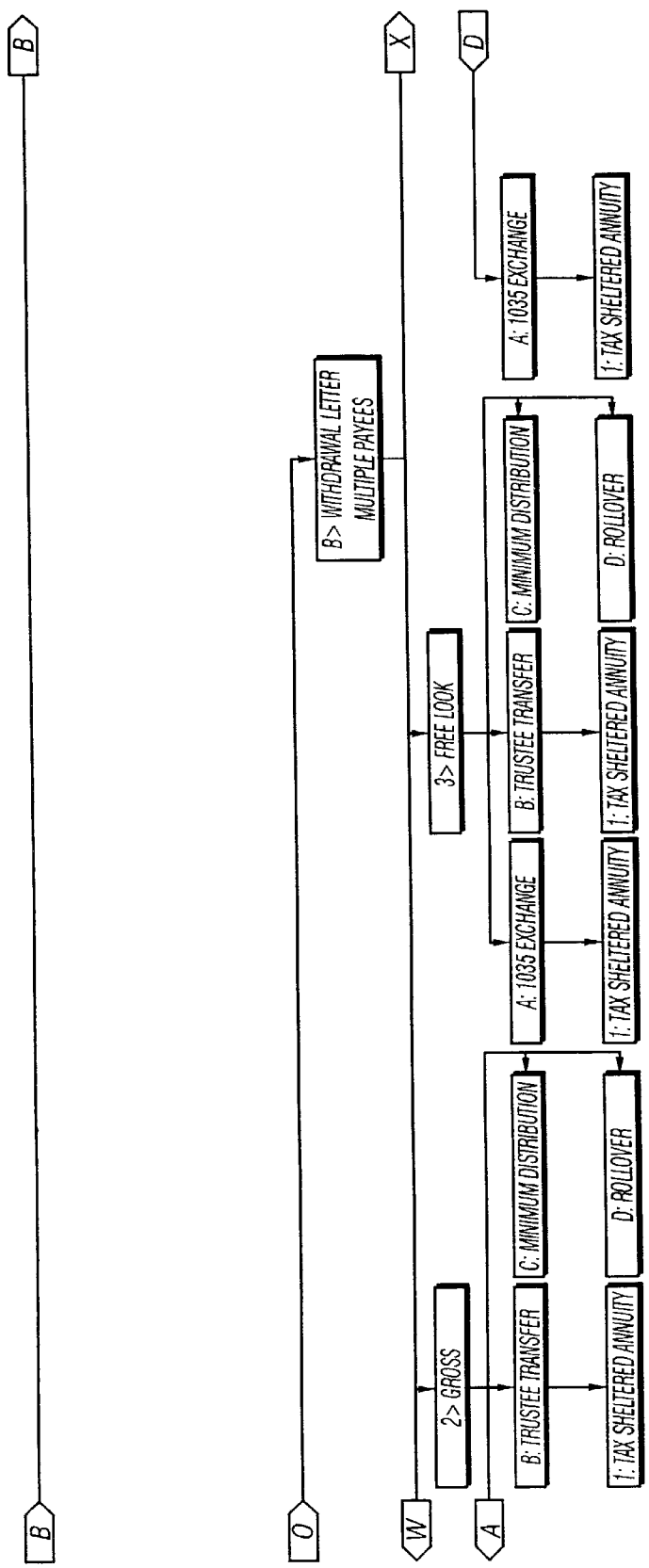
Figure 31:
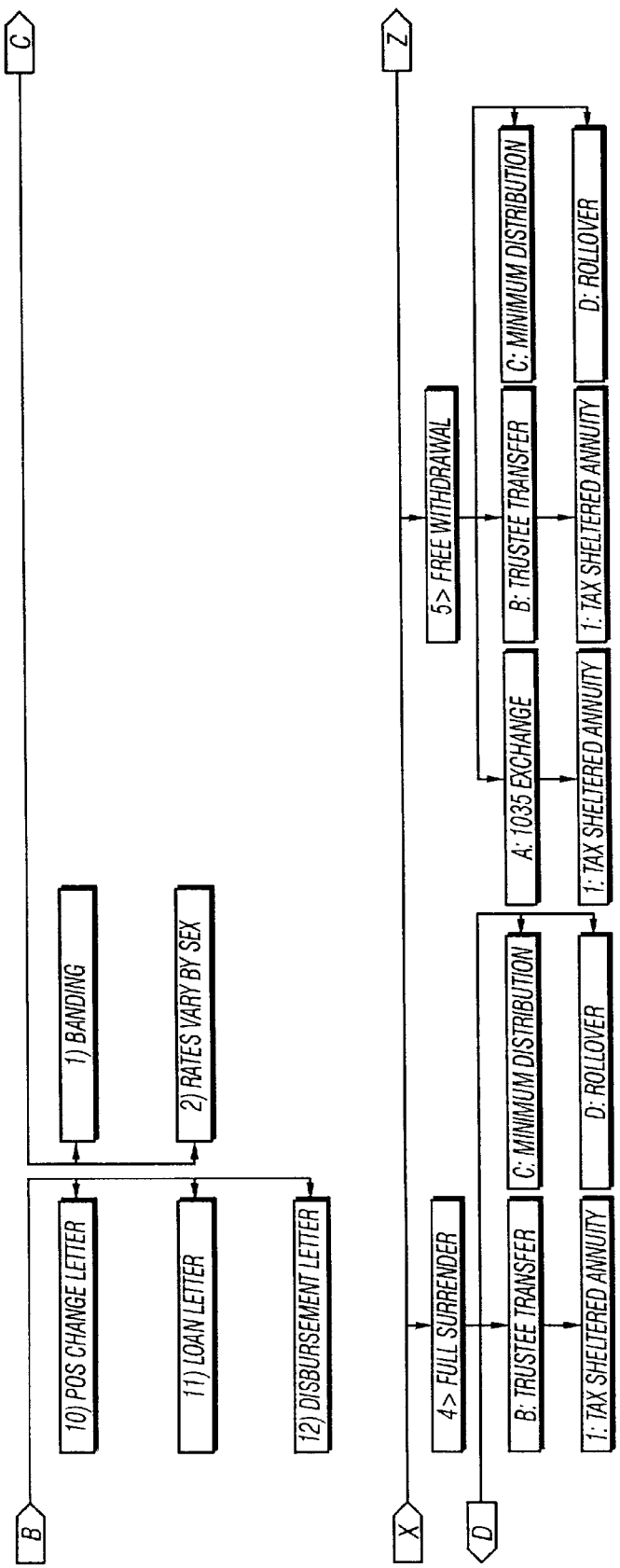
Figure 3J:
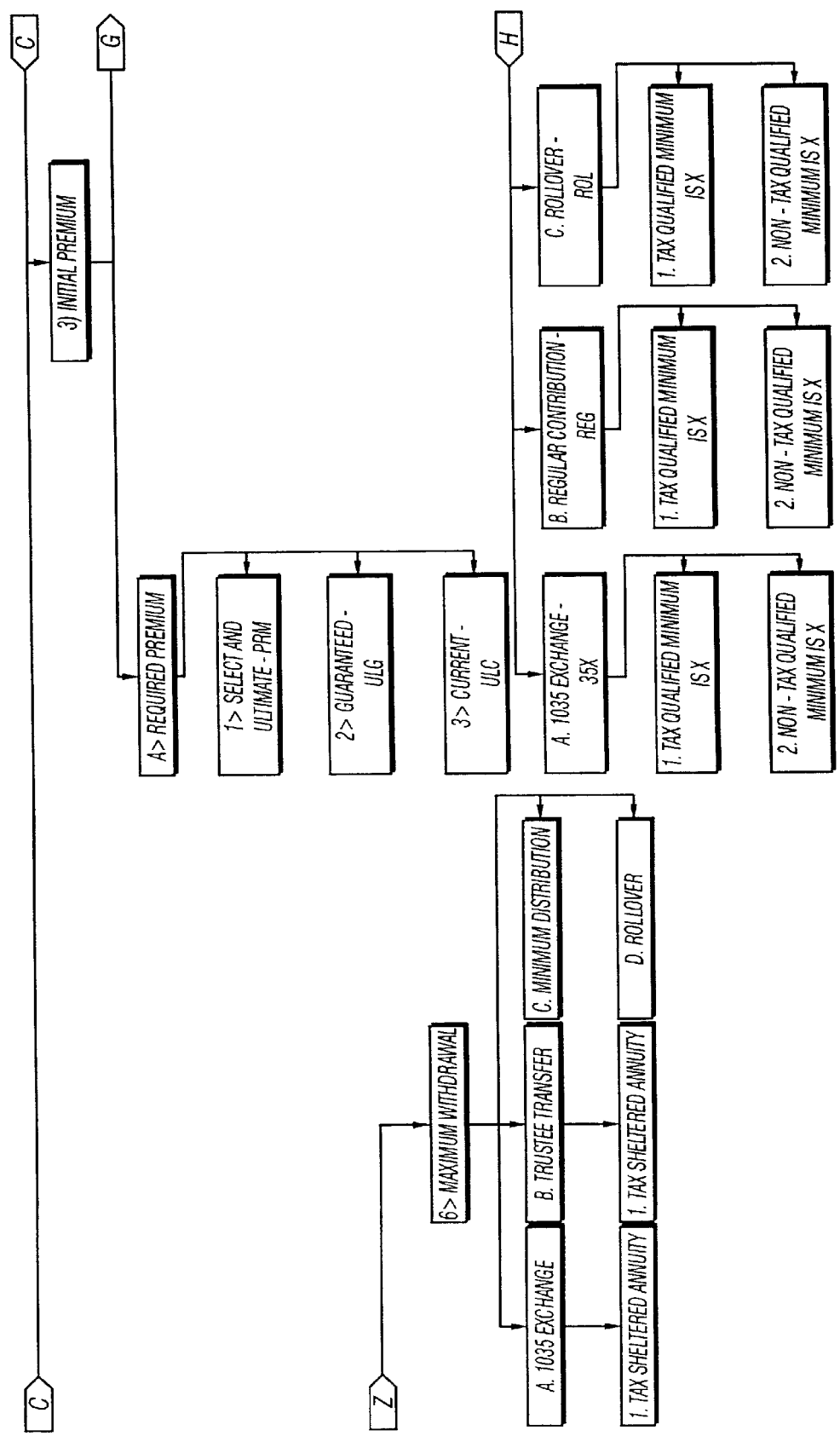
Figure 3K:
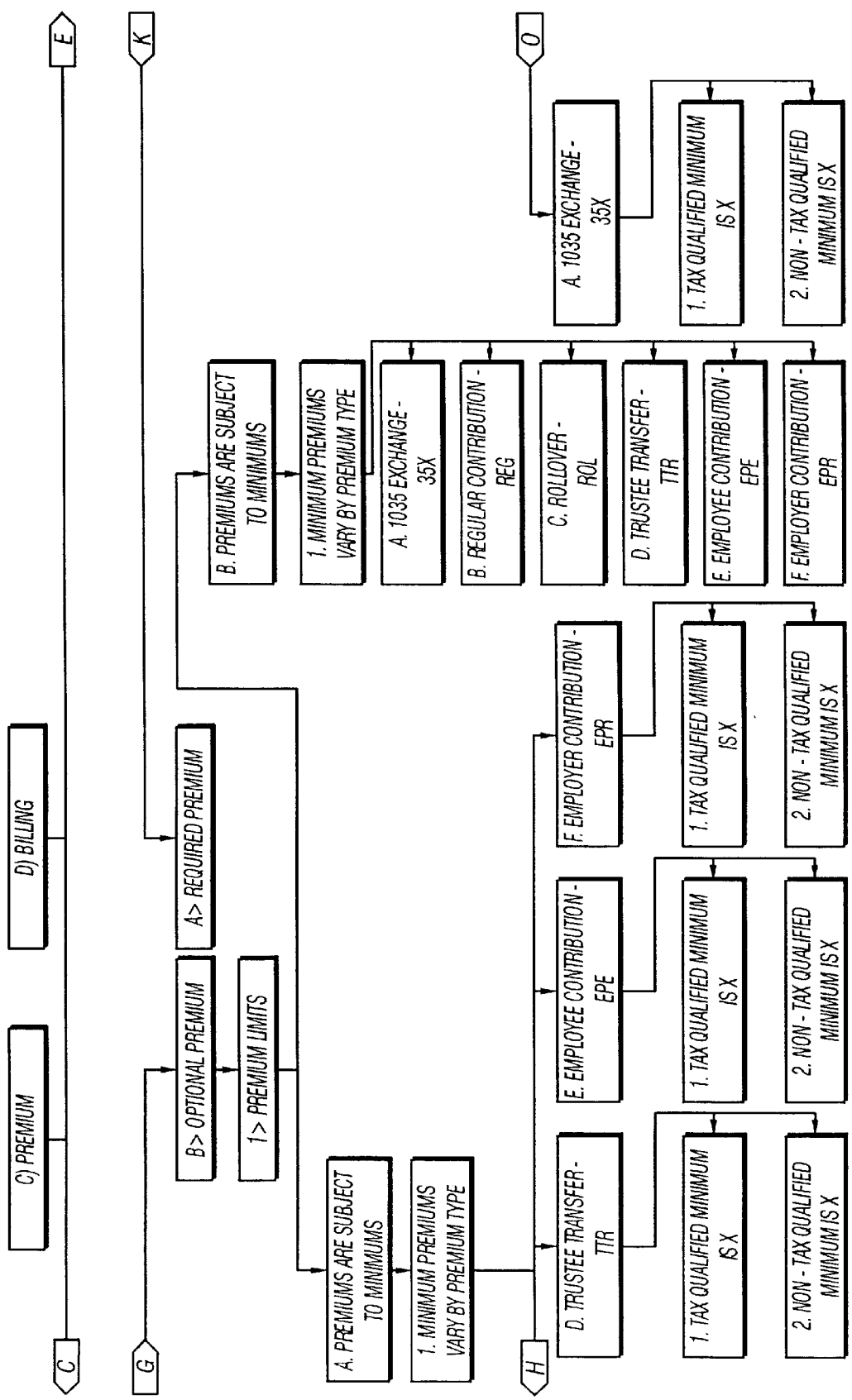
Figure 3L:
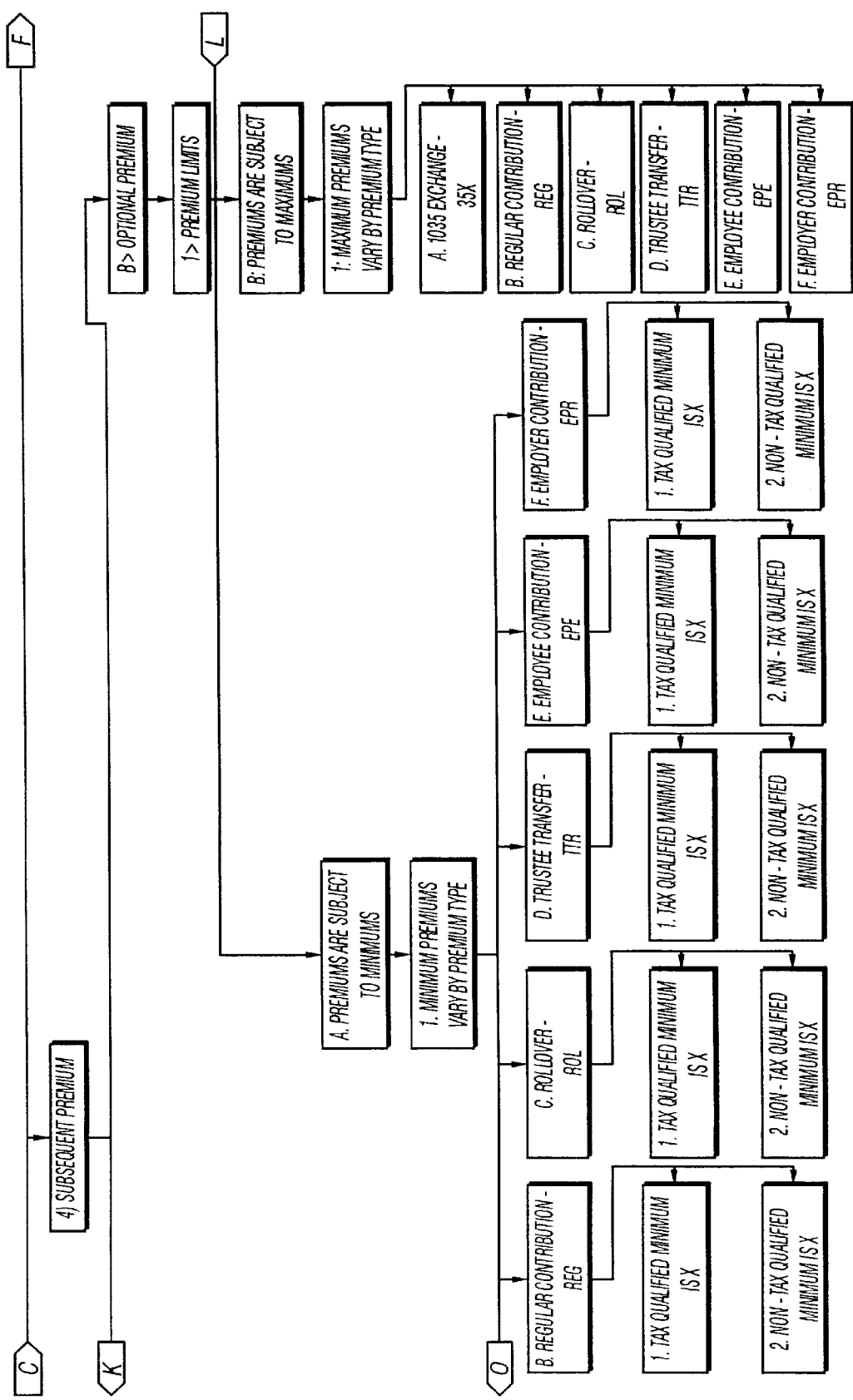
Figure 3M:
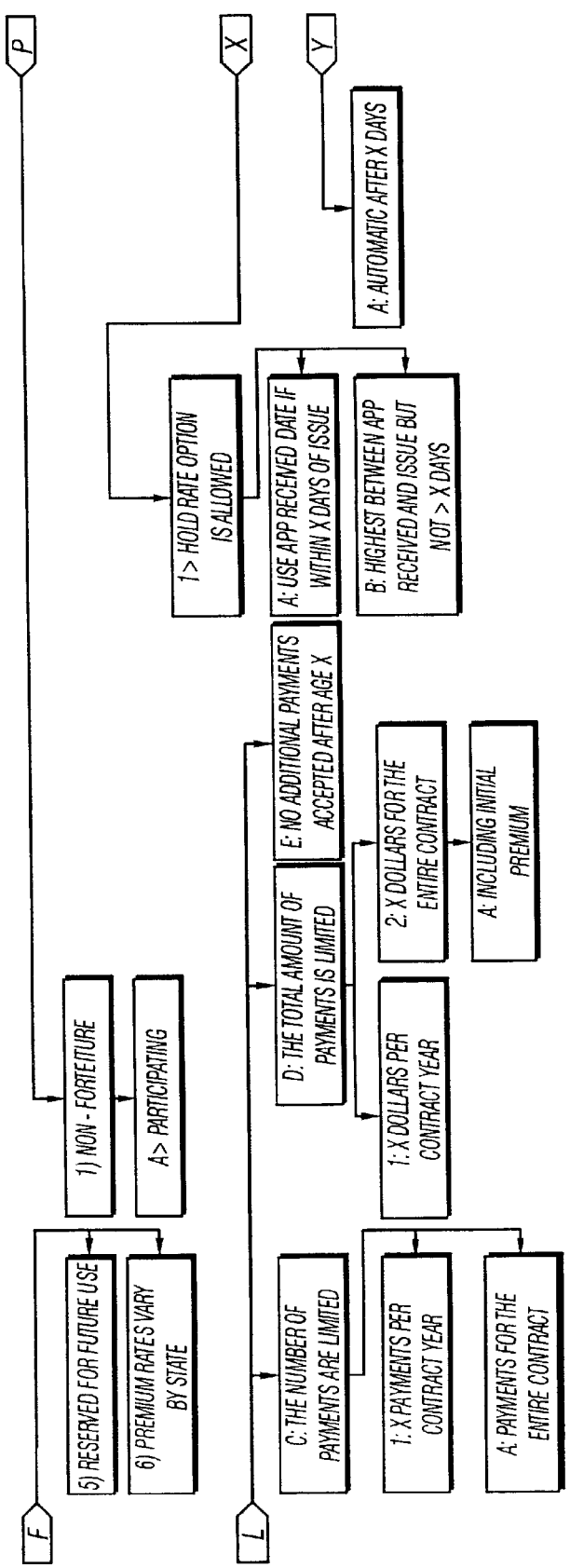
Figure 3N:
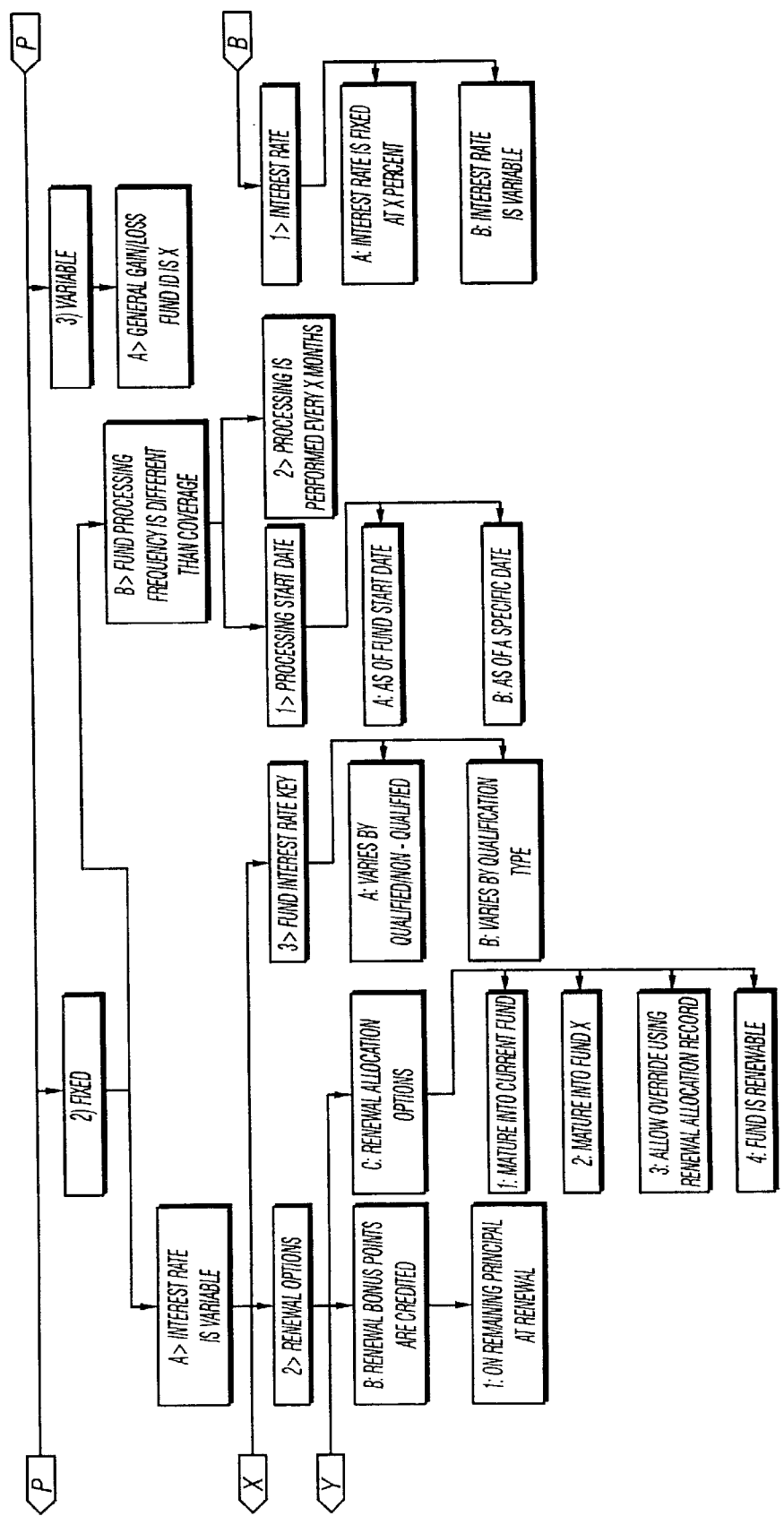
Figure 30:
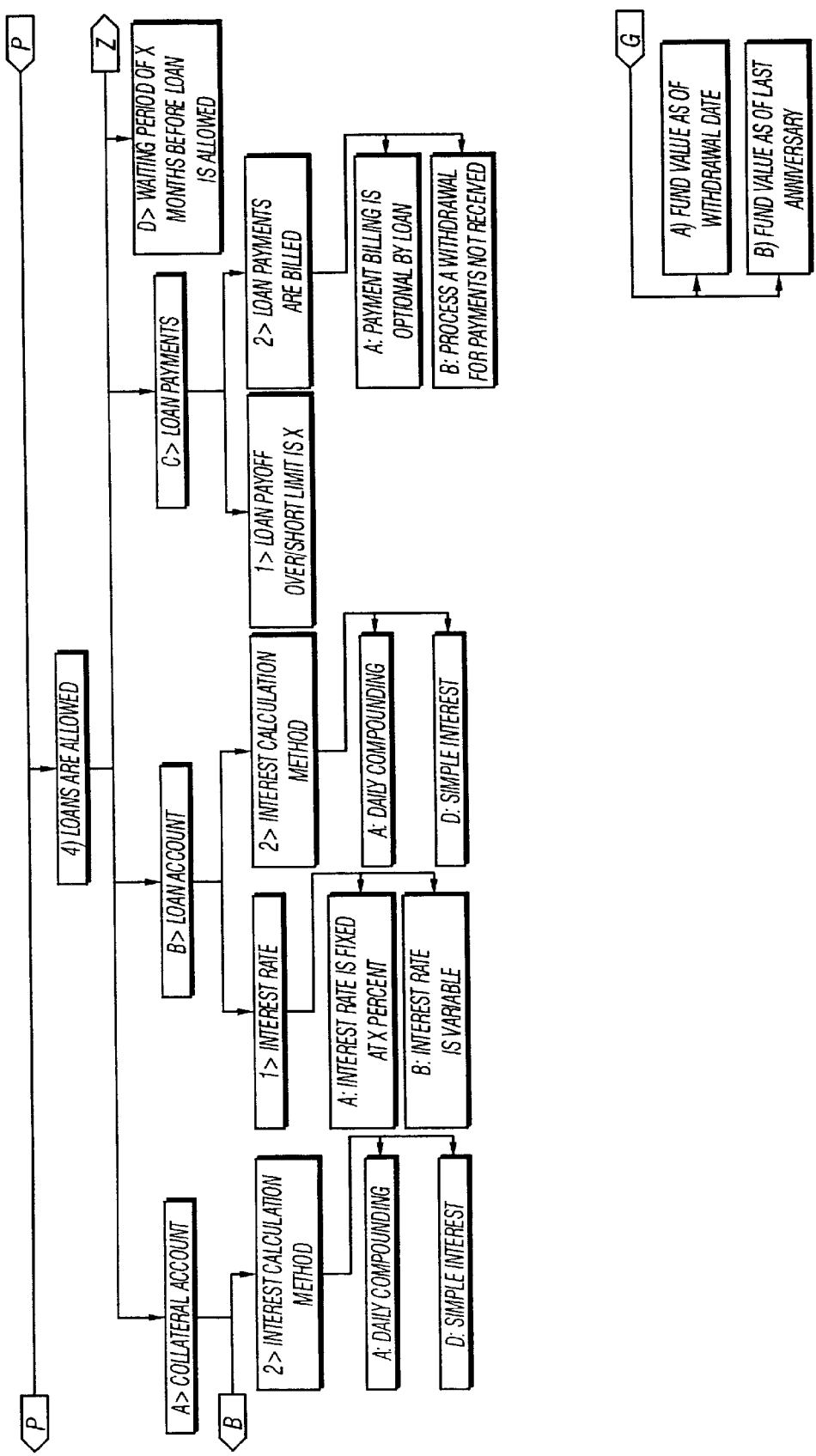
Figure 3P:
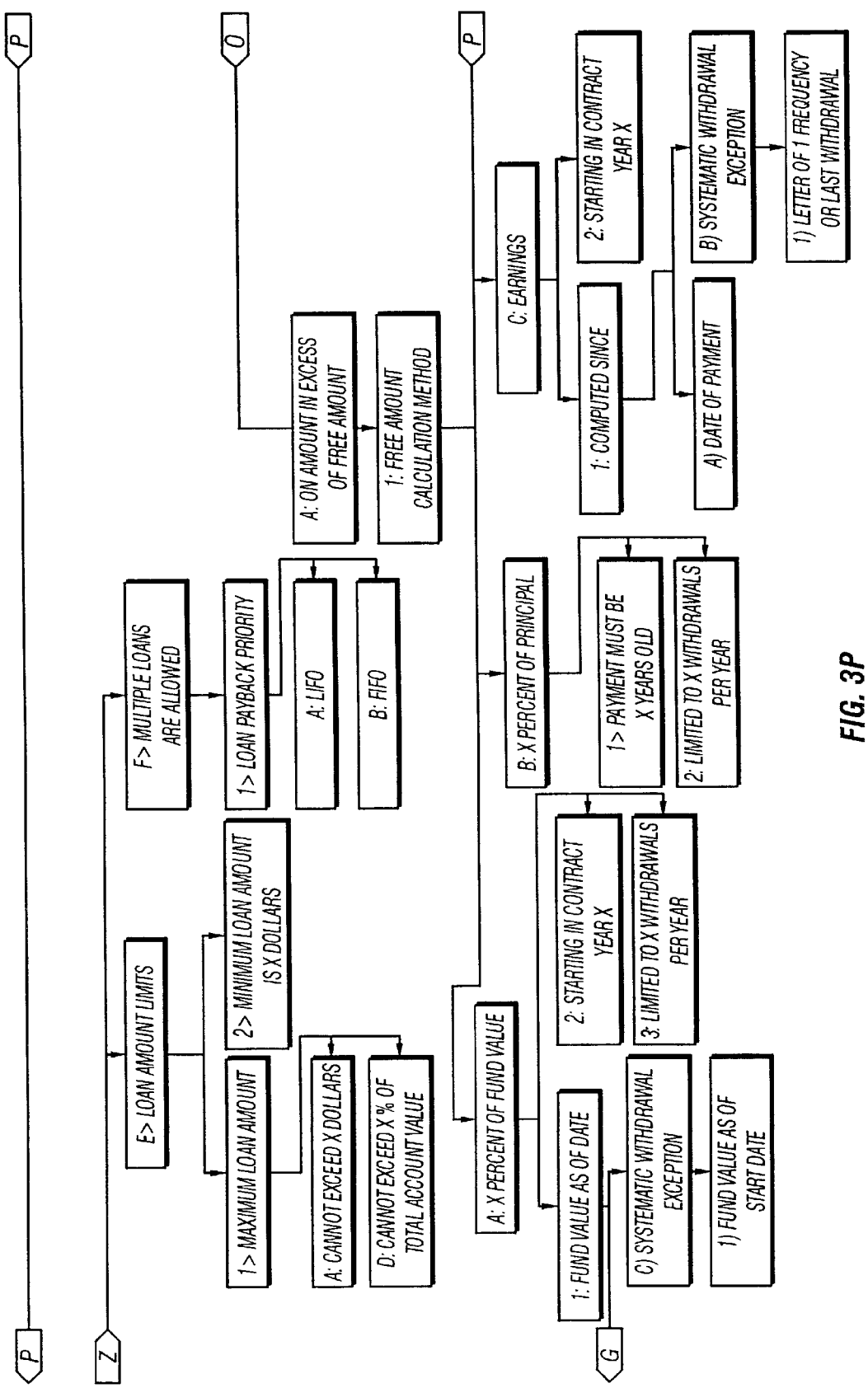
Figure 3Q:
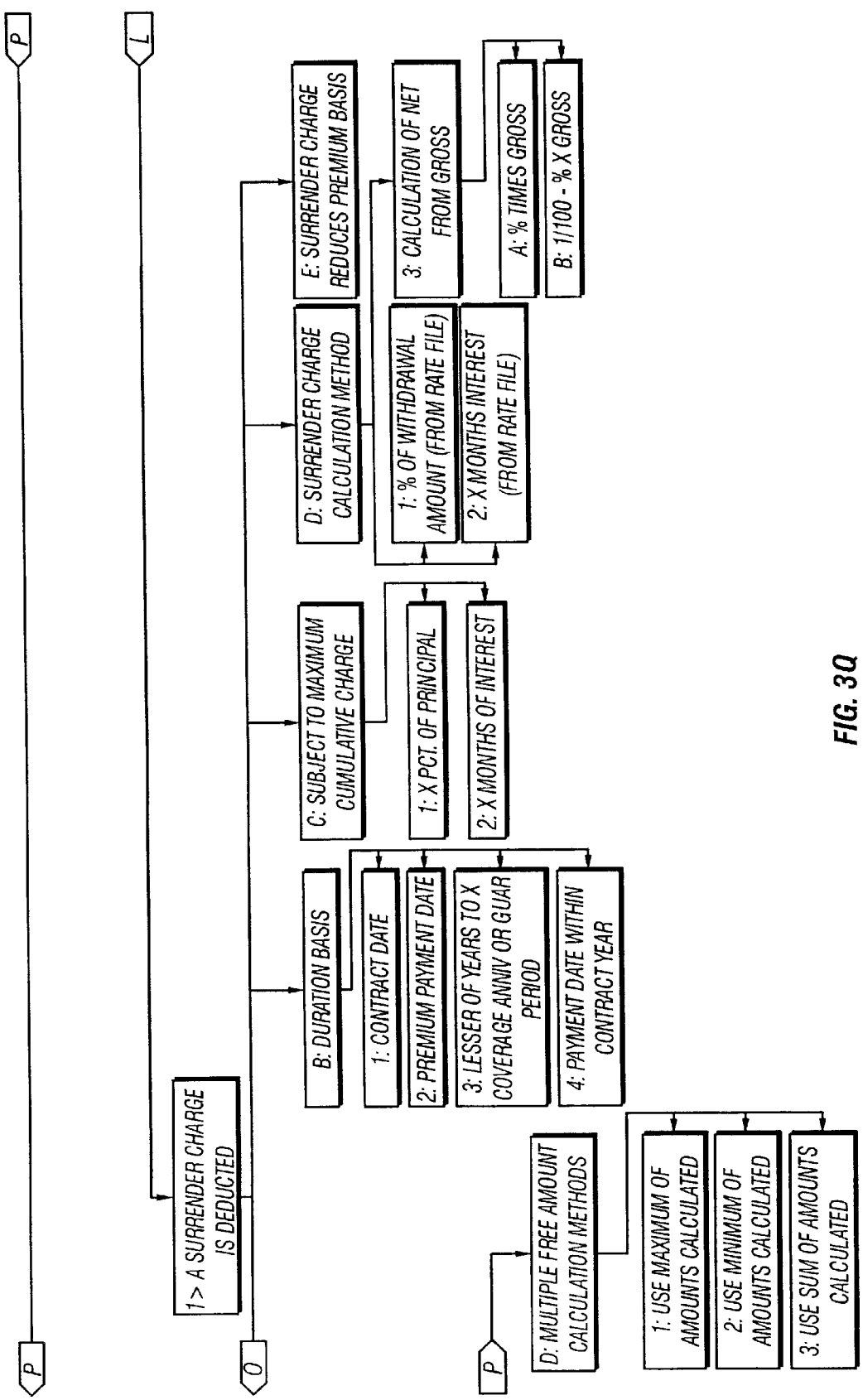
Figure 3R:
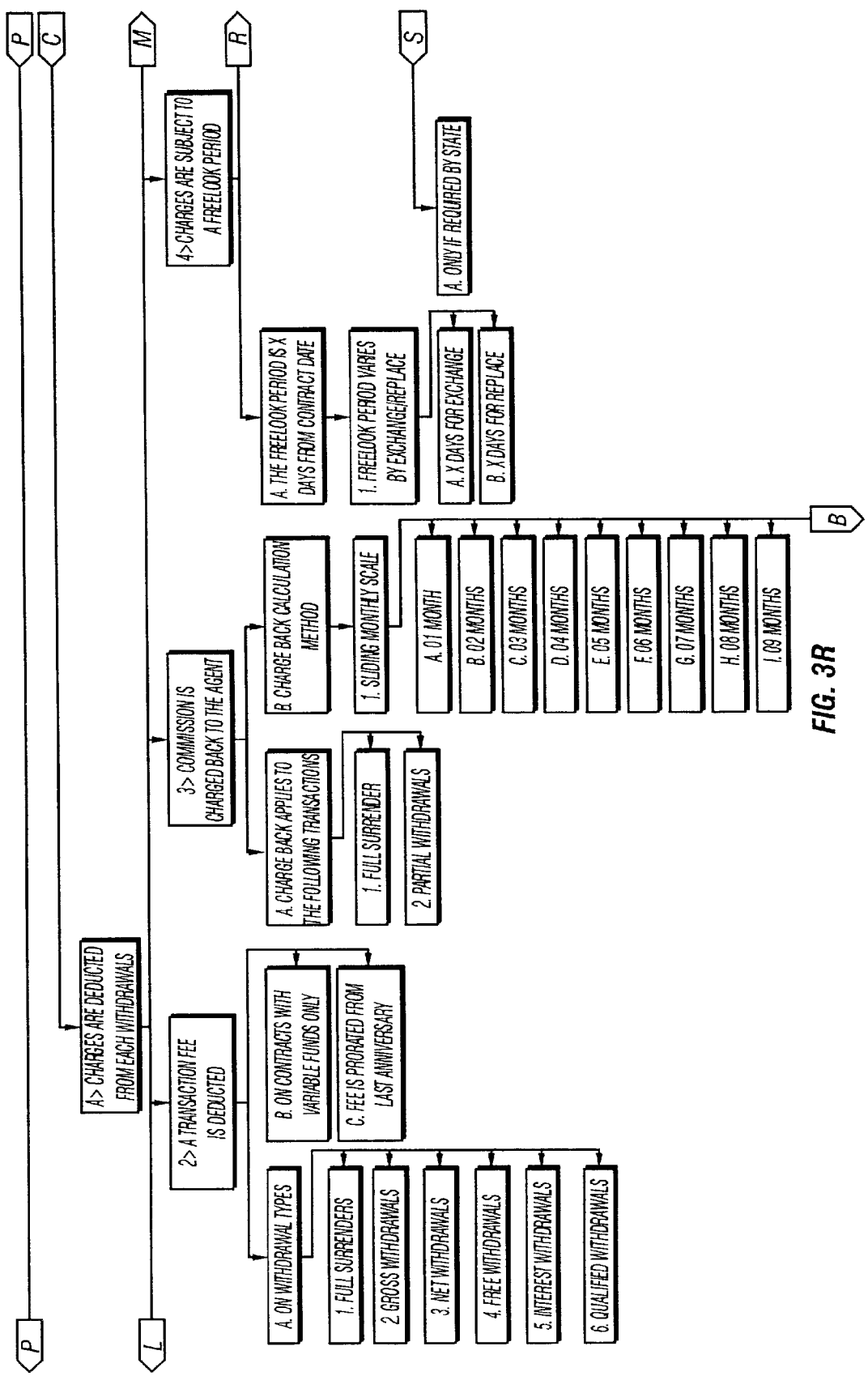
Figure 3S:
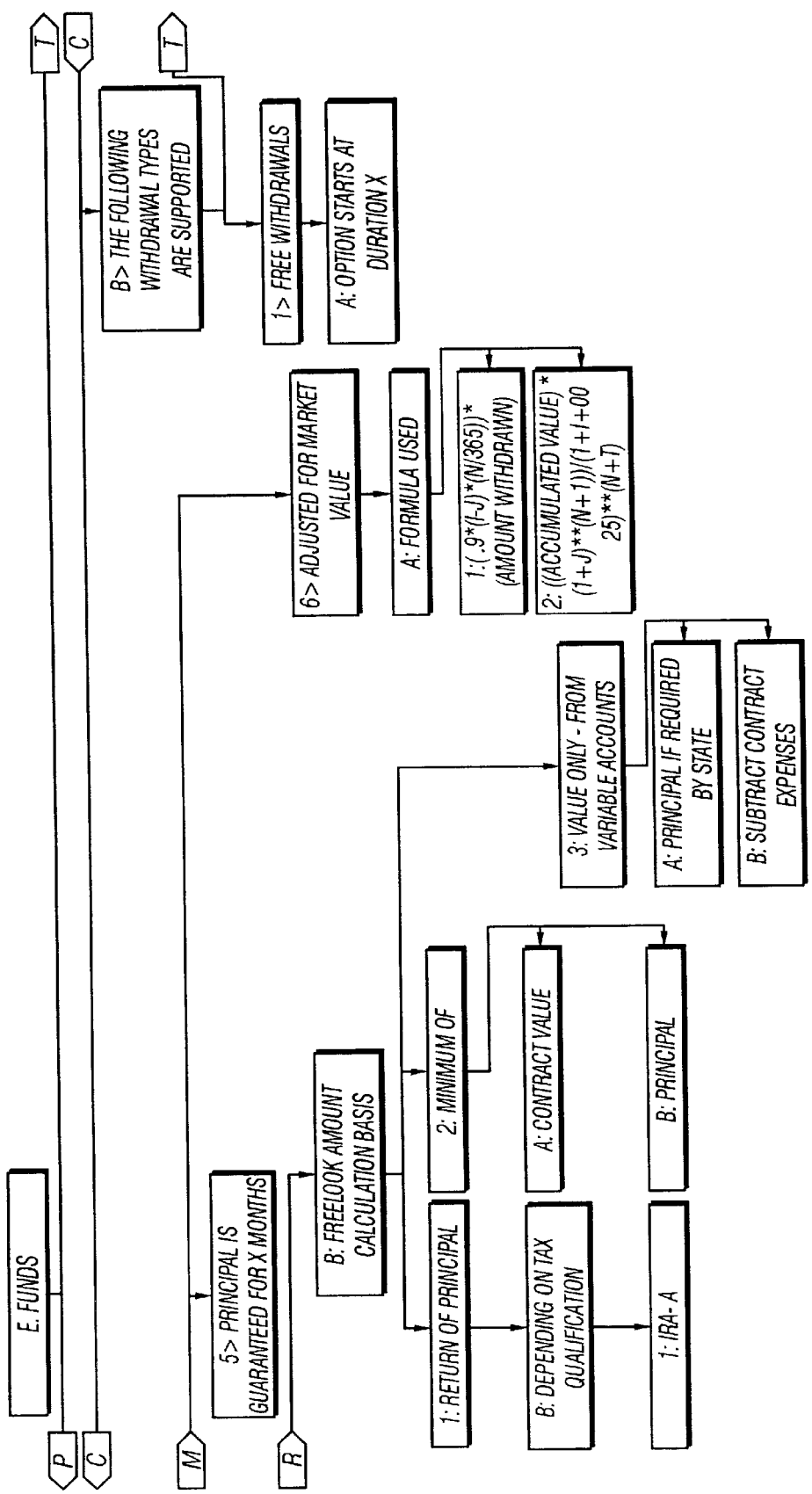
Figure 3T:
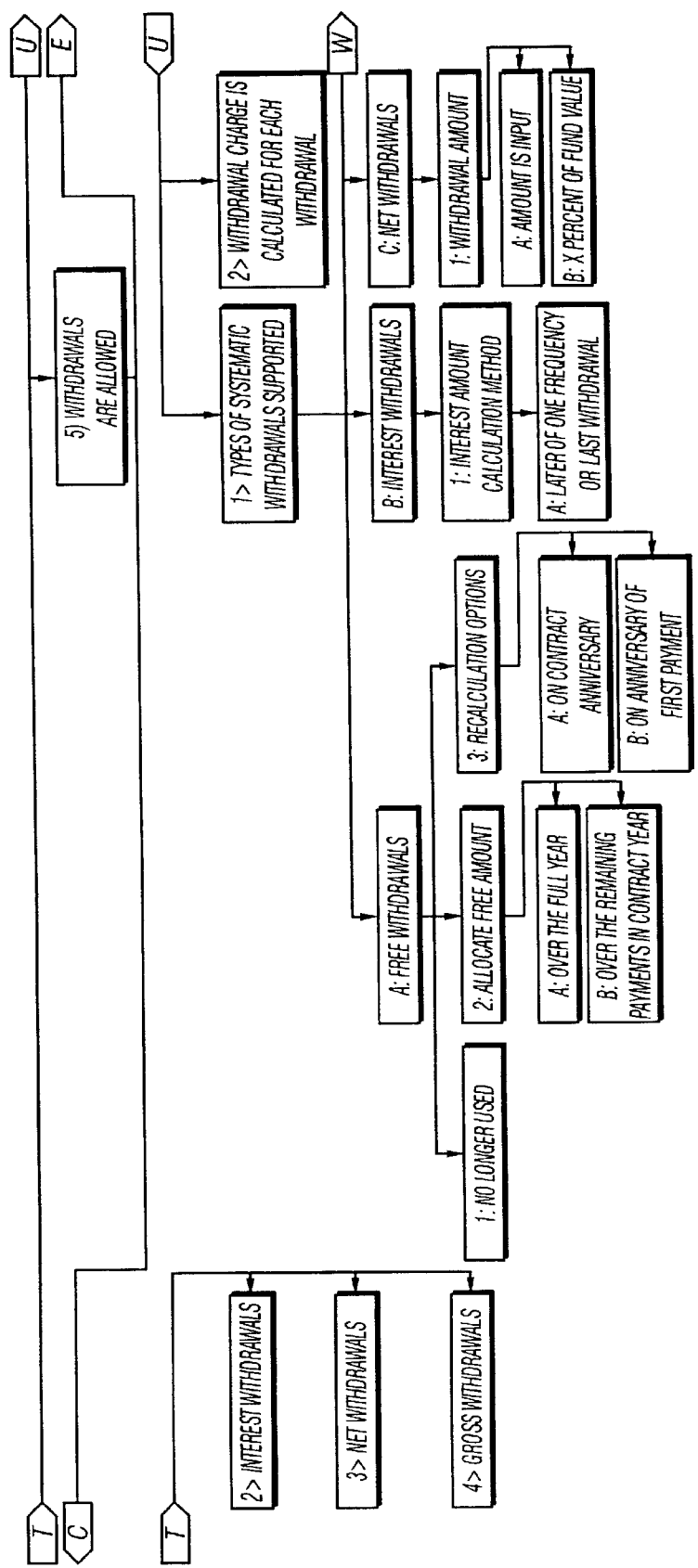
Figure 3U:
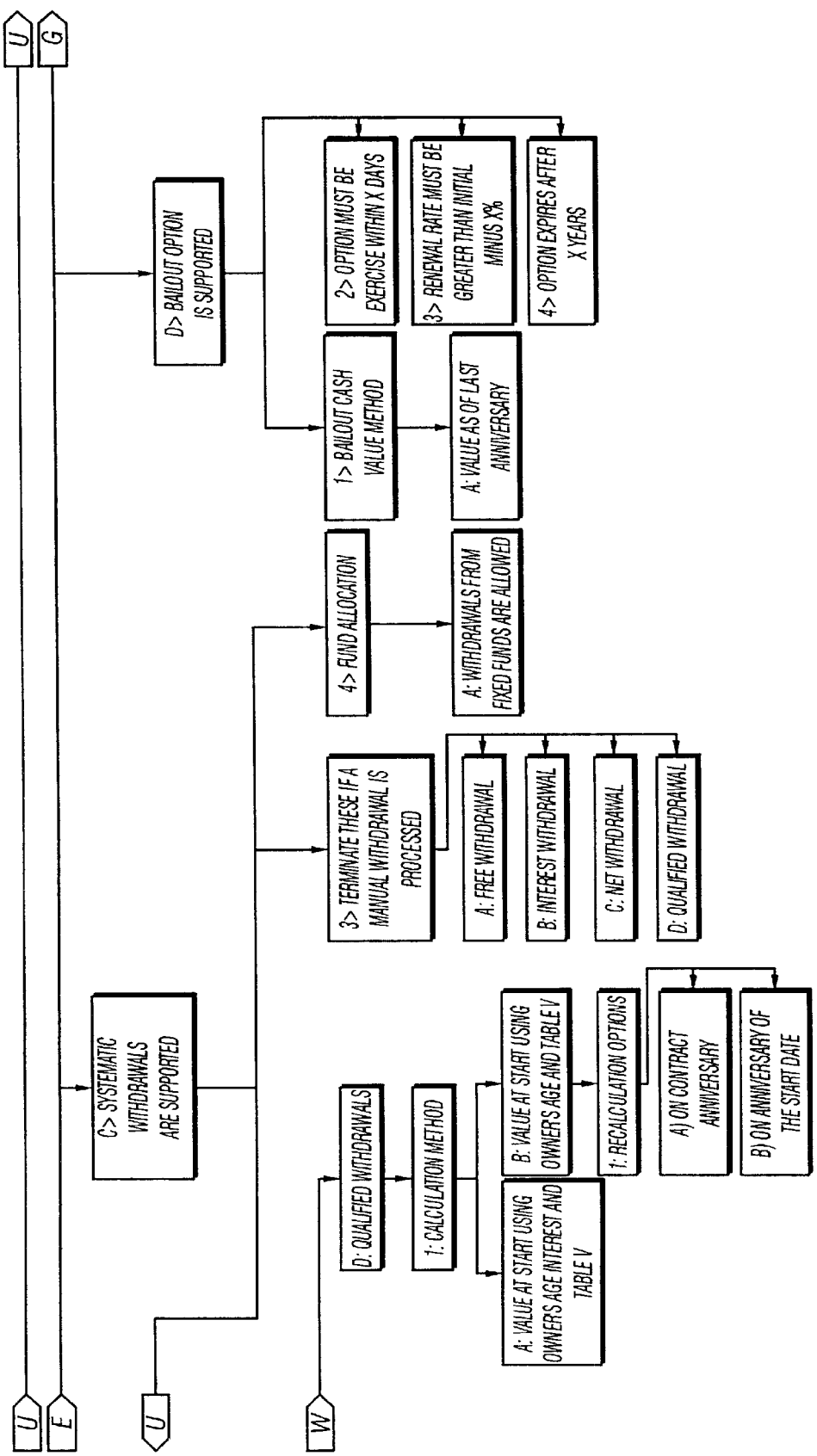
Figure 3V:
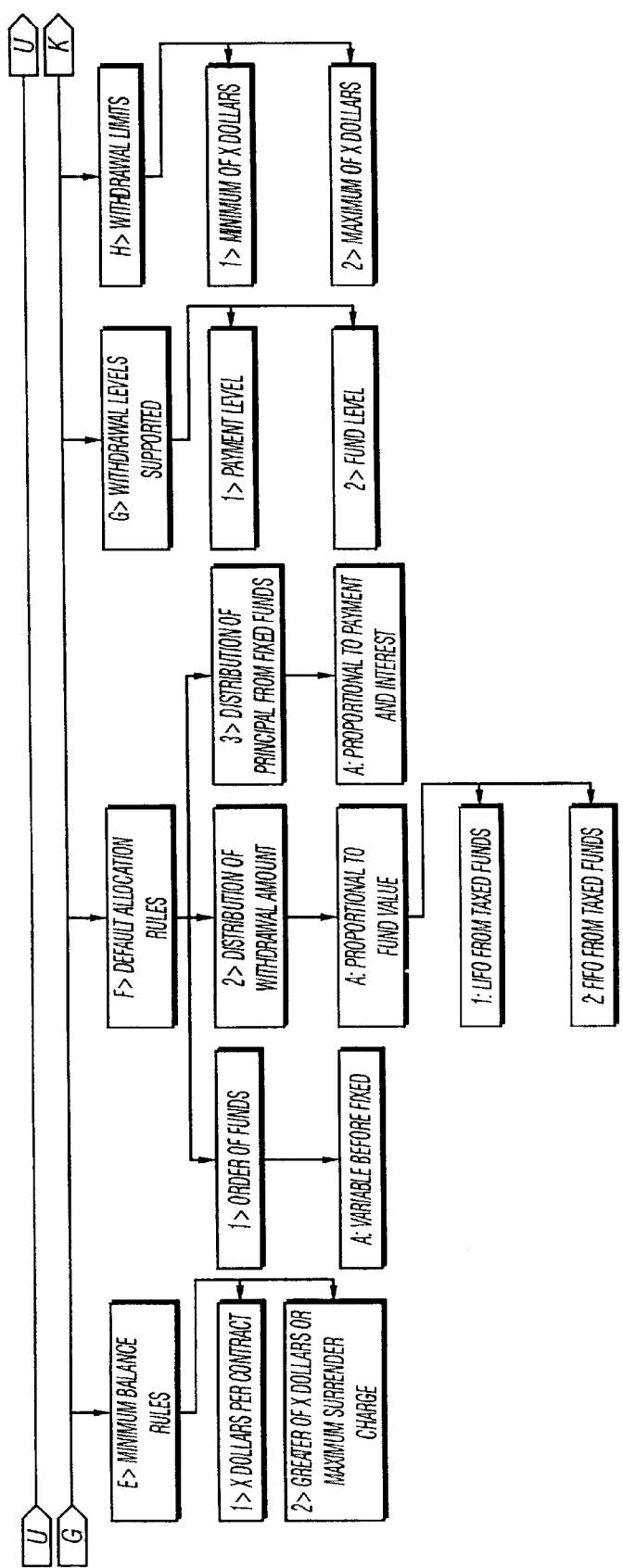
Figure 3W:
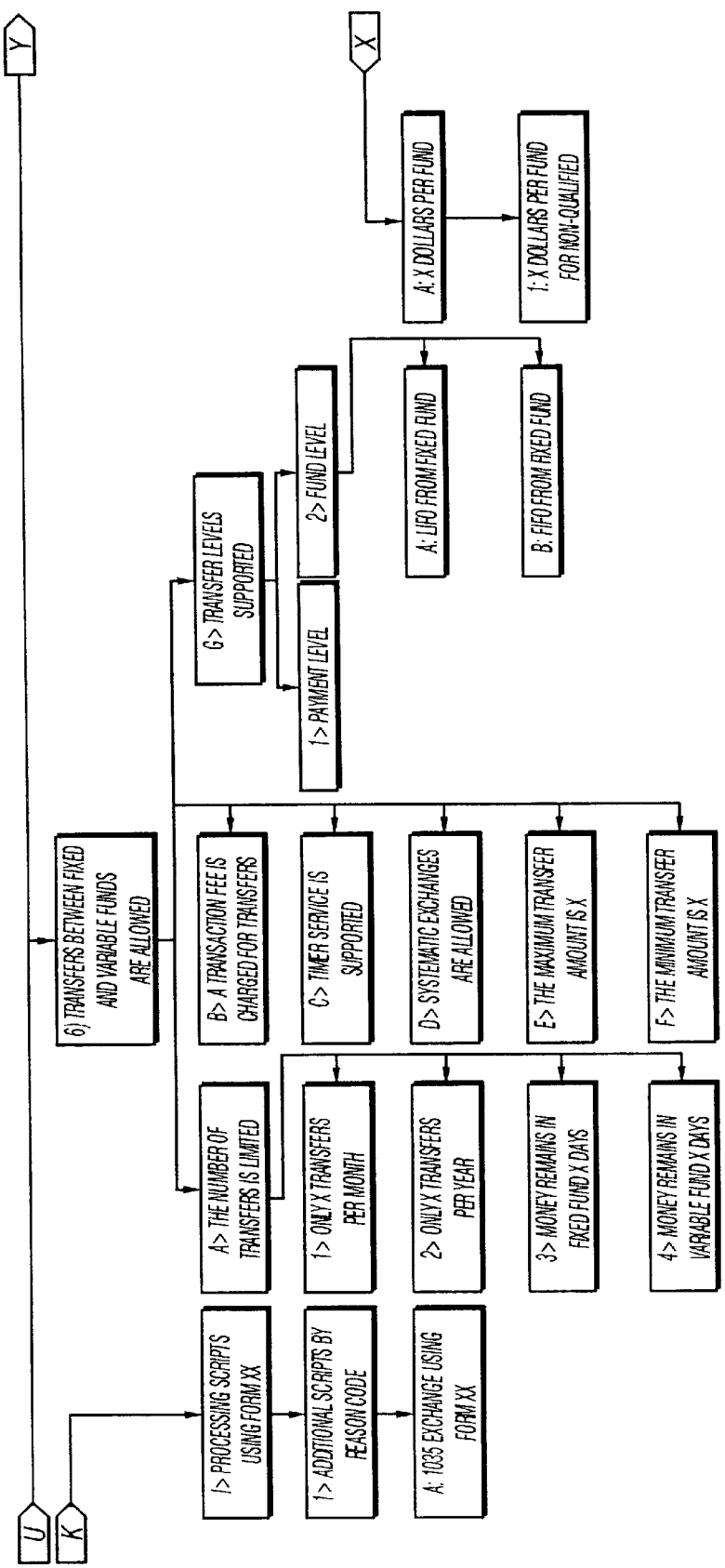
Figure 3X:
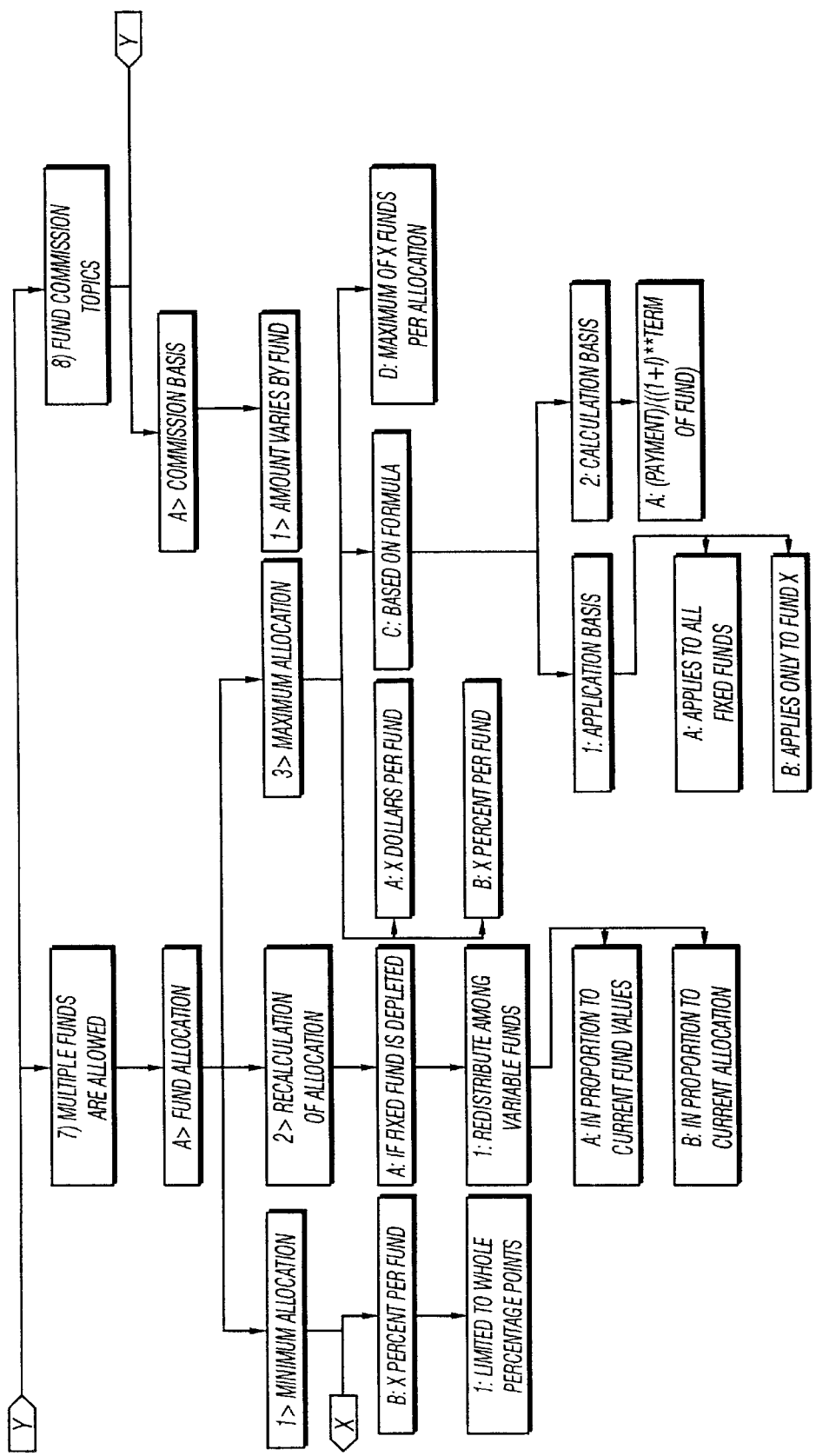
Figure 3Y:
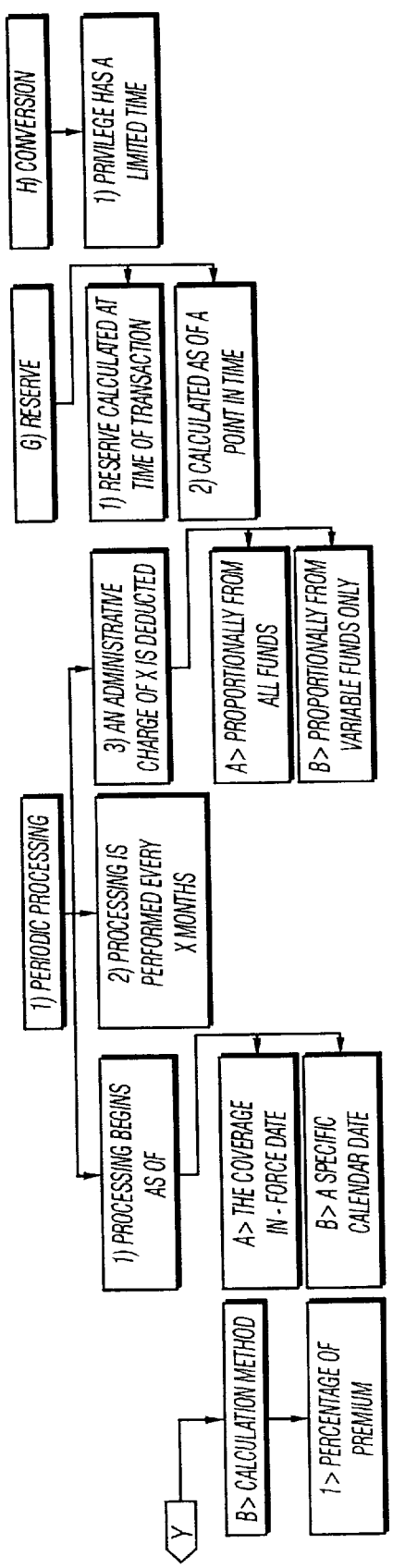
Figure 3Z:
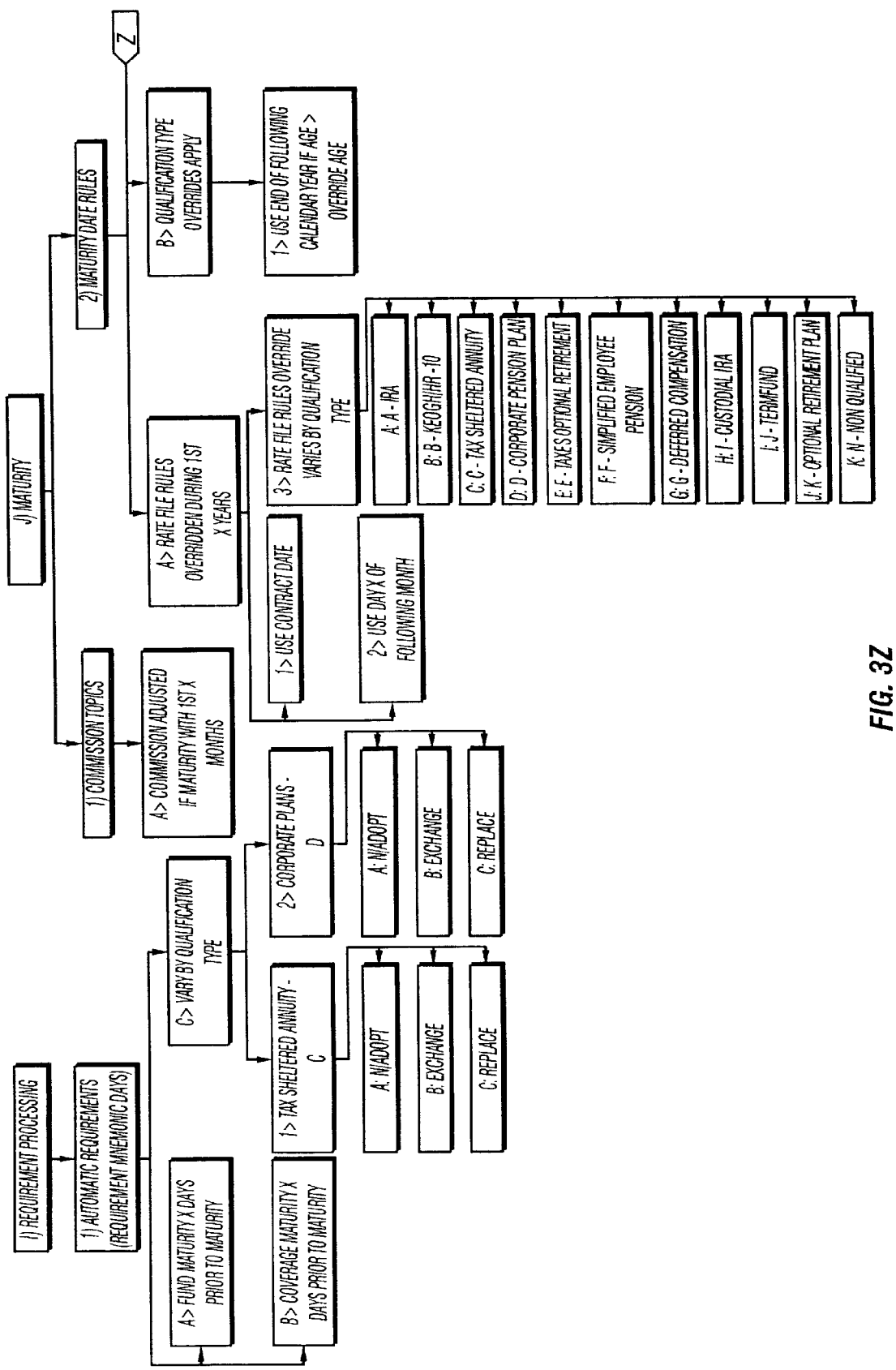
Figure 3A:
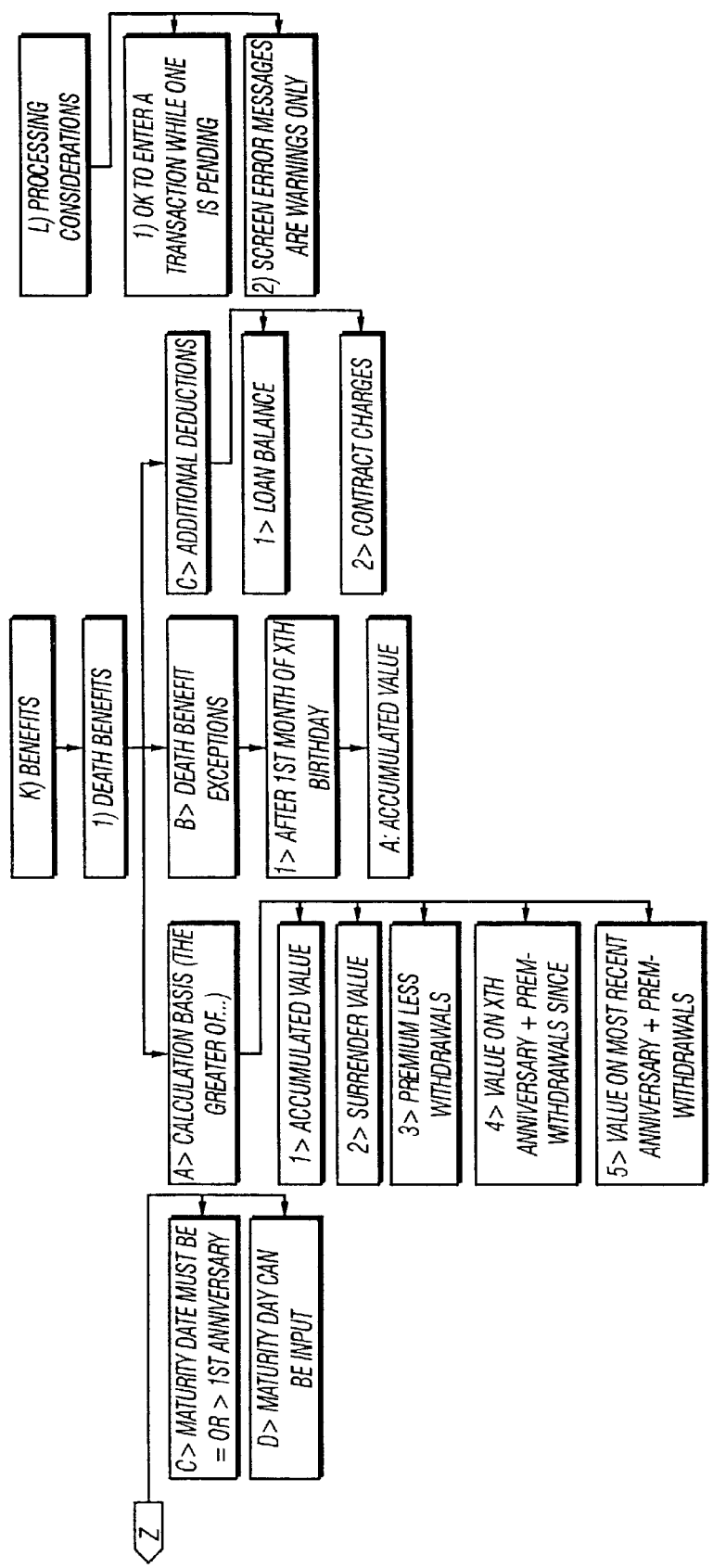
Figure 4A:
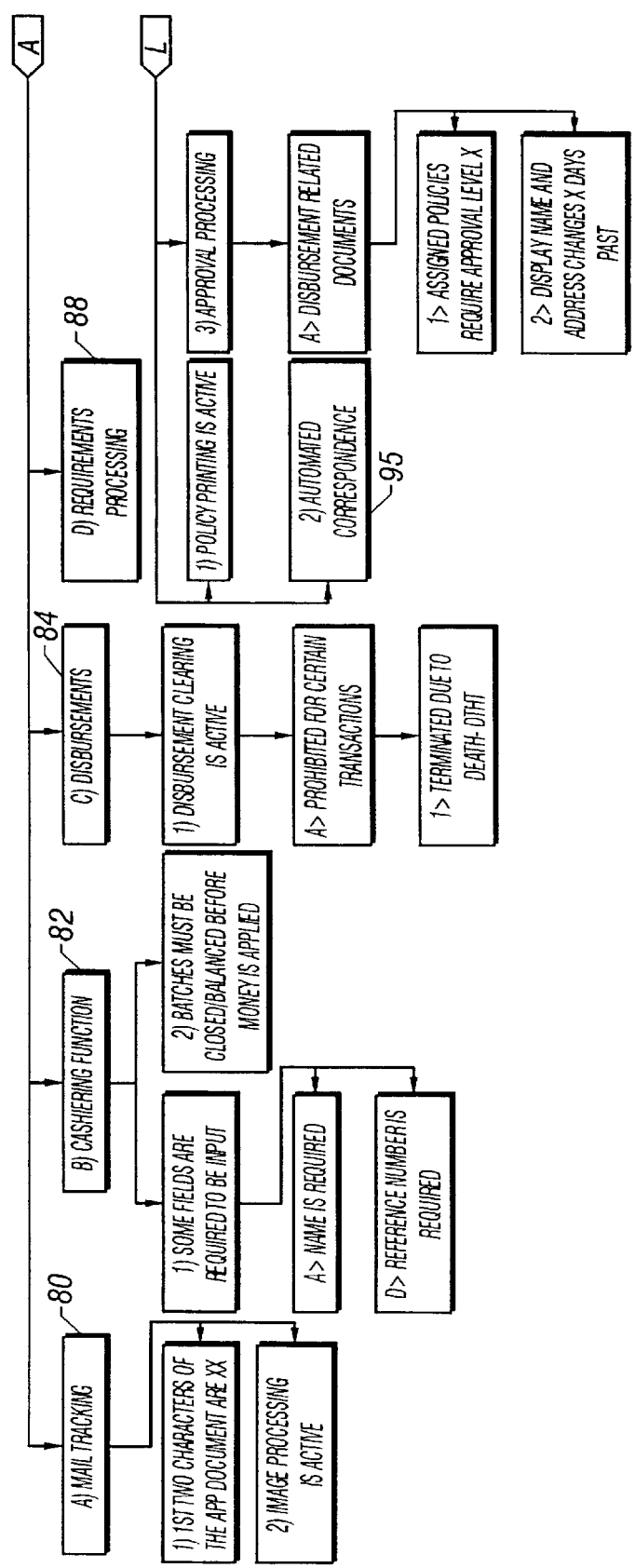
Figure 4B:
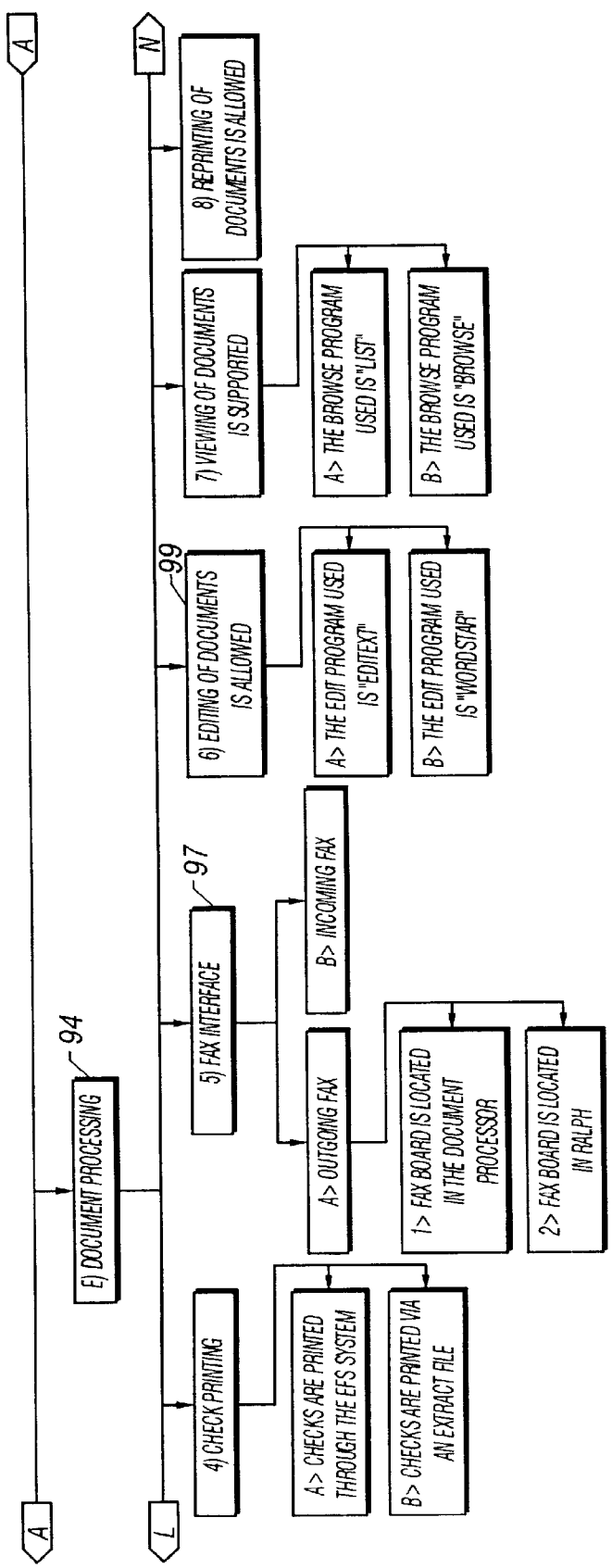
Figure 4C:
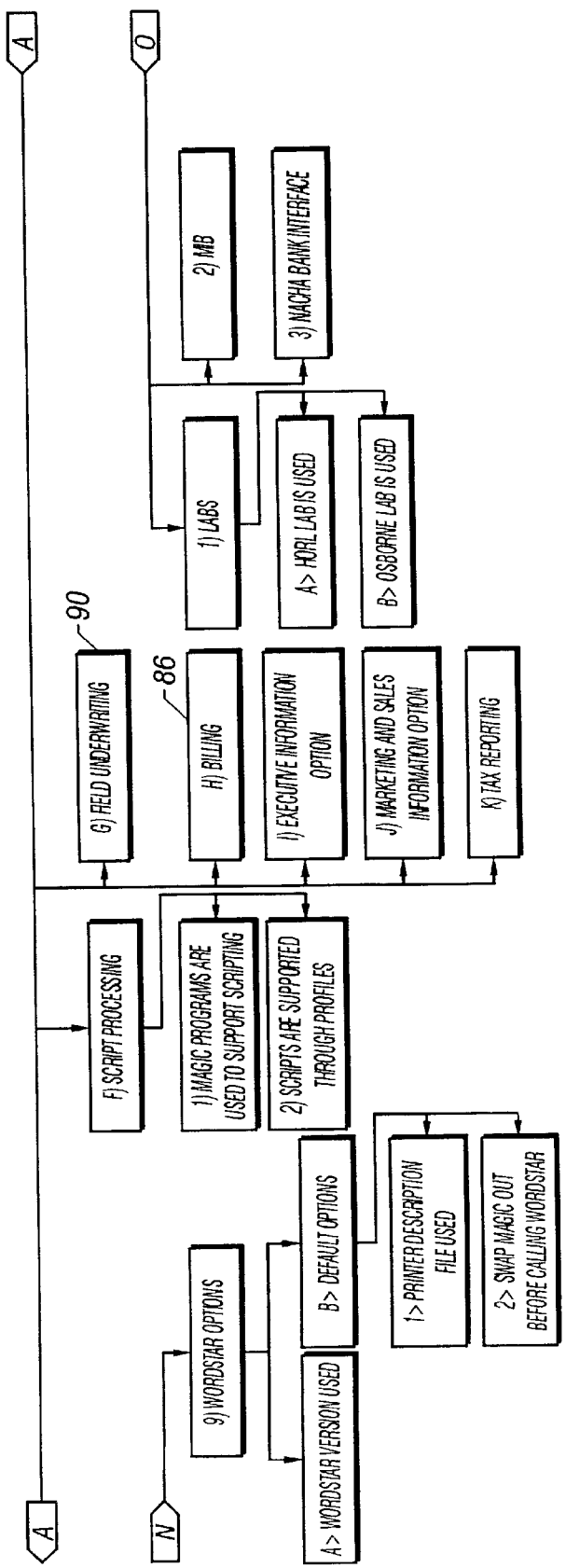
Figure 4D:
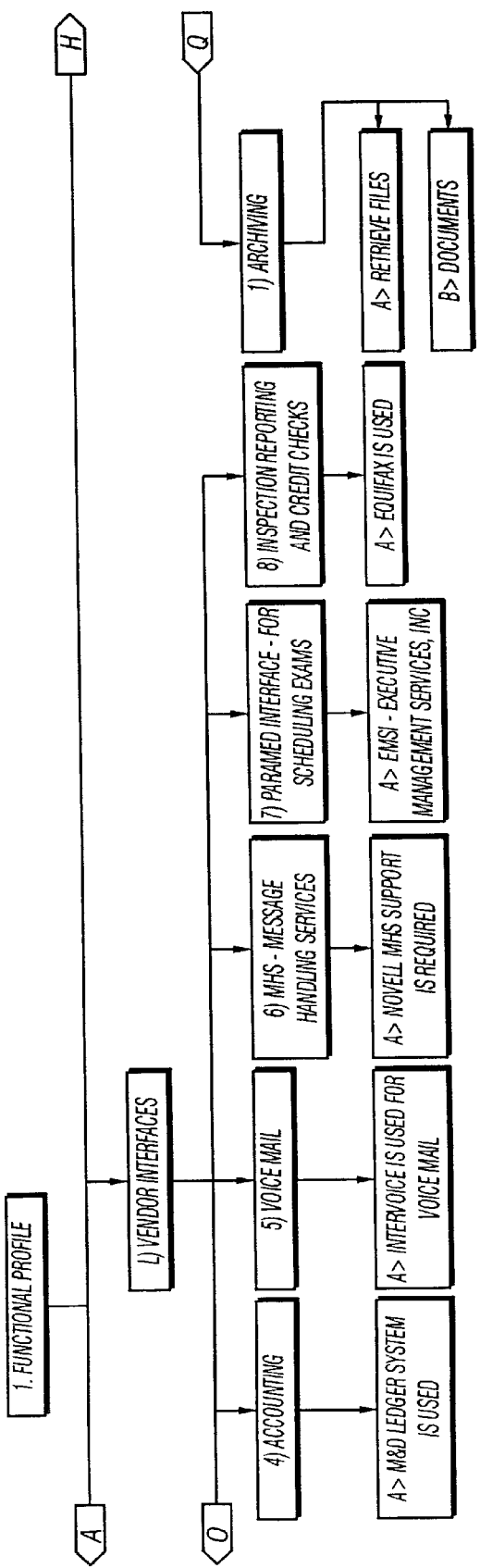
Figure 4F:
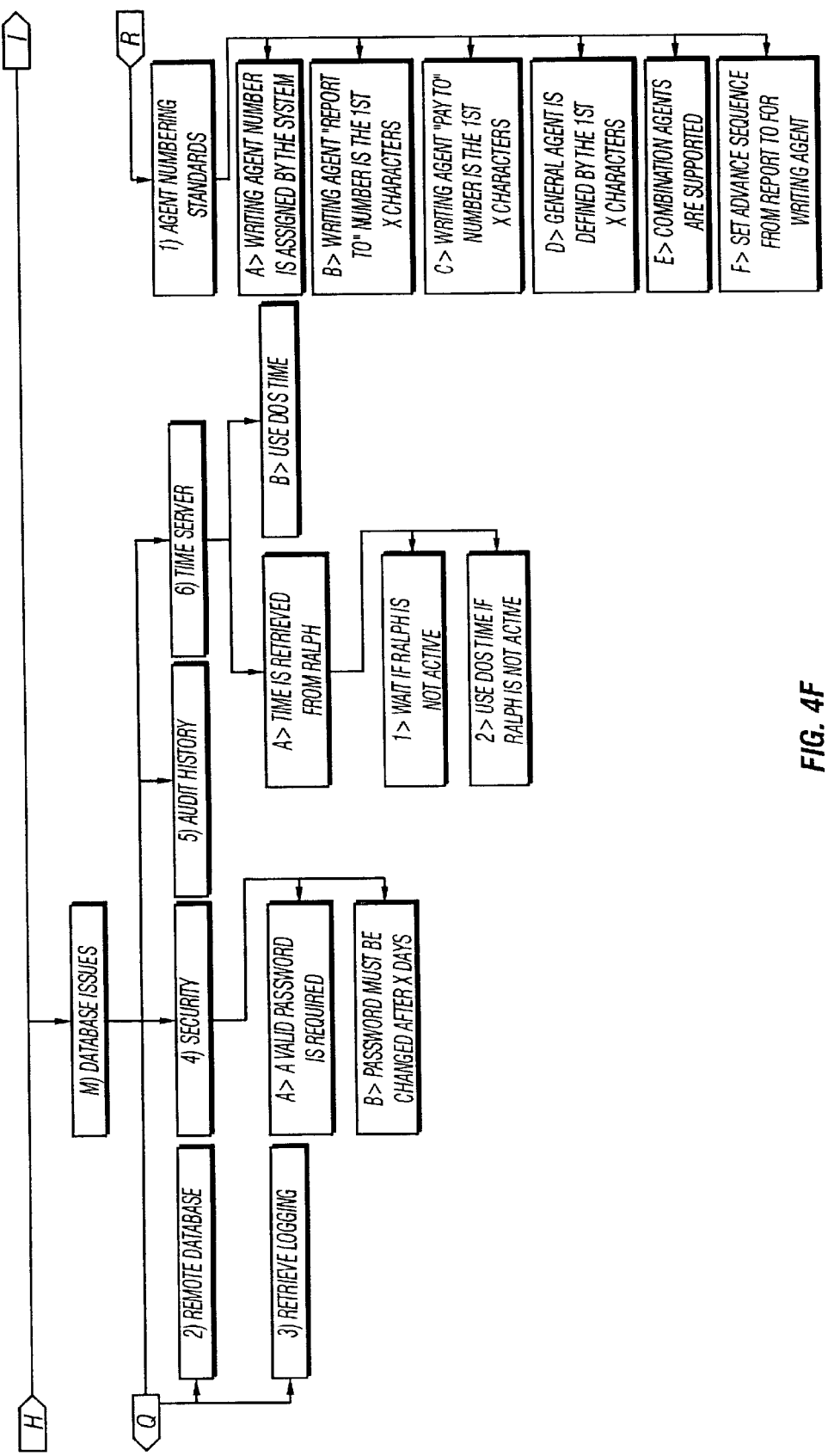
Figure 4G:
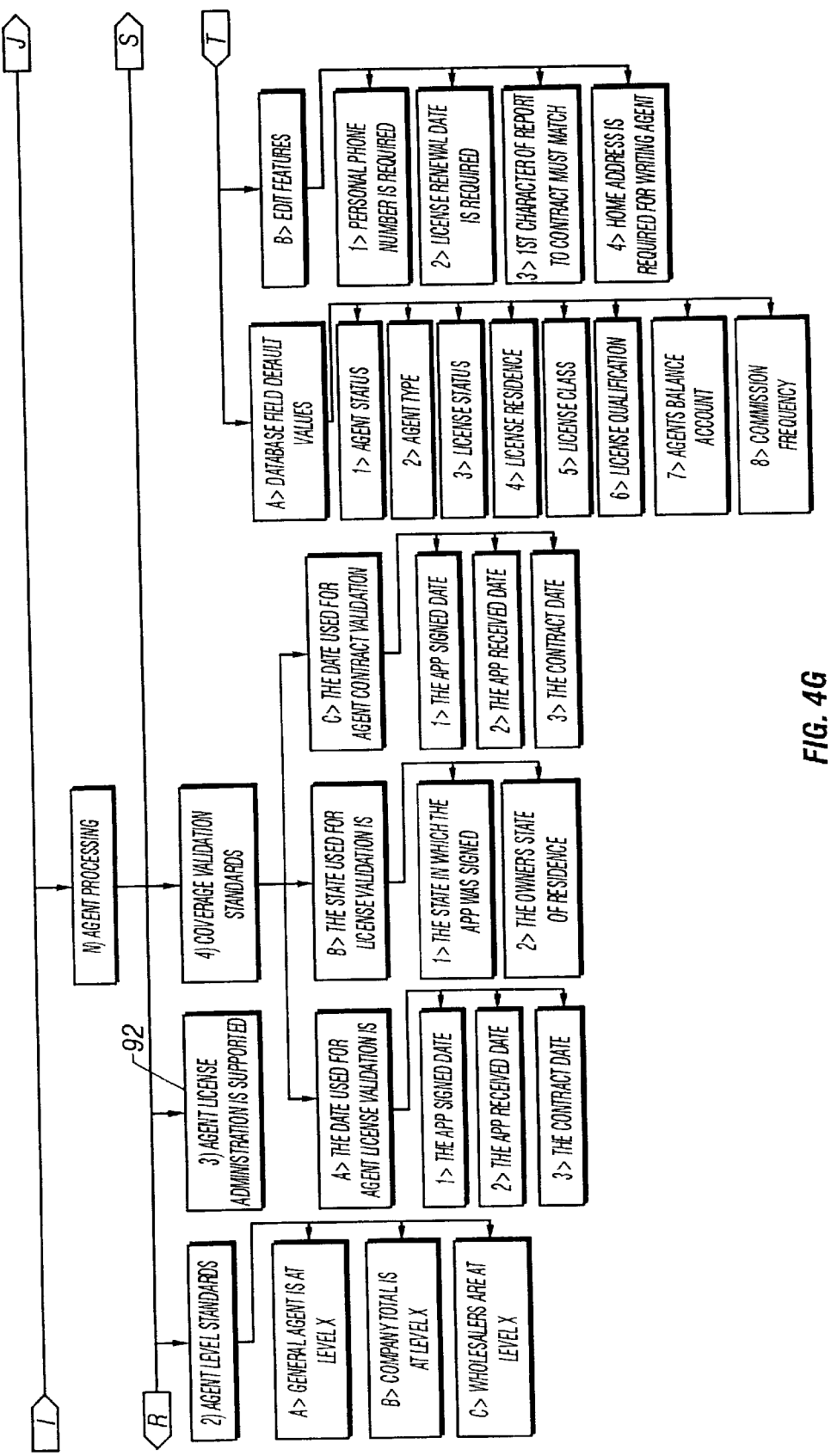
Figure 4H:
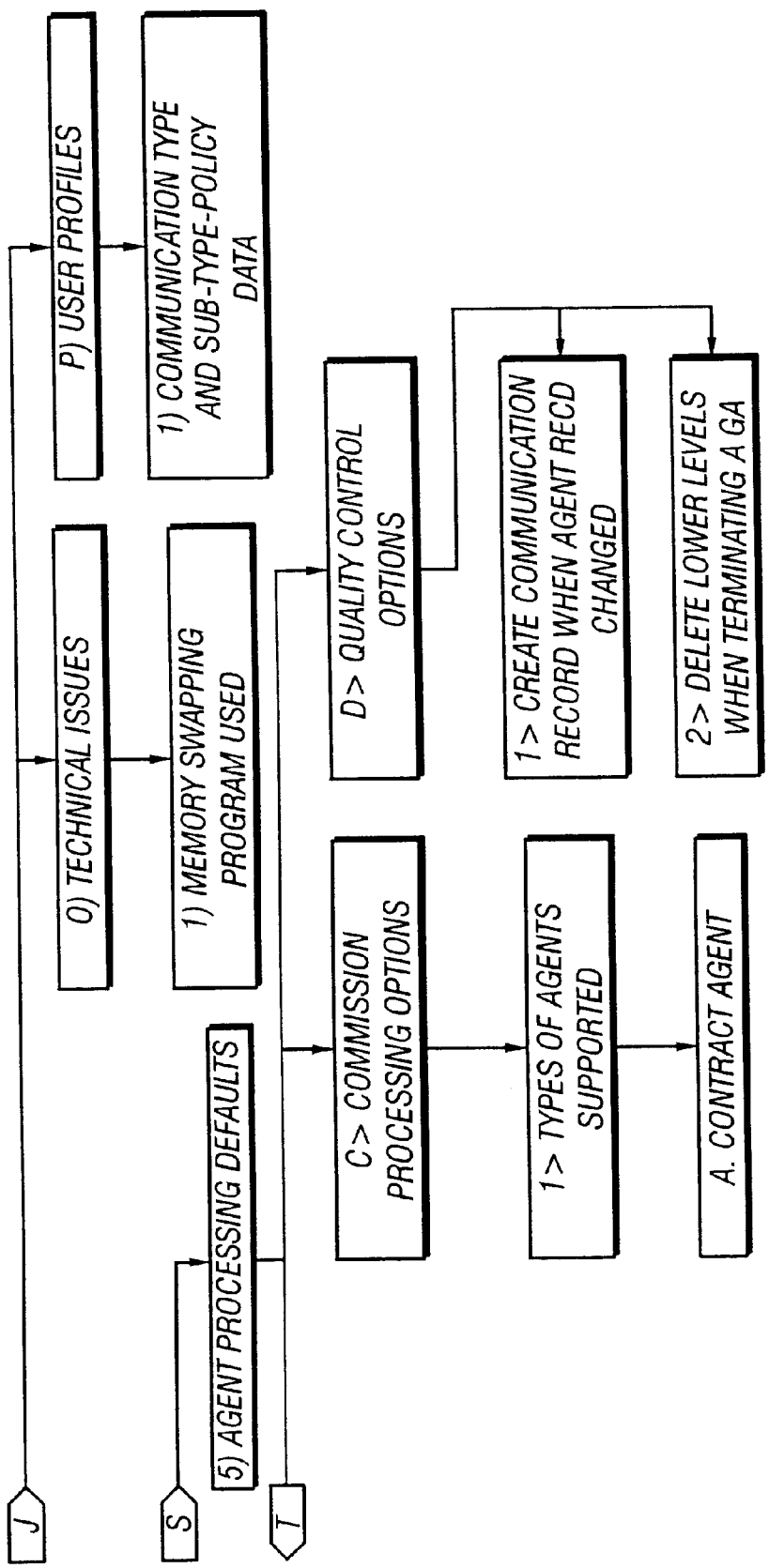
Figure 5A:
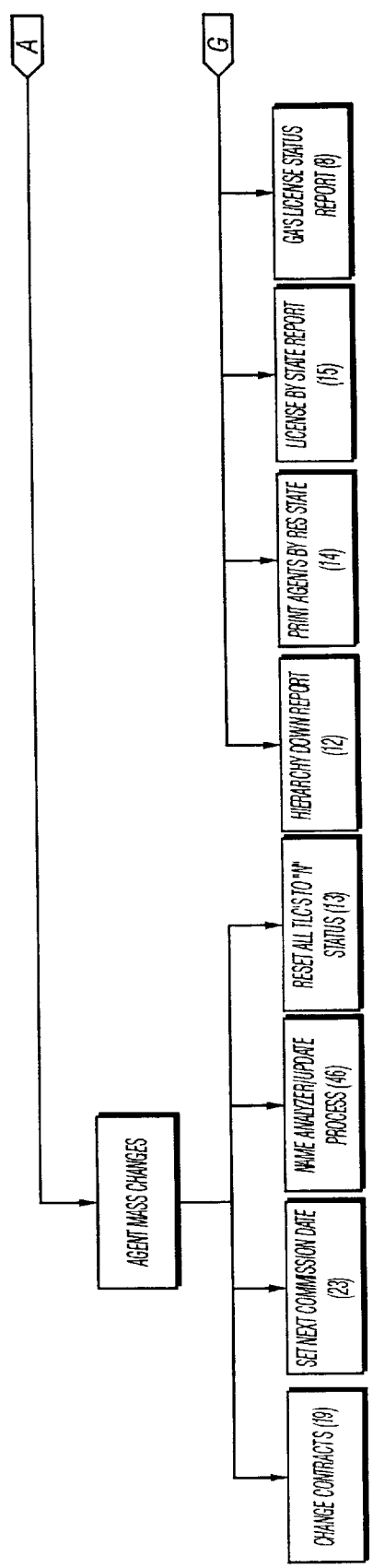
FIGS. 5a–f of the drawings is a singular flow chart illustrating Programs in Reports screen options.
Figure 5B:
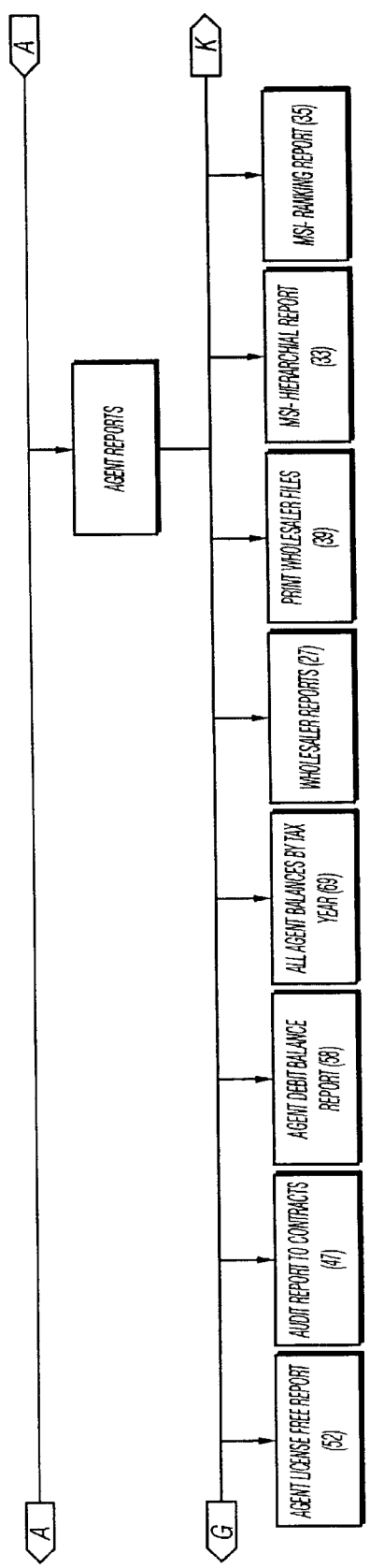
Figure 5C:
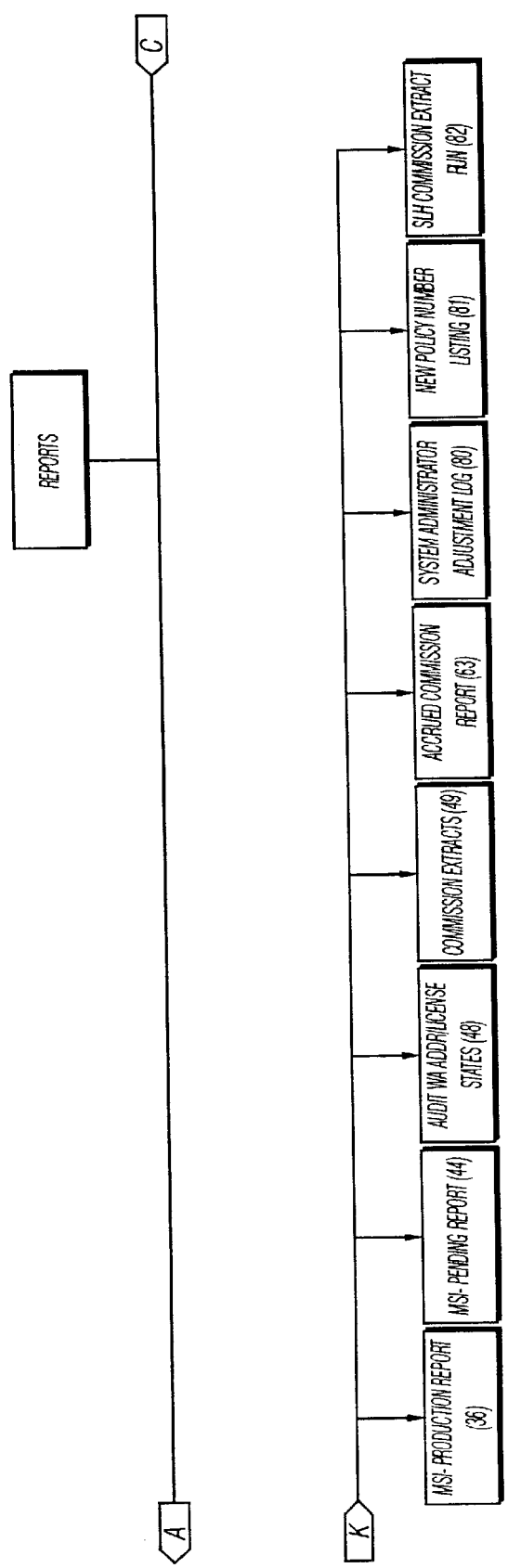
Figure 5D:
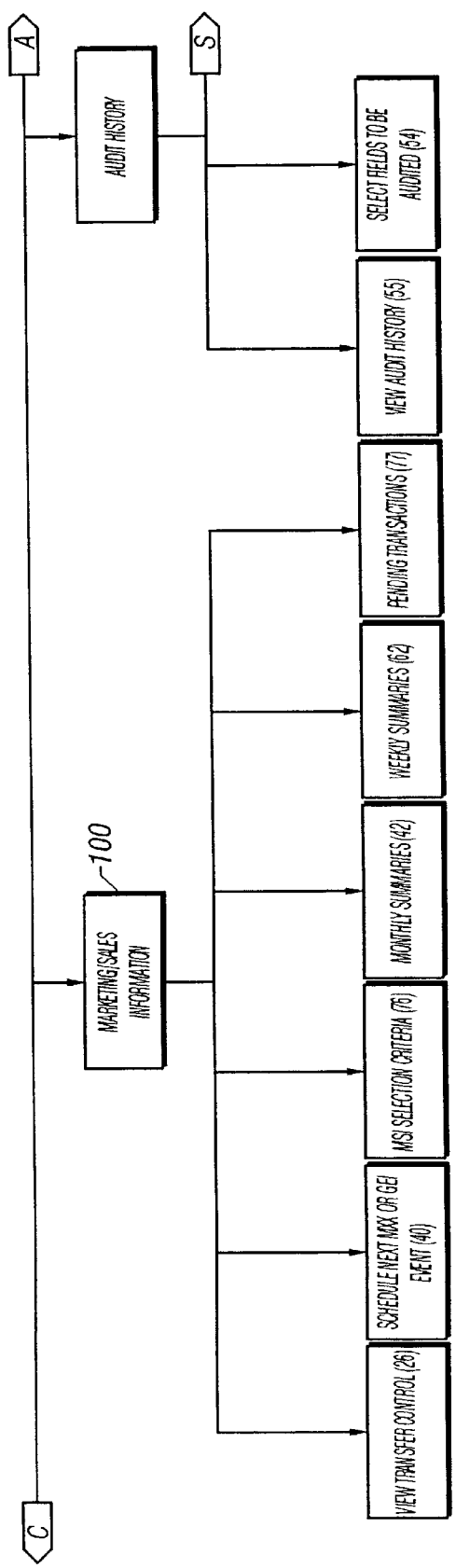
Figure 5E:
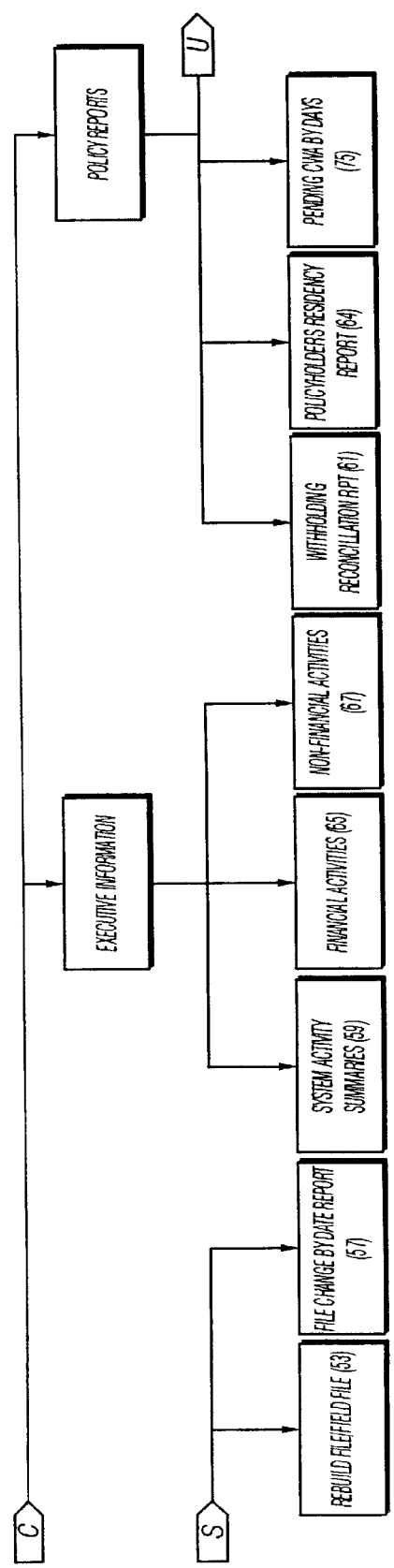
Figure 5F:
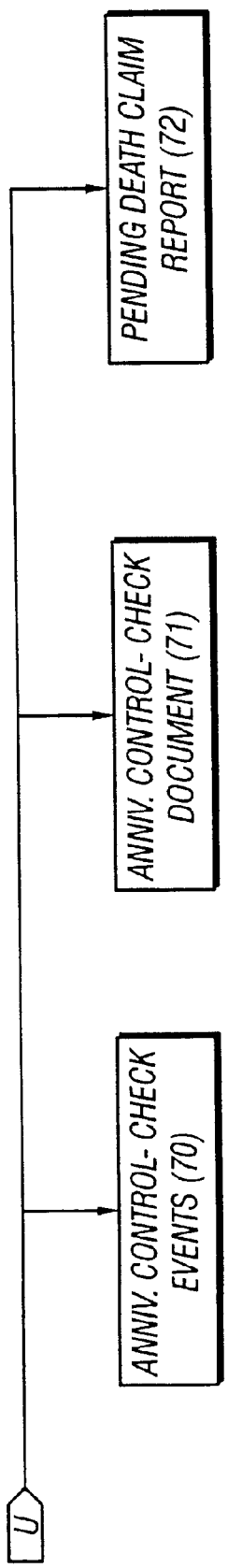
Figure 6A:
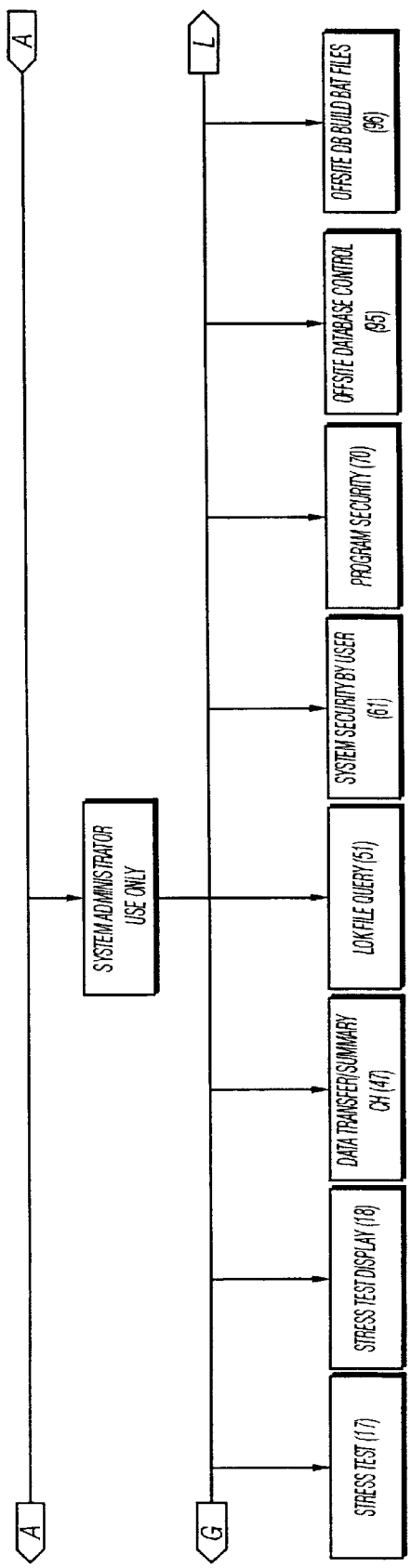
FIGS. 6a–h of the drawings is a singular flow chart illustrating Programs in Company screen options.
Figure 6B:
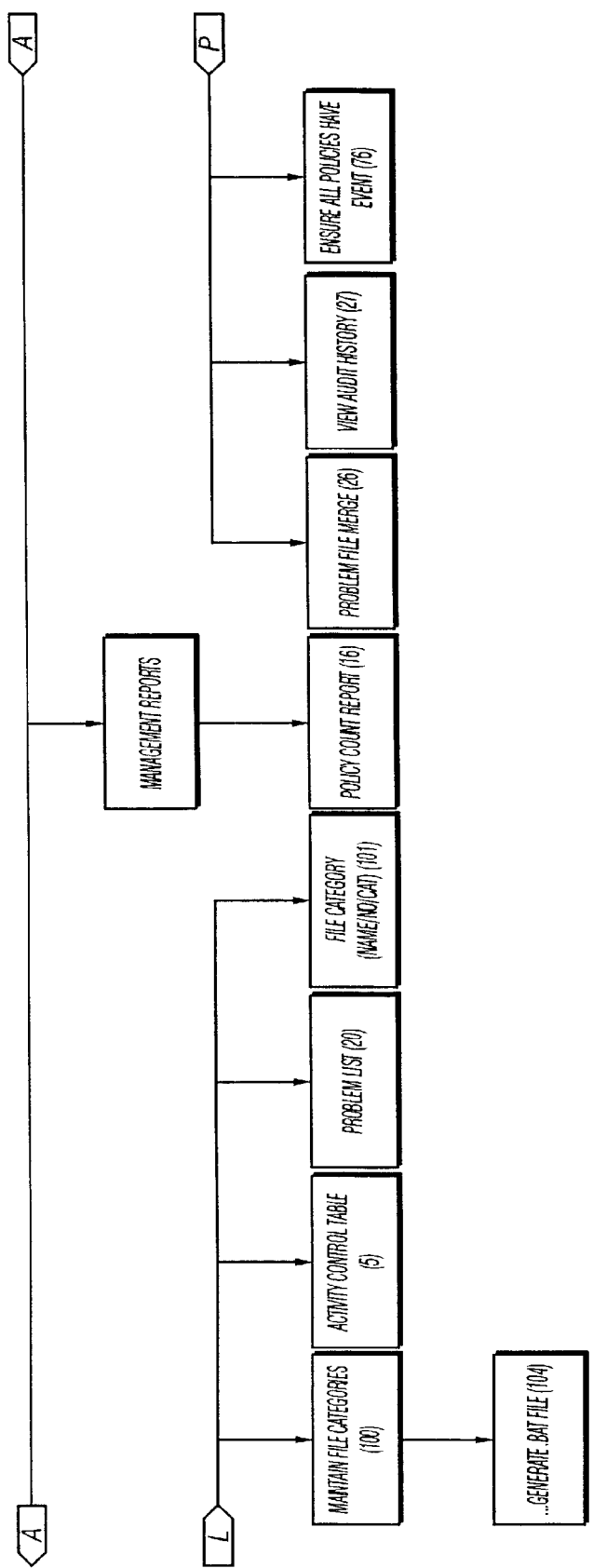
Figure 6C:
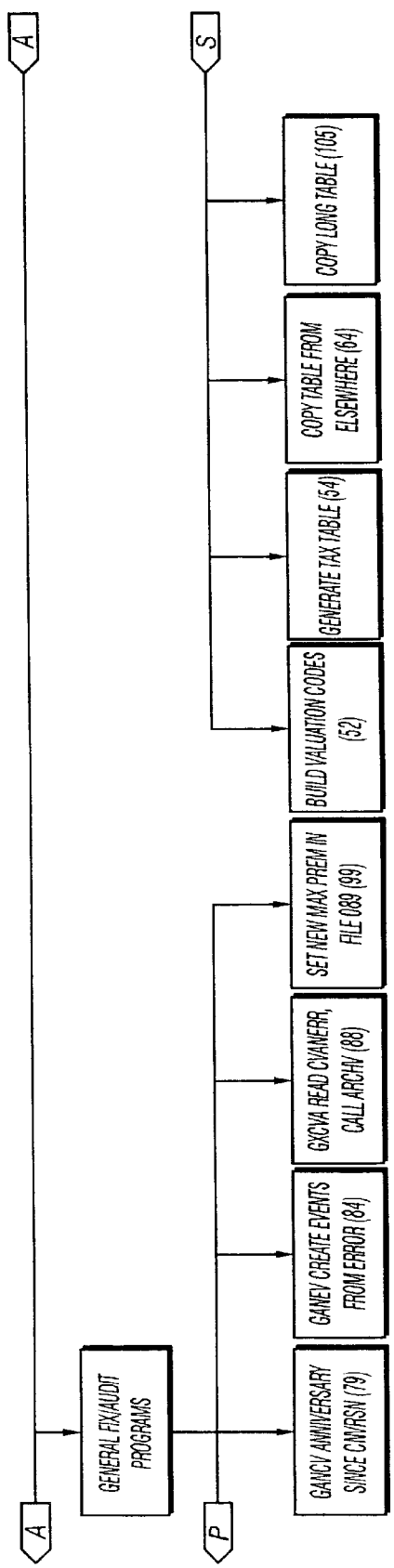
Figure 6D:
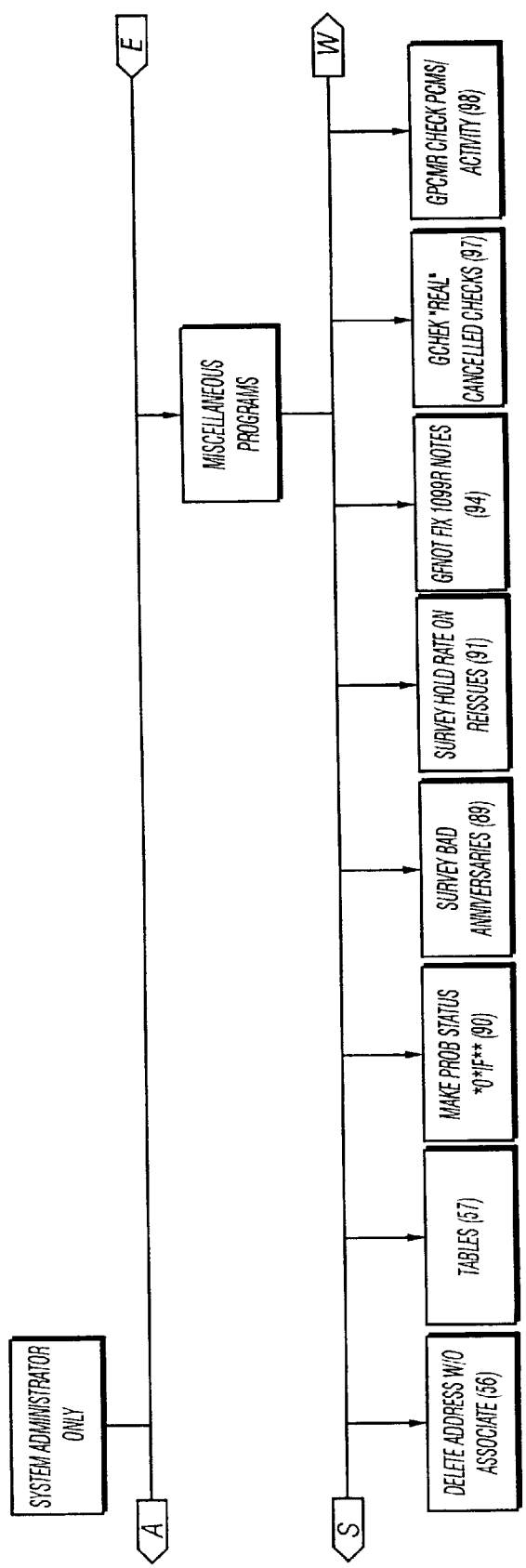
Figure 6E:
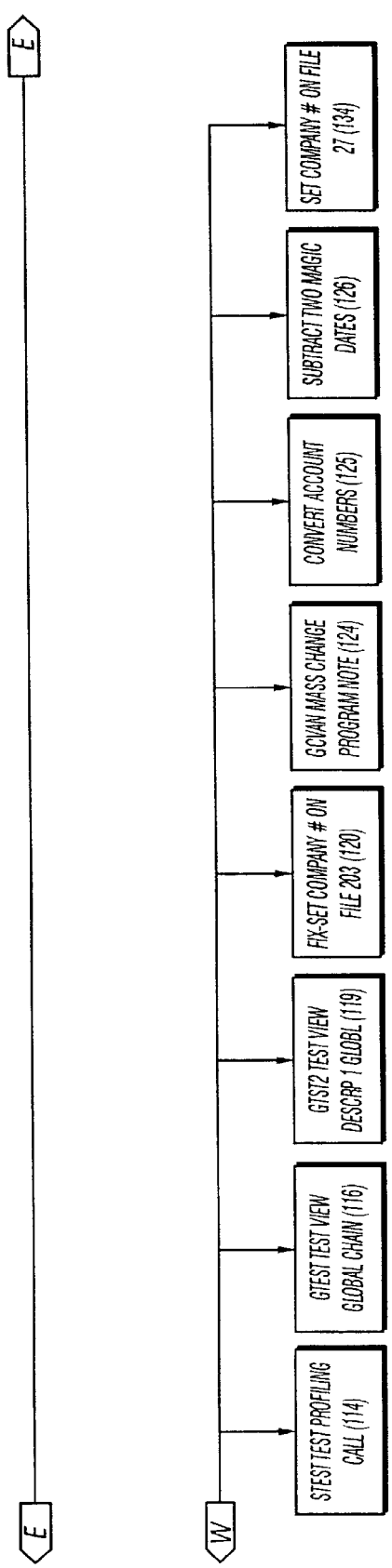
Figure 6F:
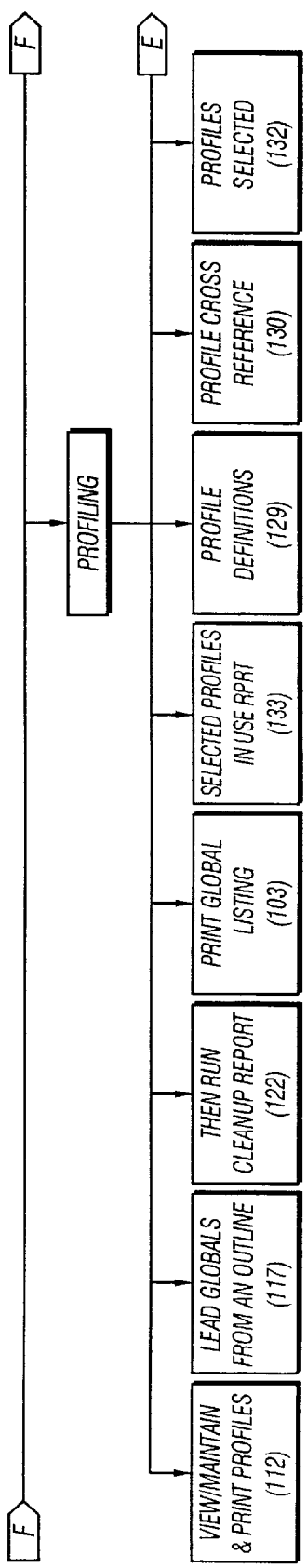
Figure 6G:
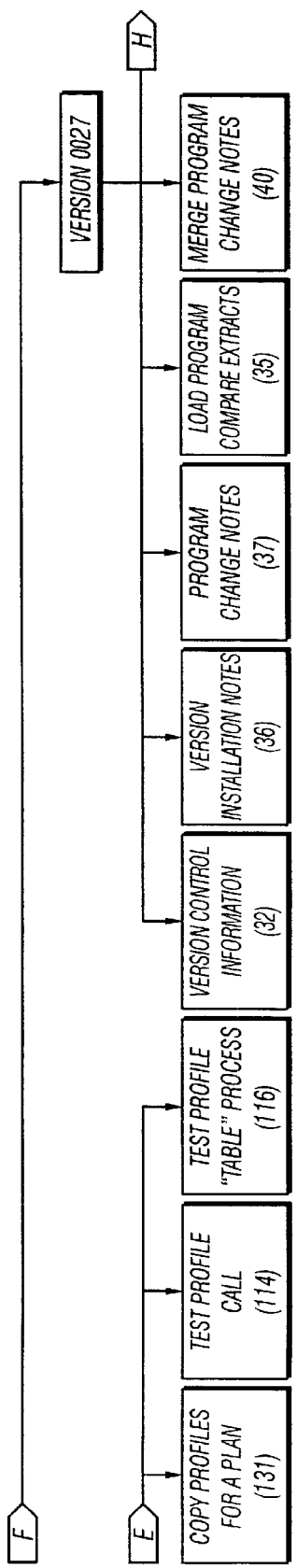
Figure 6H:
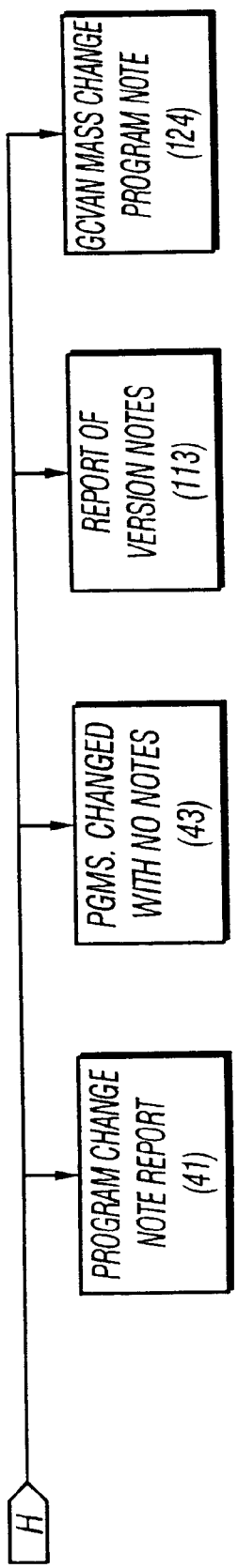
Figure 7A:
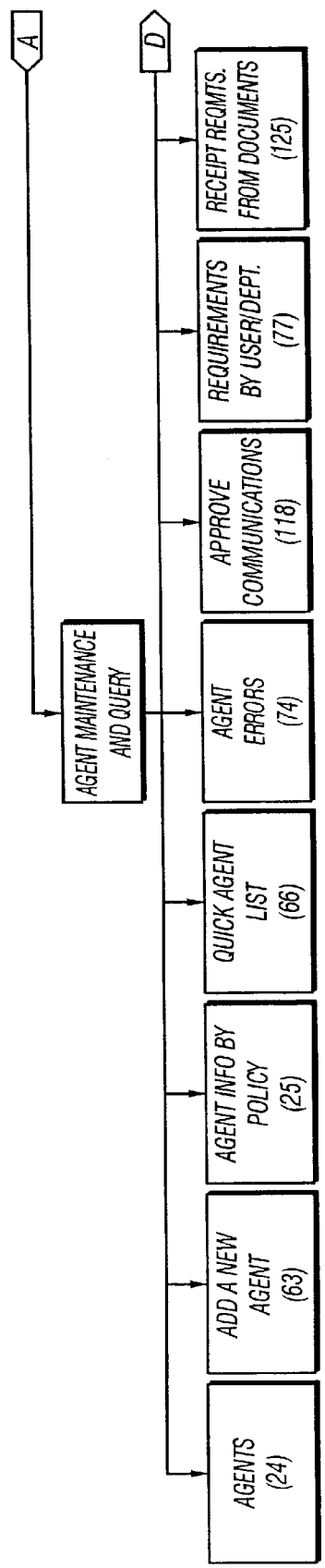
FIGS. 7a–c of the drawings is a singular flow chart illustrating Agents Maintenance screen options.
Figure 7B:
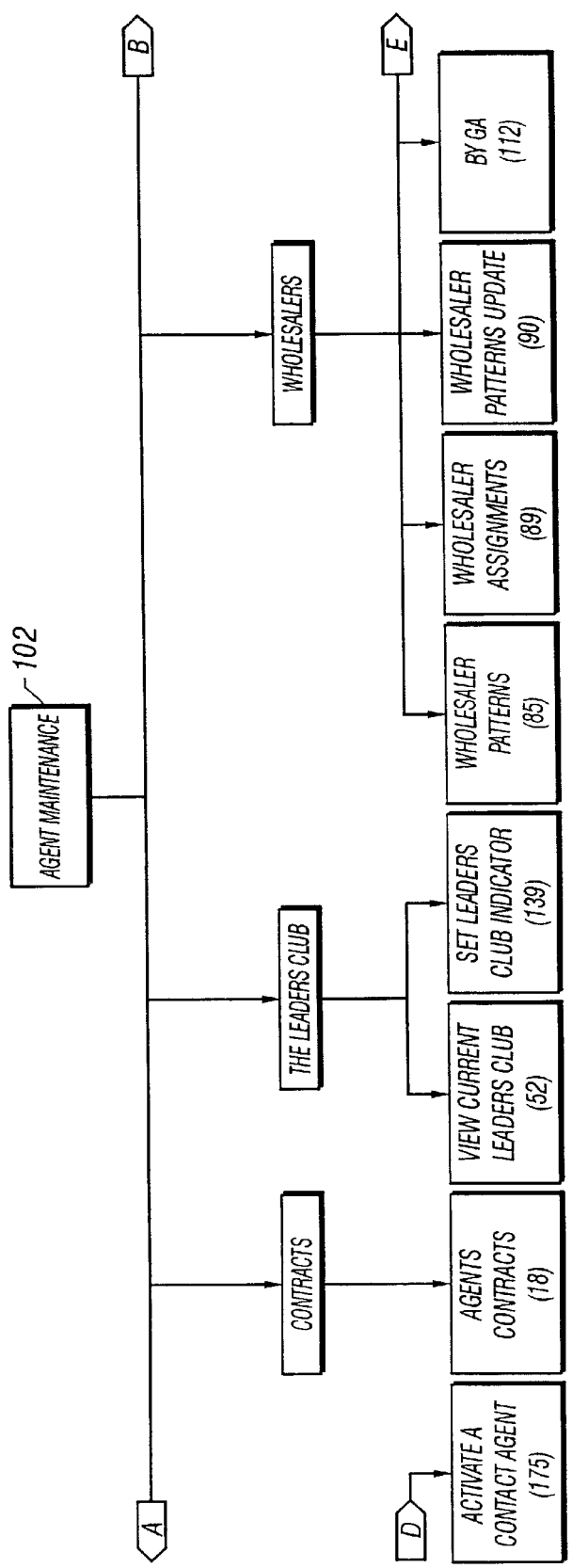
Figure 7C:
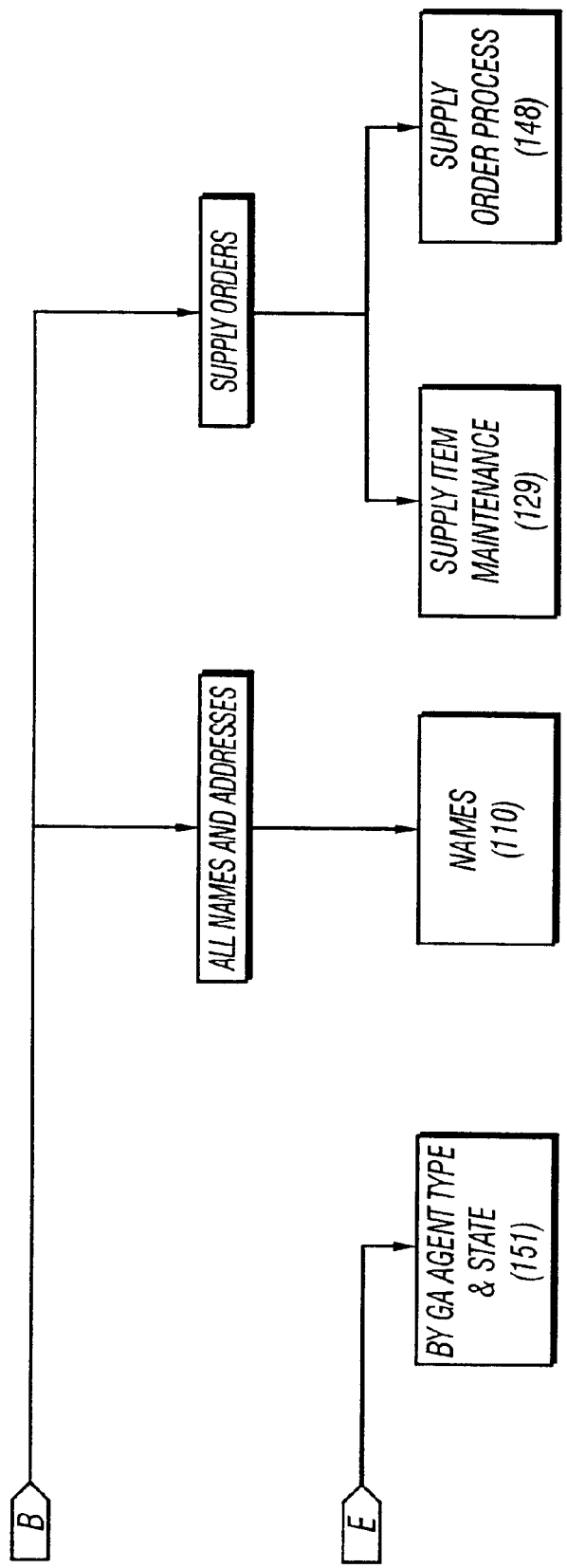
Figure 8A:
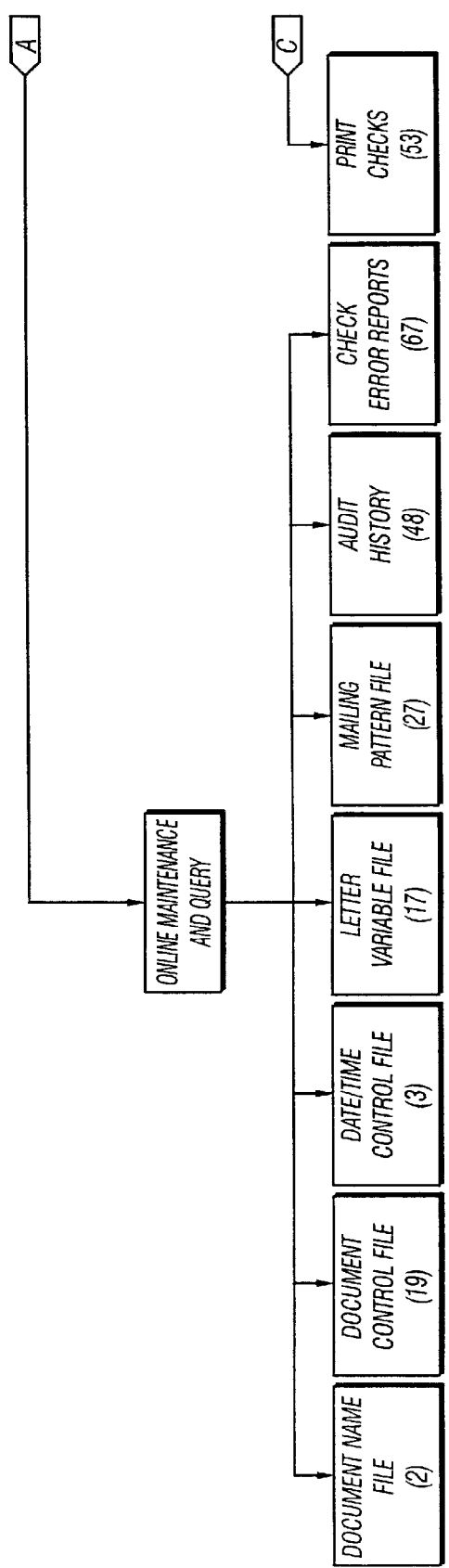
FIGS. 8a–c of the drawings is a singular flow chart illustrating Document Control screen options.
Figure 8B:
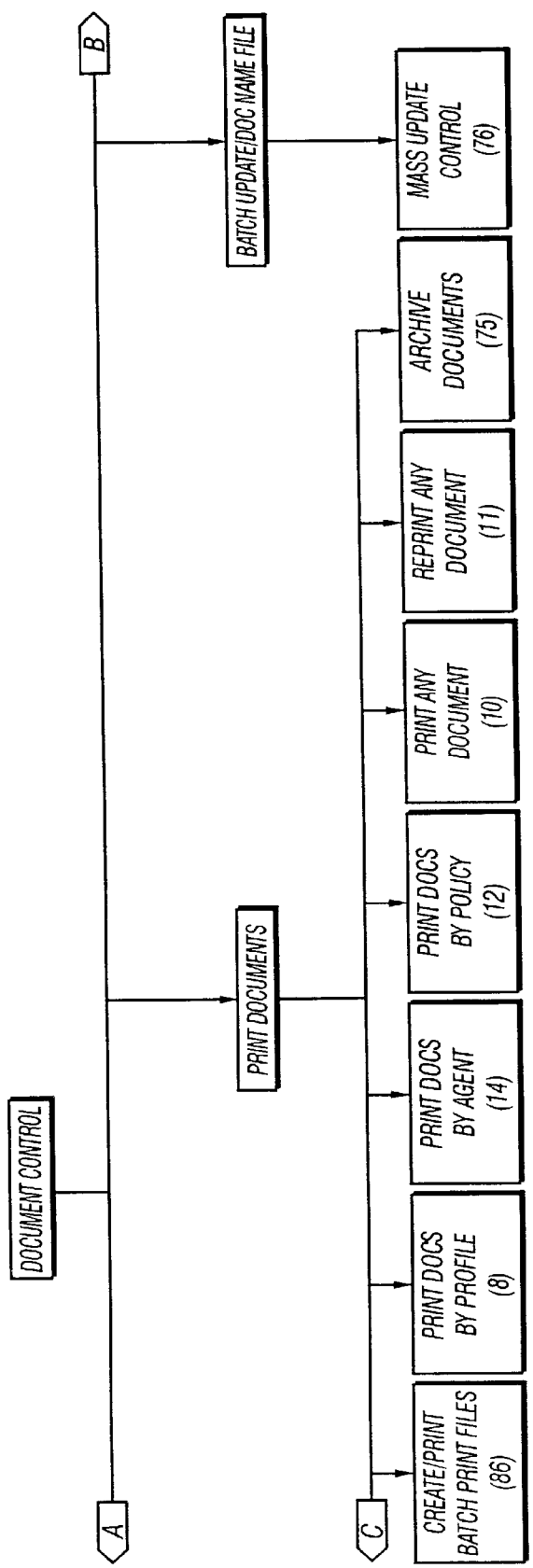
Figure 8C:
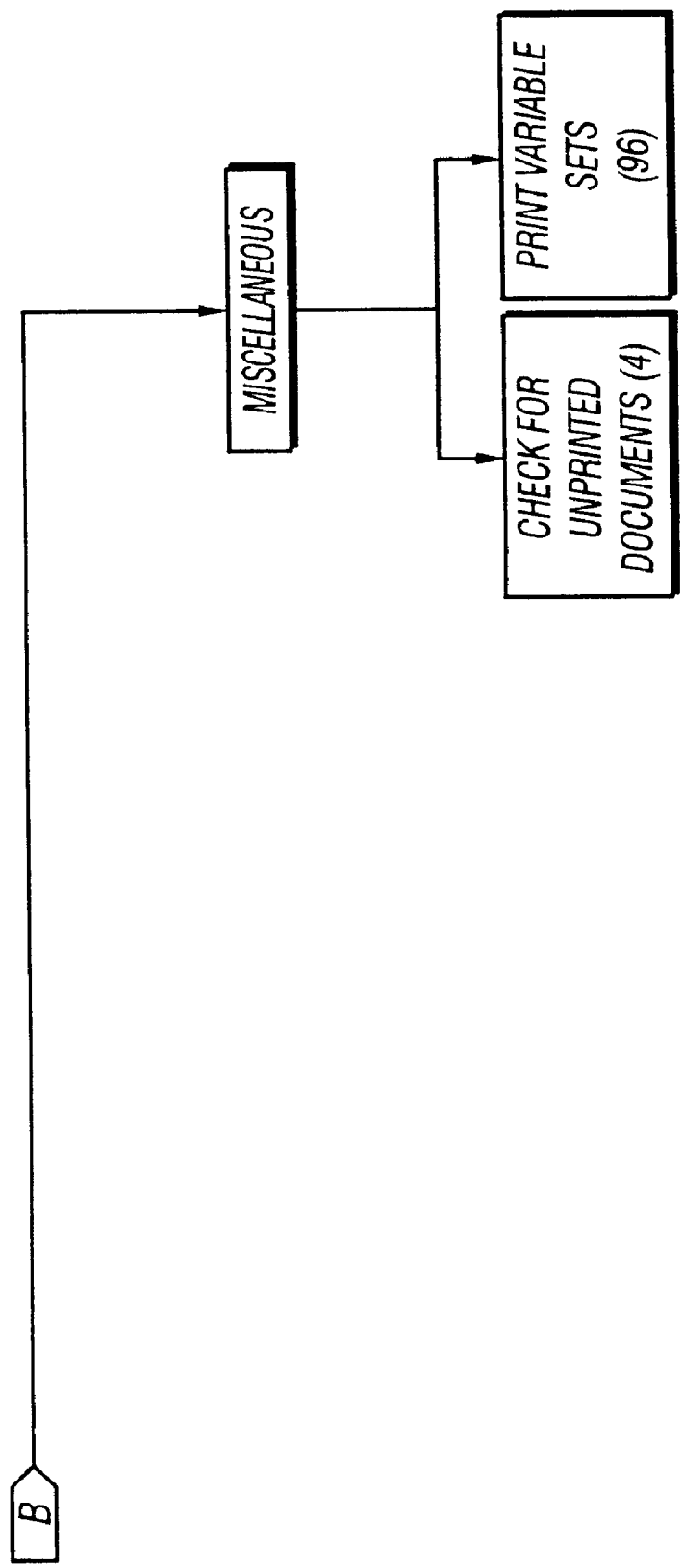
Figure 9A:
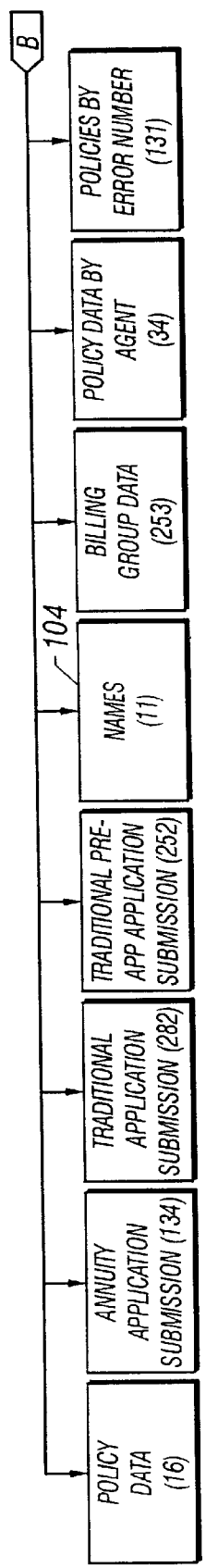
FIGS. 9a–c of the drawings is a singulr flow chart illustrating Policy Data screen options.
Figure 9B:
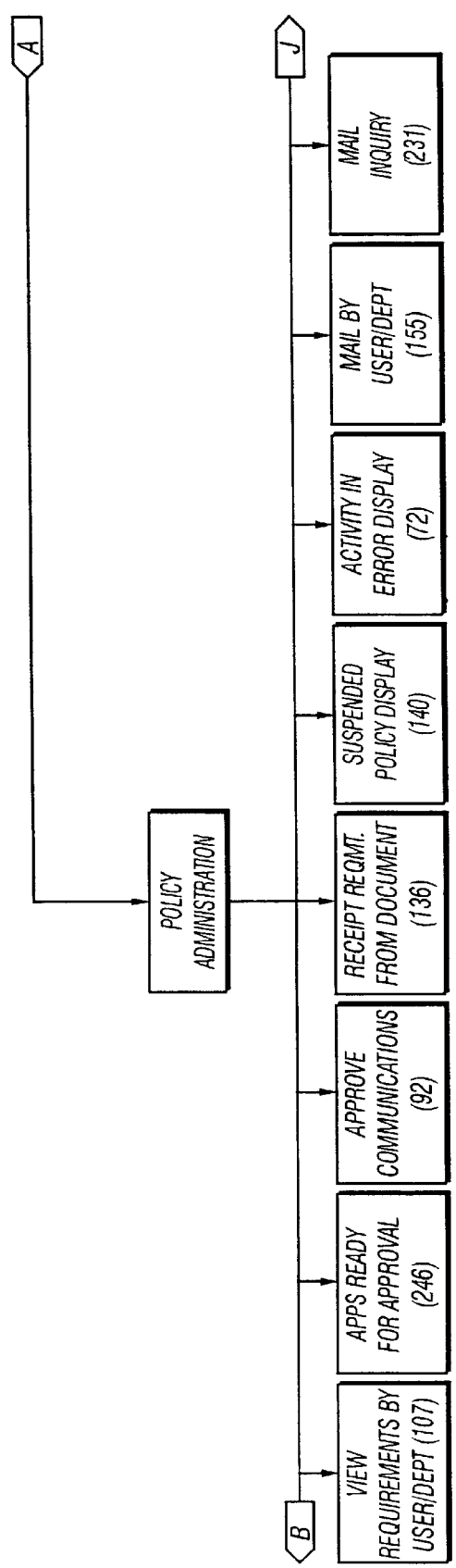
Figure 9C:
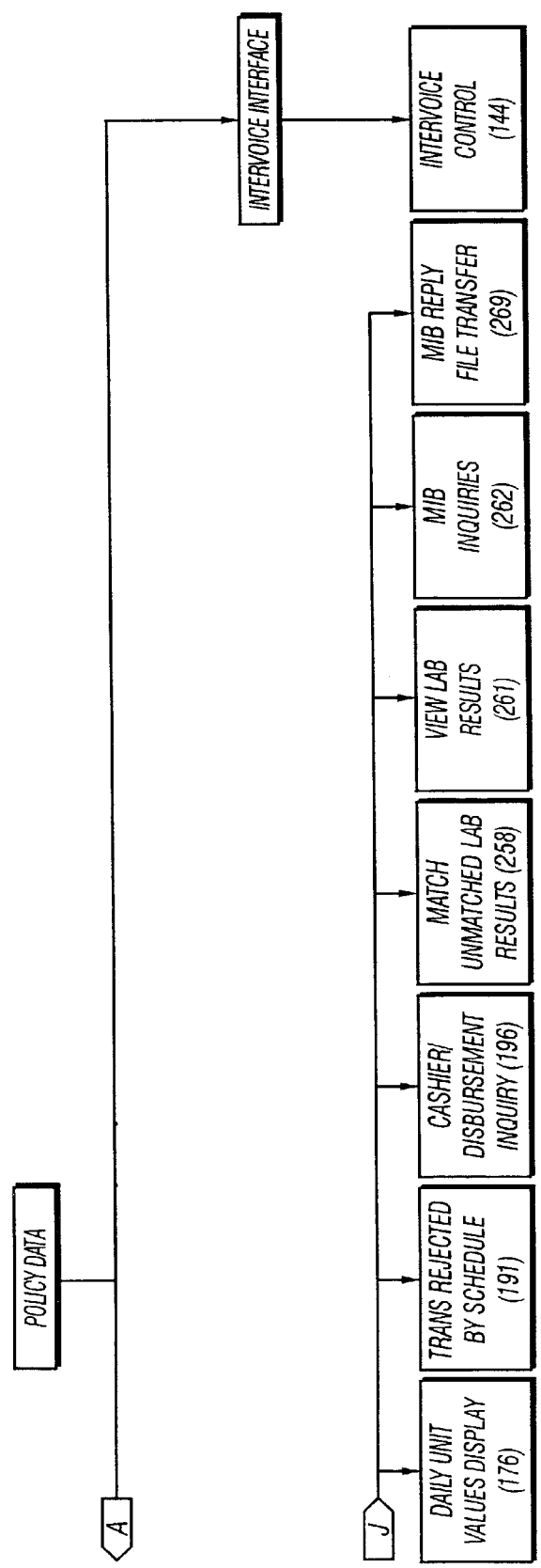
Figure 10A:
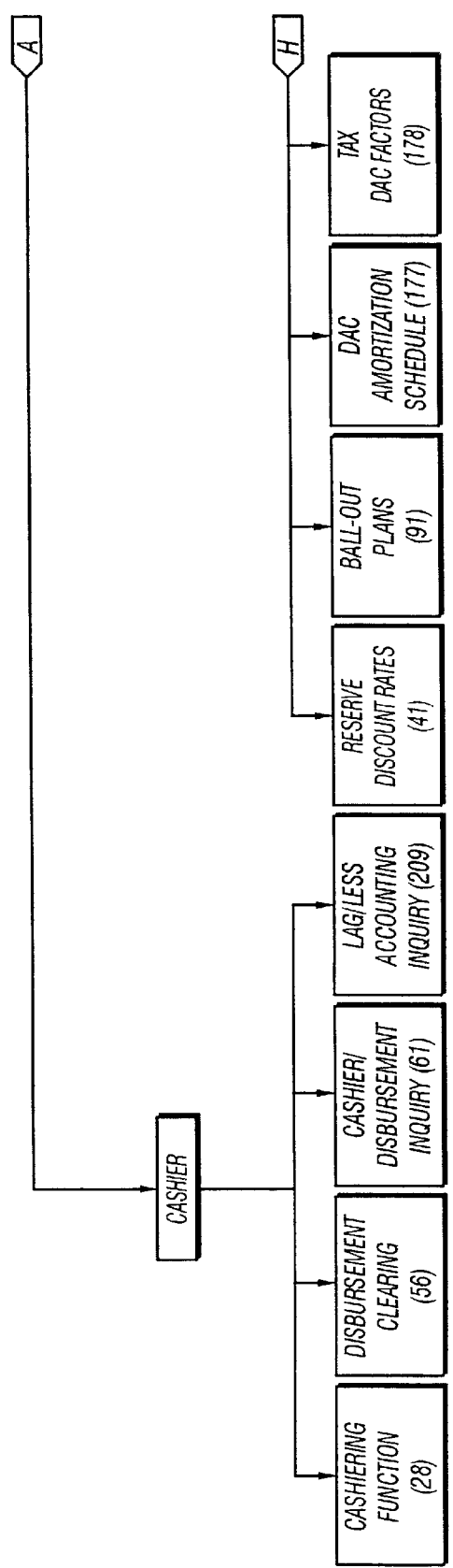
FIGS. 10a–h of the drawings is a singular flow chart illustrating Financials screen options.
Figure 10B:
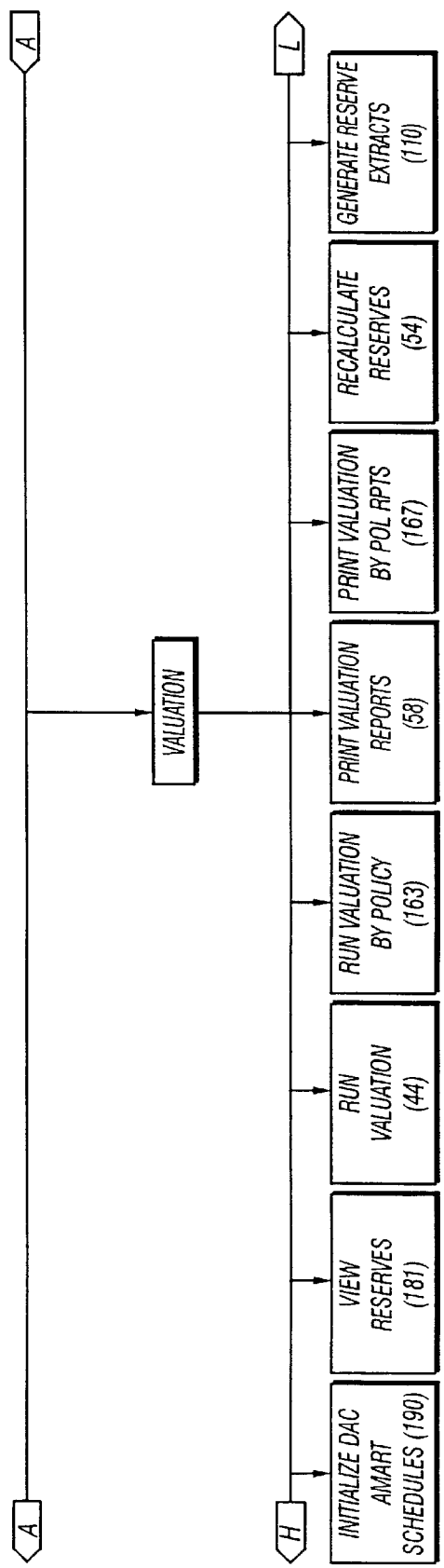
Figure 10C:
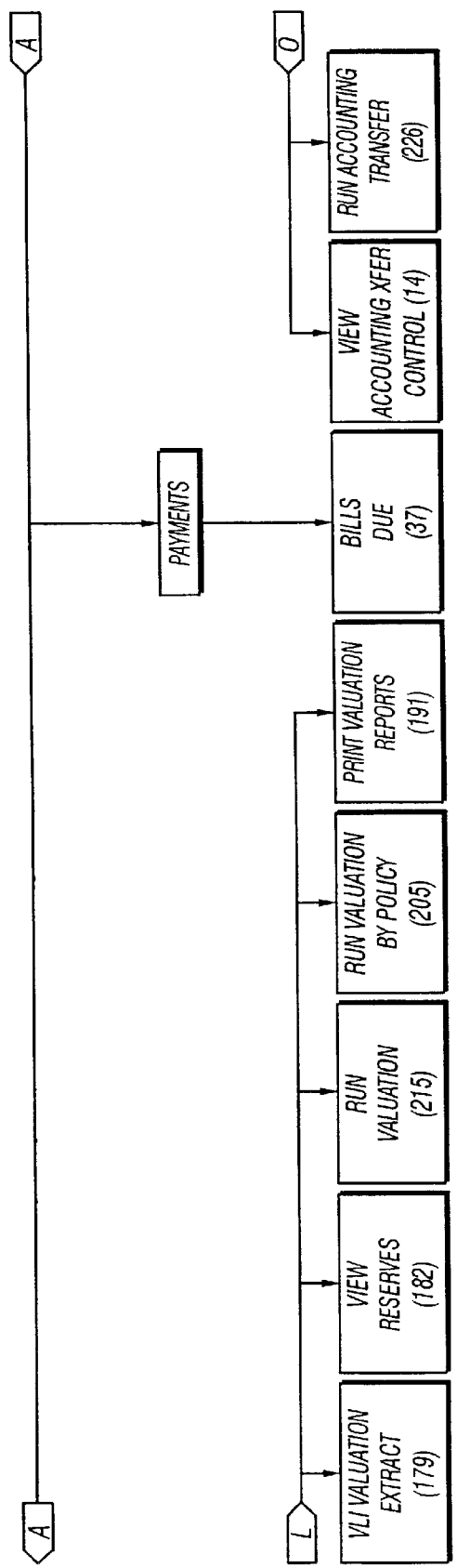
Figure 10D:
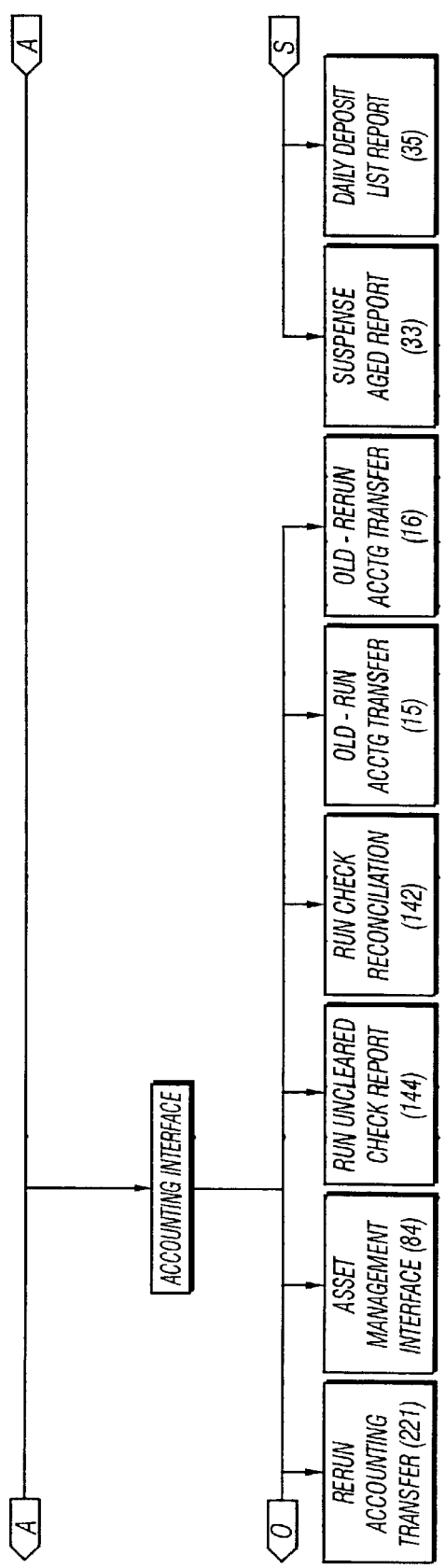
Figure 10E:
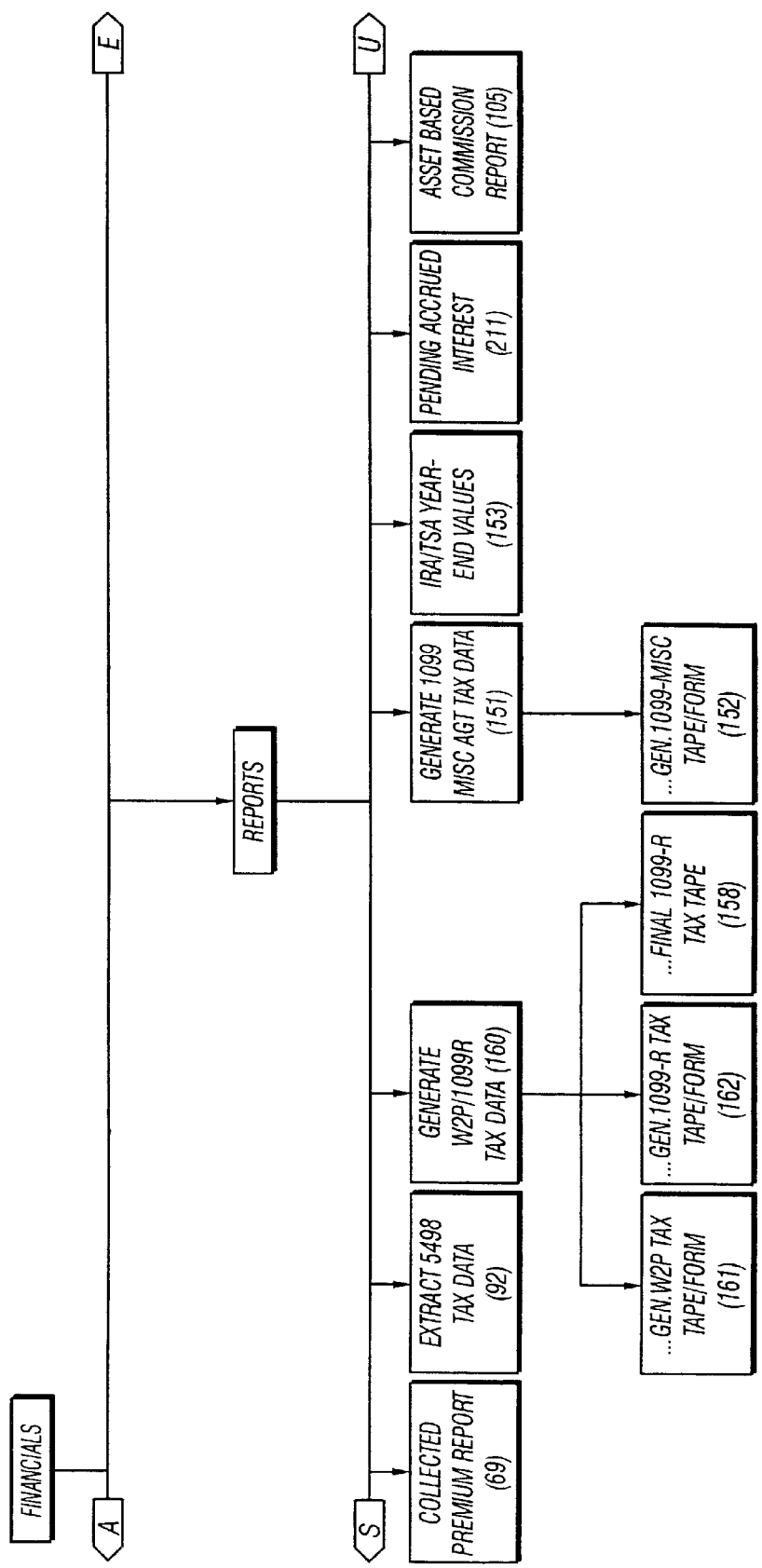
Figure 10F:
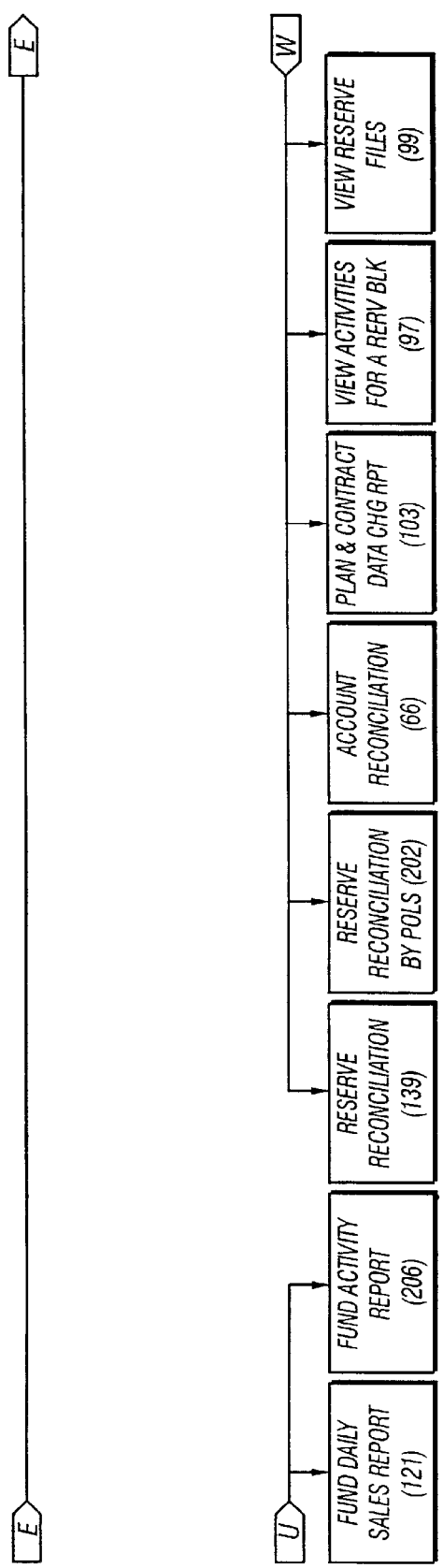
Figure 10G:
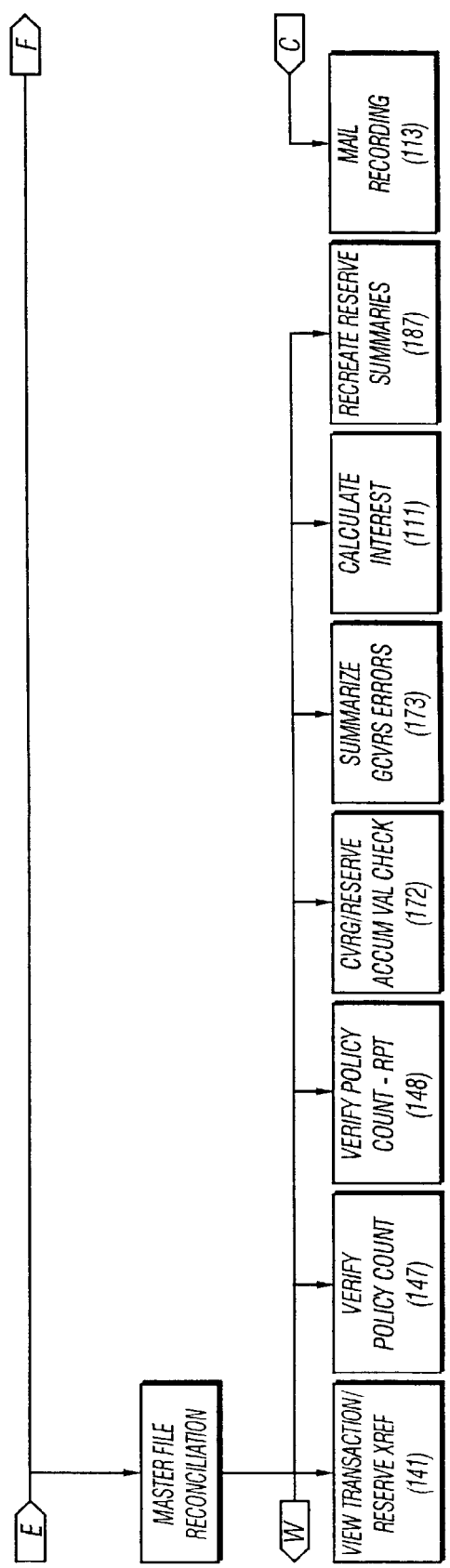
Figure 10H:
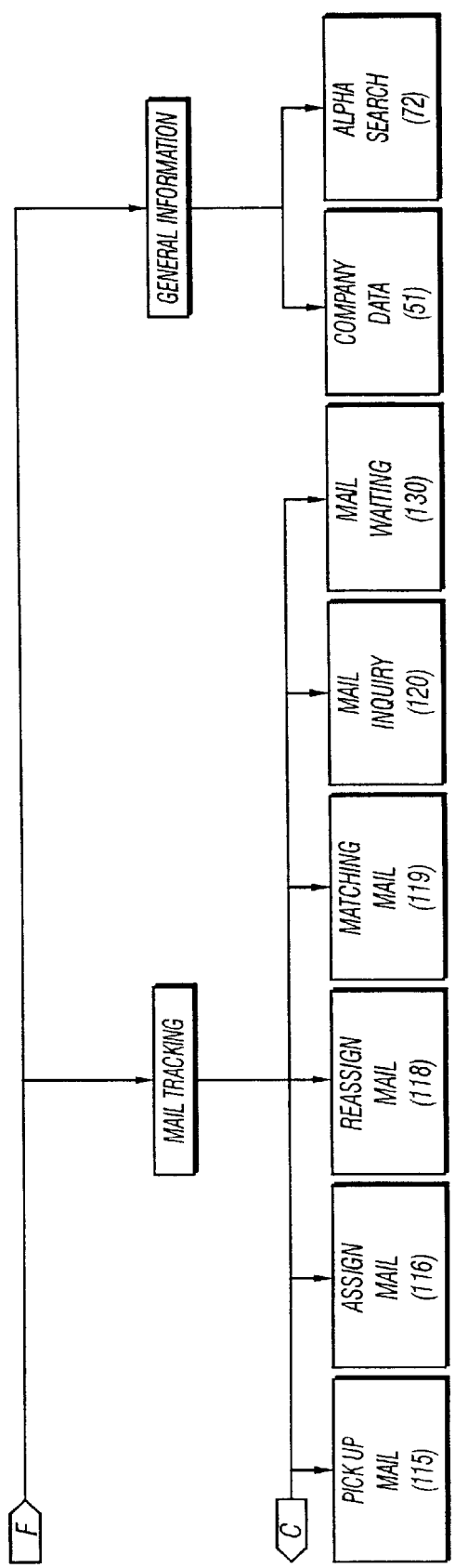

In the product profile, products are defined, and the questions which the user interface poses to the user relate to, for example, whether to use a policy owner's state of residence or state where the policy was signed for validation of coverage, what minimum information is required concerning an insured and a beneficiary, whether or not multiple insured, beneficiaries, owner or payors are allowed for a particular policy, what form letters are to be used for particular occasions, questions relating to premiums, questions related to withdrawals, the number of transfers between funds allowed in a particular time period, among other things (see FIG. 2).

In the company profile, questions which the user interface poses to the user relate to, for example, agent processing (how to assign an agent number to an agent, agent licence administration, etc.), and policy processing (the number of digits in a policy number, when to accept a premium that is below the required amount, when to return a premium that is greater than the required amount).

In the product line profile, agent and commission topics, and policy administration topics are addressed.

In the functional profile, selections are made from various options shown in FIG. 2 to set up operation of (to profile) functions that will be described below.

In the Mail Tracking function, the system provides tracking of all received mail. Mail is opened and immediately logged into the system after it is received. A piece of mail, depending on the type of document it is, is assigned to a proper department in the company. This can be performed by assigning a unique sequence number to each piece of mail received, printing a label with the unique sequence number using a label maker included in the system, and attaching the label to the piece of mail. Alternatively, the piece of mail is scanned by a scanner included in the system, and is electronically attached to an appropriate record in the system. After mail has been entered into the system and categorized, each department can assign pieces of mail to a specific person within the department. This assigned piece of mail can be reviewed through on line display screens by the specific person who can process the piece of mail by creating a transaction, changing policy and or agent data, or by creating a response to the piece of mail. After being processed by the specific person, the system closes the record relating to the piece of mail by attaching the mail record to the completed transaction. In this way, the piece of mail becomes part of the specific policy/agent record and the completed transaction and/or response. Mail records that haven't been closed can be monitored through online displays. These records are displayed by the system in the order of oldest to newest to indicate how much mail backlog exists. The system stores information relating to how and when the piece of mail is processed.

In the Cashiering, Disbursements, and Billing functions, all accounting is done immediately as transactions are processed. All incoming cash must be entered and balanced before it can be applied to individual policies. All disbursements, including checks, wire transfers, and internal exchanges, are controlled through an integrated approval feature. Suspense amounts are automatically kept in balance with ledger accounts.

In the Requirements Processing function, the system provides requirement processing for underwriting, inforce policy maintenance, and agent licensing. Followups can be sent internally to a named individual or outside in document form. There is an interface to MIB that is automatic and controlled by the system.

In the Document Processing function, the system can generate documents either automatically (form documents) or at the request of the user. These documents are written using Wordstar™ or Editext™ word processing. The system provides address pattern selection, document sorting, mailing exceptions by policy, agent or general agent, and an automatic FAX interface. Each document can be viewed online at any time. Users can also log incoming documents, phone calls and miscellaneous notes.

In the Billing function, the system can handle any mode of premium from 1 day to multiple years. Multiple coverages and payments due are easily combined on one bill. The billing process creates a due file which is easily accessed for payment processing. Payments are also batch controlled.

In the Marketing and Sales Information function, three types of reporting capabilities are provided—traditional production information by agent and time period, pending reports, and remote agency reporting (through the maintenance of a remote database).

In the Database Management function, in the Audit History sub-function, all changes to policy and agent data are recorded immediately as changes occur. This data can be accessed online by date, policy, agent, name, file or field.

In the Agent Processing function (see FIG. 2a), the system fully supports the licensing process with automatic requirement generation based on state requirements, including the printing of checks for state fees. Commissions are calculated immediately as transactions are processed. Pending commission amount and past commission statements are available online. Statements can be produced independently by agent at any frequency.

In the Names and Addresses function, the system allows an unlimited number of names to be associated with any policy or agent. Each name may have an unlimited number of addresses and phone numbers. Each name and address must be entered only once even though it may be associated with multiple policies or agents. An integrated zip code file is provided to streamline address processing and an intelligent name analyzer standardizes the maintenance of names.

Other features of the system will now be described.

Reversal processing is designed into the system, not added later as an afterthought. The system allows the immediate and simple reversal and reprocessing of any or all policy transactions, including the appropriate adjustments to accounting and commissions.

The system operates in 'people' time, or as the inventors call it, 'Business Time' processing. There is no typical overnight cycle where a master file is passed from beginning to end, searching for events that need to be processed. Instead, the system employs means referred to herein as the Activity Server/Activity Processor (ASAP).

ASAP includes an Activity Scheduler (one of 12, 14, and 16 (see FIG. 1)) which monitors and controls processing. ASAP also includes a plurality of Activity Processors which run programs on dedicated workstations (the remaining of 12, 14, and 16). ASAP is a unique feature that allows any workstation on the network to be assigned as an Activity Processor. ASAP reduces, and in some cases eliminates, the necessity for an operator to wait while real time processing takes place. As previously mentioned, ASAP also eliminates the need for batch overnight processing. Functions are generated as a result of both online activity and prescheduled processing. An Activity Record is created for each function and is added to the Activity File, in date and time sequence. Any function scheduled for a date and time less than the current date and time is selected for processing by the Activity Scheduler. Each function is processed as a separate little batch job in real-time. By employing ASAP, activities can be processed 24 hours per day and are totally independent of online transactions. All critical functions (validation, premium calculation, etc.) are performed immediately as online transactions. Functions such as policy page print, commission calculation, accounting, etc., are not performed while the operator waits. Instead, the Activity Scheduler schedules these activities to be processed at the next earliest convenience by a workstation (activity processor) dedicated to this purpose (much like a queuing process). These scheduled functions will generally be processed within a few minutes by the workstation (activity processor), making the data available for online access.

Not all functions result from online processing, many are inherent to the administration of an insurance contract. Some of these functions are policy anniversary, billing and commission statements. These types of functions are initially scheduled as a result of an online process. Thereafter, these functions are scheduled automatically by the Activity Scheduler, perpetually, until the policy or agent becomes inactive.

The system gives greater control of the entire process to the Users. Much more data is available immediately online and can be displayed in almost any order. Rate files, tables, and other user controlled data are all updated online.

Documents are designed by the users using Microsoft's Wordstar™ or Editext™ and are merged with the appropriate policy data from the system when letters are created. Any correspondence can be generated and printed immediately on a local printer. Reports are also easily developed that allow the User to select the range of data to be selected and the sequence of data to be displayed.

The system has been developed strictly for the PC/Network environment. It operates using Novell's NetWare operating software (Novell today is recognized as the defacto industry standard). The network allows several PC's to access the system at the same time, and facilitates communications between the PC's for other purposes. The use of the networked intelligent workstation allows true distributed processing and control. The concept of a centralized computer environment has never been particularly conducive to an effective operation. All processing and development needs cannot be reduced to a single priority list and still be efficient. The distributed environment allows major divisions and individual users to control their own destiny.

The system has been developed using a relatively new, powerful, commercially available development tool called MAGIC/PC™, which interfaces with data written into btreive™ files (btreive™ is another commercially available product). Various menus described above and illustrated in FIG. 2, were invented using MAGIC/PC™ and those menus cannot be altered by the user of the system.

The information for these functions is stored in data files 24. A data receiving and verifying mechanism 26 which is built into the system, receives and verifies the data from each of the personal computers and the file server. In other words, the data receiving and verifying system checks the information received to insure that it corresponds in format and does not conflict with the existing data. Following such verification, the system utilizes the information received to perform the function shown in FIG. 2. After performing these functions the current data relative to each of the functions is updated. A series of data files, which in a preferred embodiment now exceed three hundred files, store data characterizing each of the functions. Windows are inherent in the system and are easily displayed using function keys. Each database file has one or more access codes. Each menu has a two digit code associated with it (and displayed on screen when the menu is accessed), and each access code consists of a concatenation of the two digit codes of the menus passed through to access the database file. A concatenation of the two digit codes of the menus passed through on the way to an intermediate displayed menu appears on screen at the intermediate displayed menu. Each access code provides a pre-sorted index to values in the file. This feature allows the user to easily access data and insures that response time will be consistent regardless of the file size. This feature also allows the user to easily describe to someone else what menu he or she is at and how he or she got to that menu.

The system further includes a means providing for communication between the individual personal computers in the system and to individuals outside of the system. The communication mechanism comprises the Novell™ network connecting the PC's and the file server. In order to provide communication to individuals outside the network and outside the insurance company, the system is connected to one or more laser printers. In addition, the system may include electronic interfaces such as Carbon Copy™ and electronic fax systems such as those commonly known in the art.

The system also provides off-site database support. This support allows a company to process data in one or more locations while maintaining a single consolidated database. This support is well suited for remote, regional processing by separate marketing organizations, or regional processing offices of the company. Generally, this support can take one of three forms: (1) selected data files are maintained in their entirety at the remote site, thus allowing both the Home Office and the remote site to view and update any records in these files; (2) a subset of selected data files are maintained at a remote site such that only the subset can be maintained by the remote site but all data including the subset can be maintained by the Home Office; or (3) a subset of selected data files at the Home Office is made available to the remote site for inquiry purposes only.

An additional feature of the present system is a means for searching the data files under various topics such as agent maintenance, or policy administration. The system is designed to search for a particular agent or client in different ways: by number, by phonetic name, by taxpayer I.D., by alphabetical listing, and by external number. The system also has the ability to search partial names and numbers.

An additional feature of the invention is the method by which the functions described above are processed by the system. The previously described mechanism for updating current data in response to entered data and received data from the PC's includes an activity server/activity processor mechanism which processes certain functions immediately as on line transactions and queues additional functions in an order preset by the system or by the user as required. The processing mechanism analyzes the entered and received data, identifies which function is to be performed and prioritizes that function for processing.

The system further includes a mechanism for providing a retrievable audit history of every function and every transaction performed by the system and all data entered into the system. The audit history is retrievable by date and time, person performing the function and transaction type. The aforesaid correspondence mechanism includes means for identifying and retrieving correspondence on the basis of policy level, the individual agency level, the general agency level, the document type or the zip code as required.

A microfiche of the program is attached hereto and incorporated by reference herein. A microfiche of a users manual for the program is also attached hereto and incorporated by reference herein.

I claim as my invention:

1. An integrated system for the real time administration of insurance companies, said system comprising:
   a plurality of personal computers that are networked together;
   at least one of said personal computers comprising an activity processor;
   at least one of said personal computers comprising an activity scheduler;
   at least one file server operatively connected to said network;
   means for real time performance of a plurality of predetermined insurance functions, said functions comprising cashiering, disbursements, document processing, and billing;
   manual entry means for entering data relative to any of said functions;
   data receiving and verifying means for receiving and verifying data from any of said personal computers, said manual entry means and said at least one file server against at least one predetermined standard;
   means responsive to said entered data and received data for real time updating data relative to any of said functions when desired;
   data file means for storing data;
   display means for displaying any of said data;
   means for predefining via said activity scheduler that selected first types of entered data are to be processed by said activity processor in real time and that selected second types of entered data are to be queued for processing at another time;
   menu driven means for defining an insurance product in response to menu selections made by a user; and
   menu driven means for receiving an application for insurance into said network by displaying, via said display means, screens that vary depending upon a selected insurance product.

2. The system of claim 1 and further comprising means for generating a series of questions to the user; and means for modifying the operation of said system to globally conform to the answers to said questions.

3. The system of claim 2 and further comprising means defining four levels, said levels comprising a data base level, a company level, a product line level and a product level, each level comprising a series of parameters which may be selectively modified by the user, said system including means for modifying said parameters at the command of the user and means responsive to said modifying means for modifying said levels independently or collectively as required.

4. The system of claim 3 wherein said data base level comprises all information stored in said data file means.

5. The system of claim 3 wherein said company level comprises all data relating to a single corporate entity.

6. The system of claim 3 wherein said product line level comprises factor based products including traditional life products, formula based products including universal life and fixed annuities and equity based products including variable life and variable annuities.

7. The system of claim 3 wherein said product level comprises a plurality of individual forms of insurance policy.

8. The system of claim 1 and further including communicating means comprising facsimile means integral with said personal computers for transmitting and receiving facsimiles; means for transmitting and receiving electronic files; and printer means for printing hard copies of said facsimile, said electronic files and said data files as required.

9. The system of claim 1 and further comprising means for searching said data files for an agent, alphabetically, by agent number, by phonetic name, by taxpayer identification number or by external identification number.

10. The system of claim 1 and further comprising means for providing a retrievable audit history of every function performed by said system, and all data entered into said system, said audit history being retrievable by date and time, by person performing the function, and by transaction type.

11. The system of claim 1 and further comprising means for defining a hierarchy of insurance agents including who each insurance agent reports to and who reports to each agent, said means selectively defining a different hierarchy for different insurance products.

12. The system of claim 11 and further comprising means for calculating commissions for insurance agent based on where the agent is in said hierarchy.

13. The system of claim 12 including means for reversing a transaction, including means for changing an insurance agent's commission when a transaction is reversed.

14. The system of claim 12 and further comprising means for calculating tax information and means for printing a tax form for an agent who received commission payments.

15. An improved method of configuring a personal computer based network system to the real time requirements of an insurance company, said method comprising the steps of:
   generating a series of displayed questions to a user for defining at least minimum characteristics of an insurance product concerning an insured and a beneficiary, whether multiple beneficiaries are permitted for a particular insurance policy, and what form letters are to be used for particular occasions, for each of various insurance products to be defined;
   receiving corresponding answers to said questions into said personal computer network and using said answers to define insurance products;
   electronically receiving and converting to data an application for insurance into said network via display menu screens that vary depending upon the insurance product that is desired and the menu selections made by said user;
   deeming at least one of said personal computers an activity scheduler and deeming at least one of said personal computers an activity processor; and
   processing said data and said answers in real time via the operations of said activity scheduler and said activity processor.

16. An integrated system for the real time administration of insurance companies, said system comprising:
   a plurality of personal computers that are networked together;

at least one of said personal computers comprising an activity processor;

at least one of said personal computers comprising an activity scheduler;

at least one file server operatively connected to said network;

means for real time performance of a plurality of predetermined insurance functions, said functions comprising cashiering, disbursements, document processing, and billing;

manual entry means for entering data relative to any of said functions;

data receiving and verifying means for receiving and verifying data from any of said personal computers, said manual entry means and said at least one file server against at least one predetermined standard;

means responsive to said entered data and received data for real time updating data relative to any of said functions when desired;

data file means for storing data;

display means for displaying any of said data;

means for predefining via said activity scheduler that selected first types of entered data are to be processed by said activity processor in real time and that selected second types of entered data are to be queued for processing at another time;

menu driven means for defining an insurance product in response to menu selections made by a user;

menu driven means for receiving an application for insurance into said network by displaying, via said display means, screens that vary depending upon an selected insurance product;

means for providing a retrievable audit history of every function processed by said system, said audit history at least retrievable by date, time, and transaction type;

means for defining a hierarchy of insurance agents comprising who each insurance agent reports to and who reports to each agent, said means selectively defining thereby a corresponding hierarchy for each insurance product;

means for real time calculation of commissions for insurance agents based on where an agent is in said hierarchy;

means for the real time reversal of any transaction;

means for changing an insurance agent's commission when a relevant transaction is reversed;

means for calculating commission tax information; and means for printing a commission tax form.

\* \* \* \* \*